United States Patent
Bustamante et al.

(10) Patent No.: US 11,685,524 B2
(45) Date of Patent: Jun. 27, 2023

(54) ROTORCRAFT QUIET MODES

(71) Applicant: Textron Innovations Inc., Providence, RI (US)

(72) Inventors: Marc Bustamante, Montreal (CA); Marc Ouellet, Sainte-Sophie (CA); Alexis Dugré, Boisbriand (CA); Chen Kuang, Montreal (CA); Guillaume Biron, Blainville (CA)

(73) Assignee: Textron Innovations Inc., Providence, RI (US)

( * ) Notice: Subject to any disclaimer, the term of this patent is extended or adjusted under 35 U.S.C. 154(b) by 244 days.

(21) Appl. No.: 17/108,651

(22) Filed: Dec. 1, 2020

(65) Prior Publication Data

US 2022/0169377 A1    Jun. 2, 2022

(51) Int. Cl.
   *B64C 27/82*    (2006.01)
(52) U.S. Cl.
   CPC ...... *B64C 27/82* (2013.01); *B64C 2027/8209* (2013.01); *B64C 2027/8227* (2013.01); *B64C 2027/8254* (2013.01)
(58) Field of Classification Search
   CPC . B64C 27/82; B64C 27/06; B64C 2027/8209; B64C 2027/8227; B64C 2027/8254
   See application file for complete search history.

(56) References Cited

U.S. PATENT DOCUMENTS

| | | | |
|---|---|---|---|
| 5,314,147 A * | 5/1994 | Ebert | G05D 1/0055 |
| | | | 701/110 |
| 5,388,785 A | 2/1995 | Rollet et al. | |
| 5,735,670 A * | 4/1998 | Moffitt | B64C 11/003 |
| | | | 244/17.11 |
| 7,032,860 B1 | 4/2006 | Kirk et al. | |
| 7,731,121 B2 | 6/2010 | Smith et al. | |
| 8,882,024 B1 | 11/2014 | McCollough et al. | |
| 9,235,217 B2 * | 1/2016 | Barnes | G05D 1/0858 |
| 9,453,516 B2 | 9/2016 | Kreitmair-Steck | |

(Continued)

FOREIGN PATENT DOCUMENTS

| | | |
|---|---|---|
| DE | 102005046155 A1 | 4/2007 |
| EP | 2394914 A1 | 12/2011 |

(Continued)

OTHER PUBLICATIONS

Besse et al.; RTM Technology for Fenestron Blade; Eurocopter; Jan. 1997.

(Continued)

*Primary Examiner* — Russell Frejd

(74) *Attorney, Agent, or Firm* — Lawrence Youst PLLC

(57) ABSTRACT

A yaw control system for a helicopter having a tailboom includes one or more tail rotors rotatably coupled to the tailboom and a quiet mode controller. The quiet mode controller includes a noise monitoring module configured to monitor one or more flight parameters of the helicopter and a quiet mode command module configured to selectively switch the one or more tail rotors to a quiet mode based on the one or more flight parameters. The quiet mode command module is also configured to modify one or more operating parameters of the one or more tail rotors in the quiet mode to reduce noise emitted by the helicopter.

18 Claims, 32 Drawing Sheets

(56) References Cited

U.S. PATENT DOCUMENTS

| | | |
|---|---|---|
| 10,210,856 B1 | 2/2019 | Hefner et al. |
| 10,377,479 B2 | 8/2019 | Parsons et al. |
| 10,526,085 B2 | 1/2020 | Fenny |
| 10,703,471 B2 | 7/2020 | Fenny et al. |
| 10,787,253 B2 | 9/2020 | Parsons et al. |
| 10,814,970 B2 | 10/2020 | Sinusas et al. |
| 11,174,018 B2 | 11/2021 | Fenny et al. |
| 11,332,240 B2 | 5/2022 | Sinusas et al. |
| 2009/0014581 A1 | 1/2009 | Kebrle et al. |
| 2011/0121128 A1 | 5/2011 | Balkus, Jr. et al. |
| 2013/0134256 A1 | 5/2013 | Gaillard |
| 2013/0170985 A1 | 7/2013 | Altmikus et al. |
| 2013/0205941 A1 | 8/2013 | Tanose |
| 2013/0206915 A1 | 8/2013 | Desaulniers |
| 2014/0246541 A1* | 9/2014 | Feyzeau ............... G05D 1/0676 244/1 N |
| 2015/0001337 A1 | 1/2015 | McCollough et al. |
| 2015/0370266 A1* | 12/2015 | Norris ................... G05D 19/02 700/280 |
| 2016/0083085 A1 | 3/2016 | Strauss et al. |
| 2016/0280369 A1 | 9/2016 | Pounds |
| 2017/0274987 A1* | 9/2017 | Bredenbeck ......... G05D 1/0858 |
| 2017/0305540 A1* | 10/2017 | Eller ....................... B64D 35/06 |
| 2017/0349274 A1 | 12/2017 | Fenny et al. |
| 2017/0349276 A1 | 12/2017 | Fenny |
| 2018/0346135 A1 | 12/2018 | Haldeman et al. |
| 2019/0225349 A1 | 7/2019 | Sinusas et al. |
| 2020/0017207 A1 | 1/2020 | Alber |
| 2020/0023958 A1 | 1/2020 | Acee et al. |
| 2020/0108919 A1 | 4/2020 | Sada et al. |
| 2020/0298970 A1 | 9/2020 | Acee et al. |
| 2020/0391858 A1* | 12/2020 | Snider .................... B64C 27/52 |
| 2020/0391879 A1* | 12/2020 | Snider ................... B64C 39/024 |

FOREIGN PATENT DOCUMENTS

| | | |
|---|---|---|
| EP | 3501983 A1 | 6/2019 |
| JP | H07156890 A | 6/1995 |
| JP | H09175495 A | 7/1997 |
| JP | 2009051465 A | 3/2009 |
| JP | 2009090755 A | 4/2009 |

OTHER PUBLICATIONS

Composites Take Off at Paris Air Show; Reinforced Plastics; Oct. 1995.

Janker et al.; Helicopter Hybridisation—The Key for Drastic Reductions of Fuel Burn and Emissions; American Helicopter Society; May 3-5, 2011.

Eric Sinusas, Bell Reveals the Revolutionary Electrically Distributed Anti Torque Demonstrator, Vertical Flight Society, Nov. 16, 2020, YouTube, https://www.youtube.com/watch?v=FU18TFUapOM.

European Exam Report; Application 21209425.4; European Patent Office; dated Apr. 19, 2022.

European Search Report; Application 21209425.4; European Patent Office; dated Apr. 4, 2022.

* cited by examiner

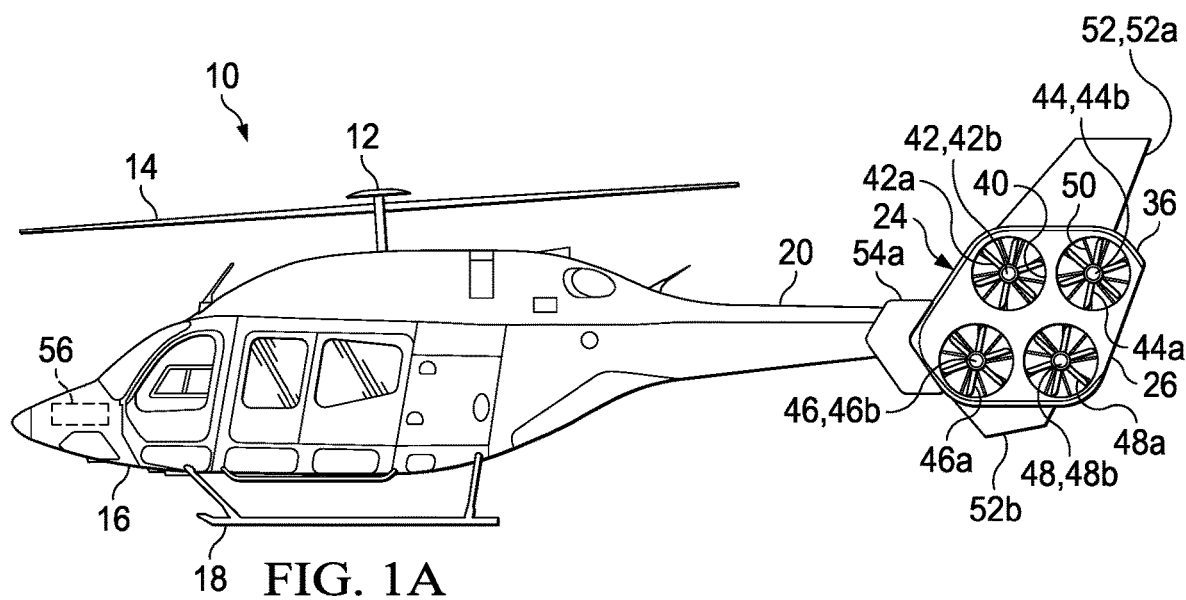
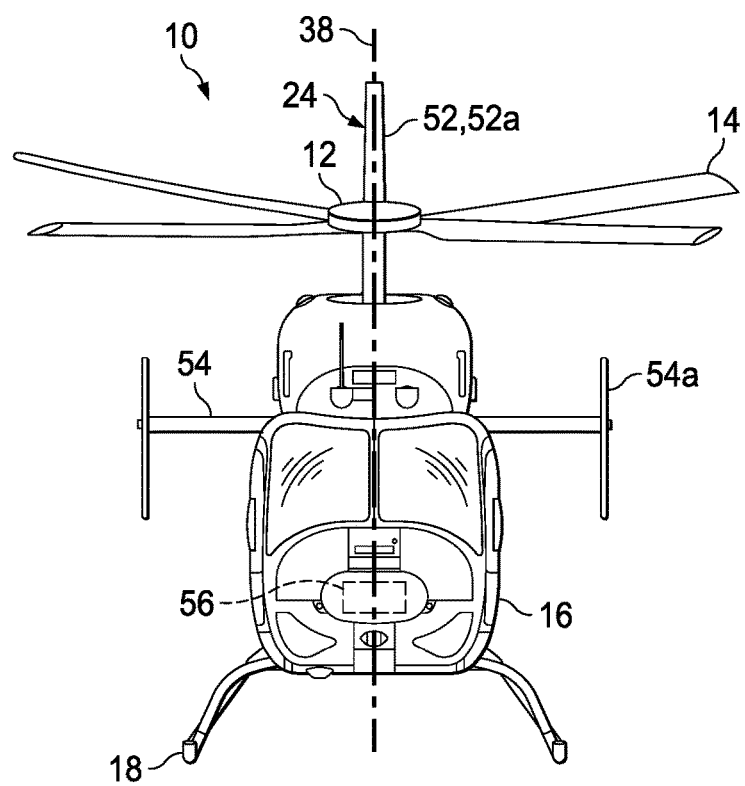
FIG. 1A
FIG. 1B

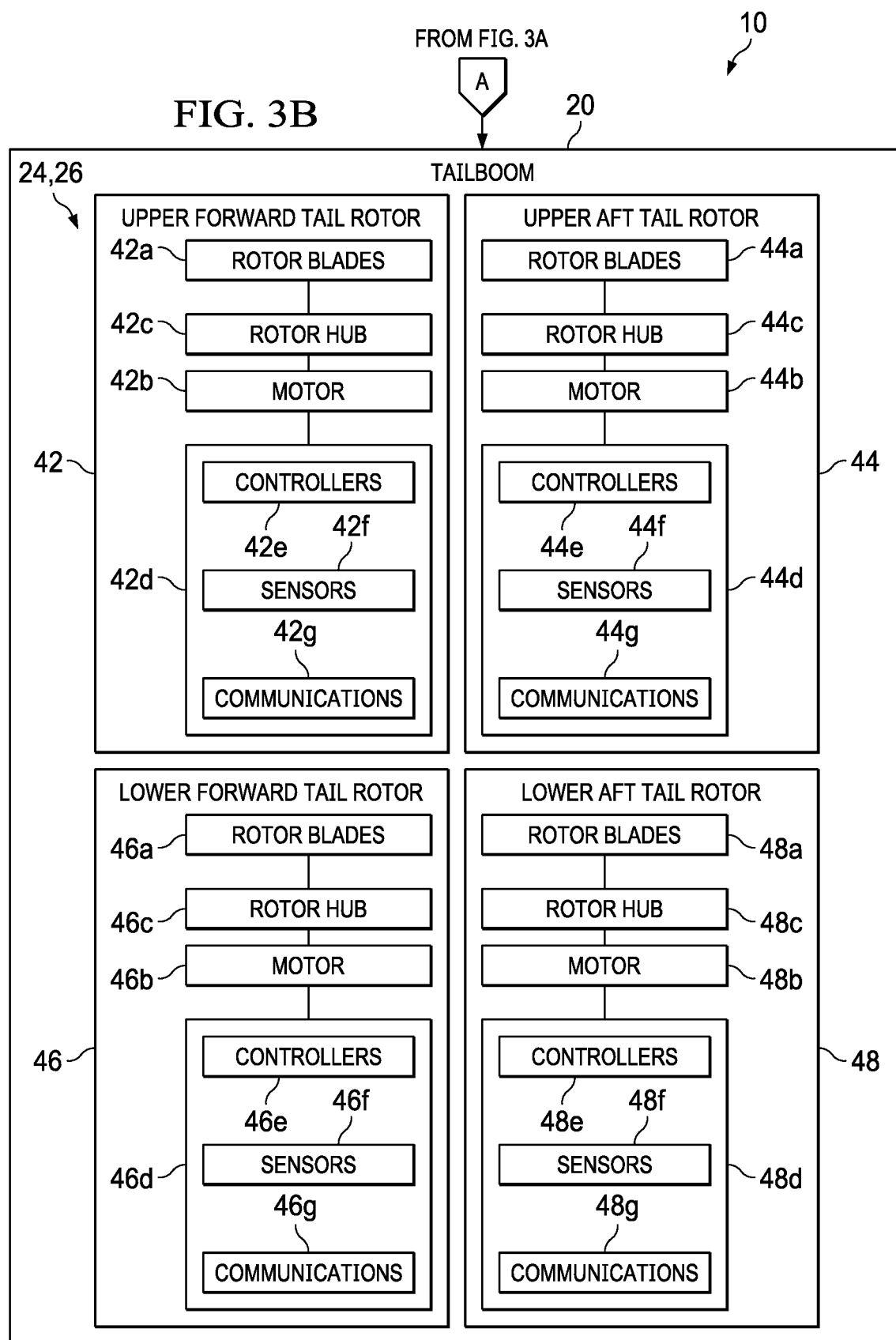

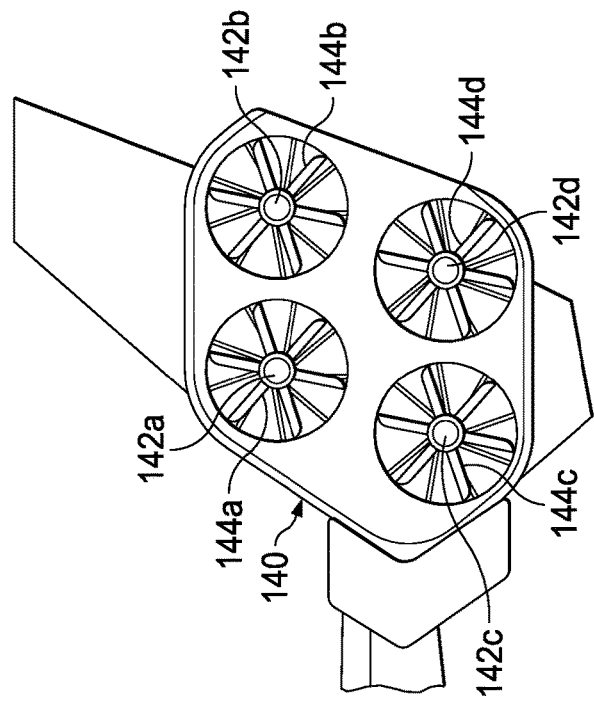
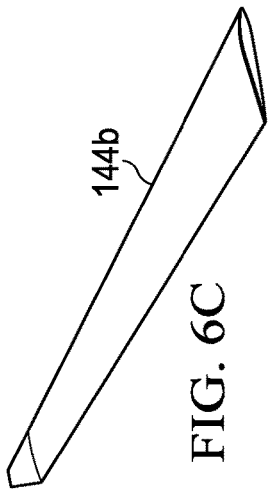
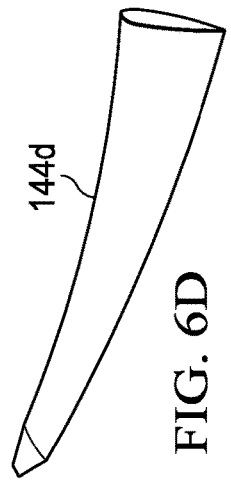
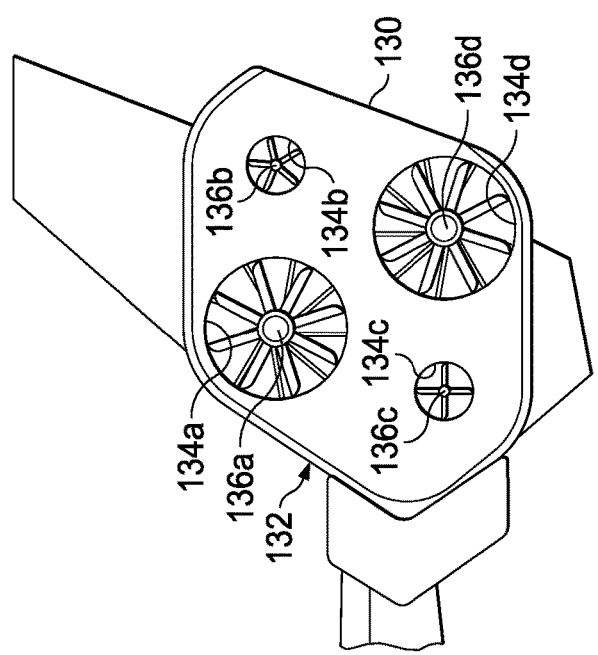
FIG. 6B
FIG. 6C
FIG. 6D
FIG. 6A

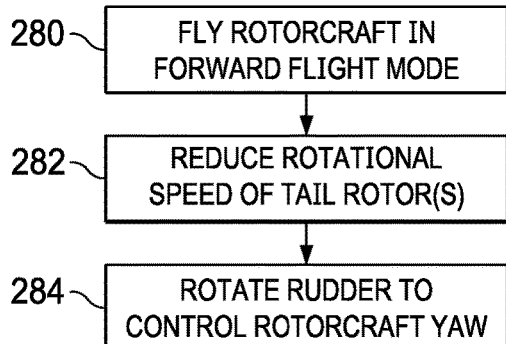
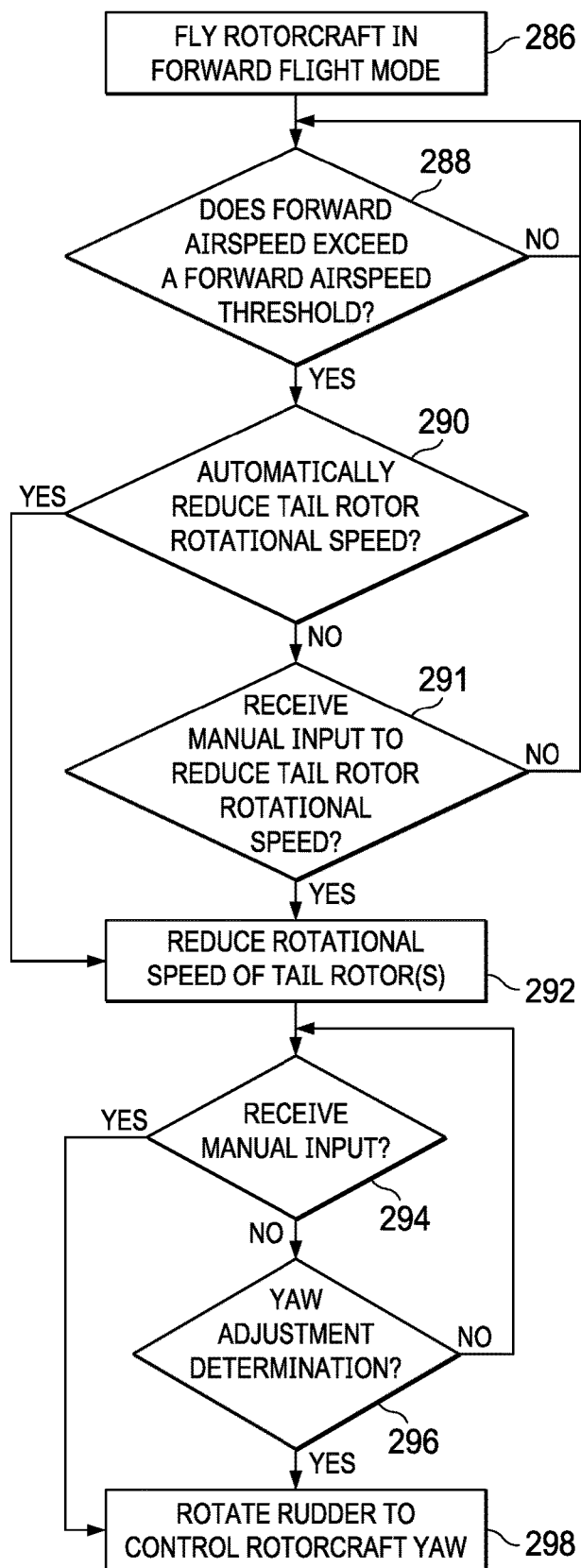
FIG. 11A
FIG. 11B

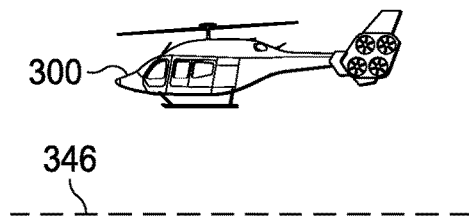
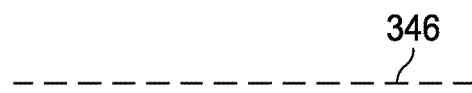
FIG. 13A  FIG. 13B
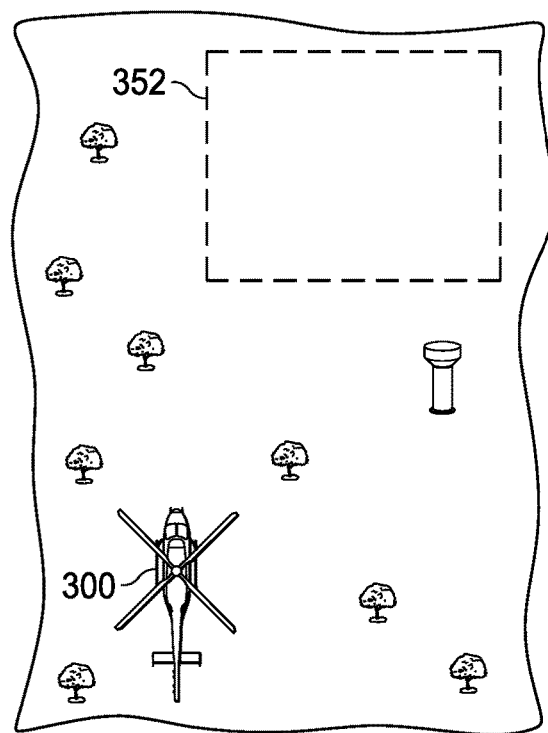
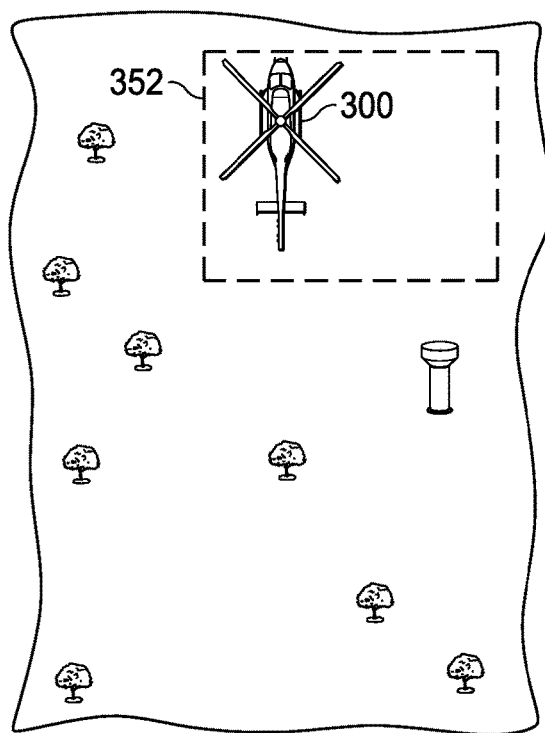
FIG. 13C  FIG. 13D

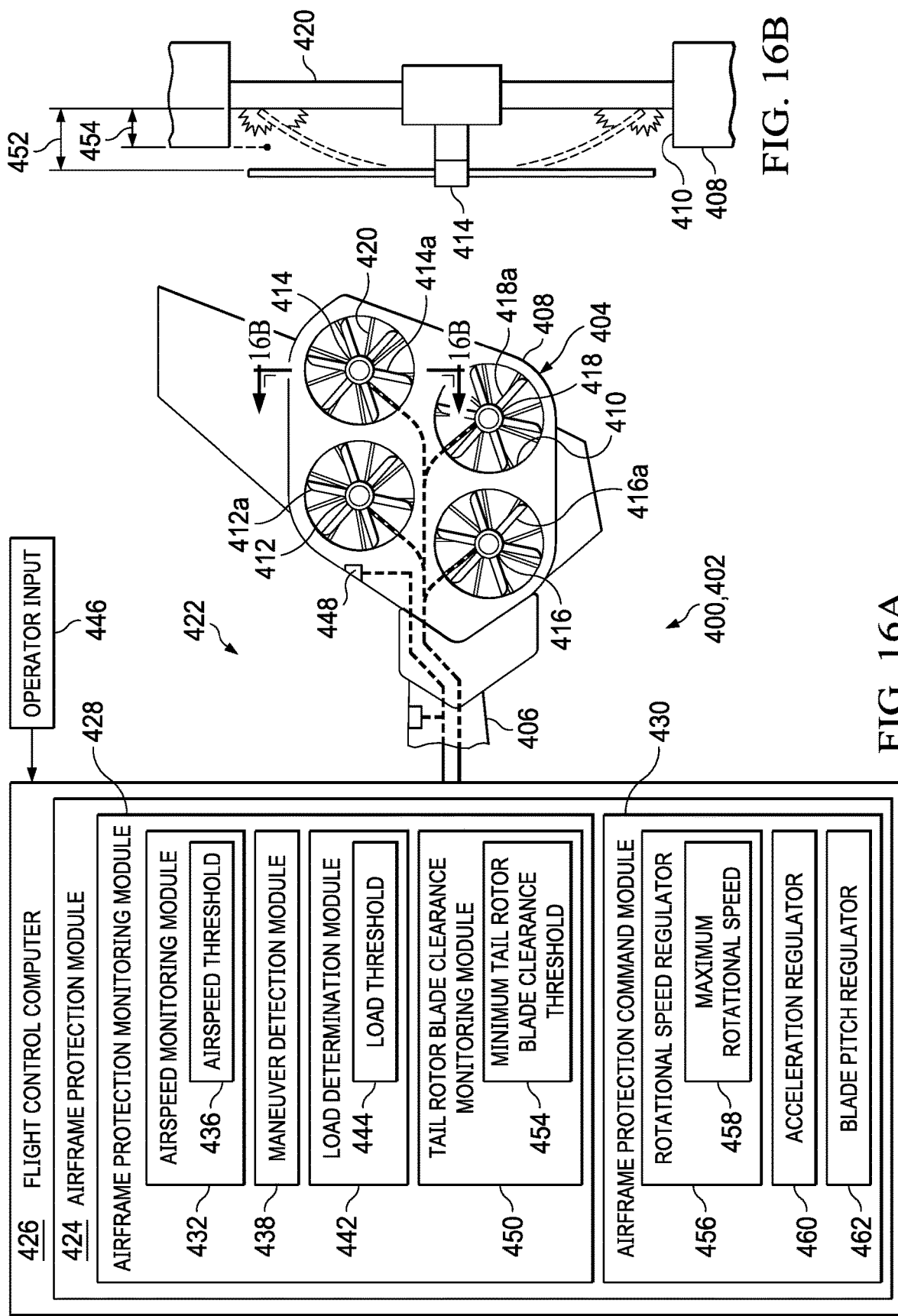

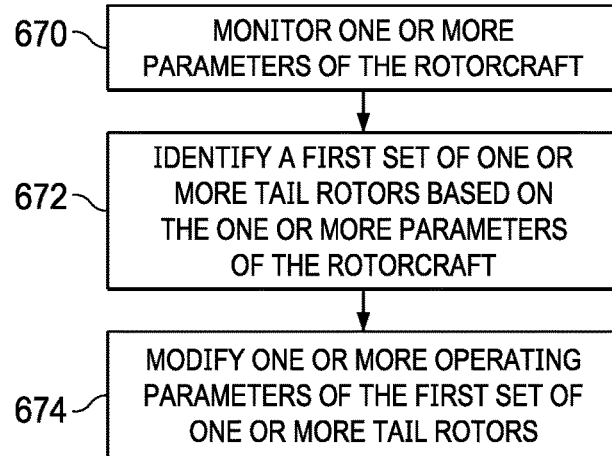
FIG. 26A
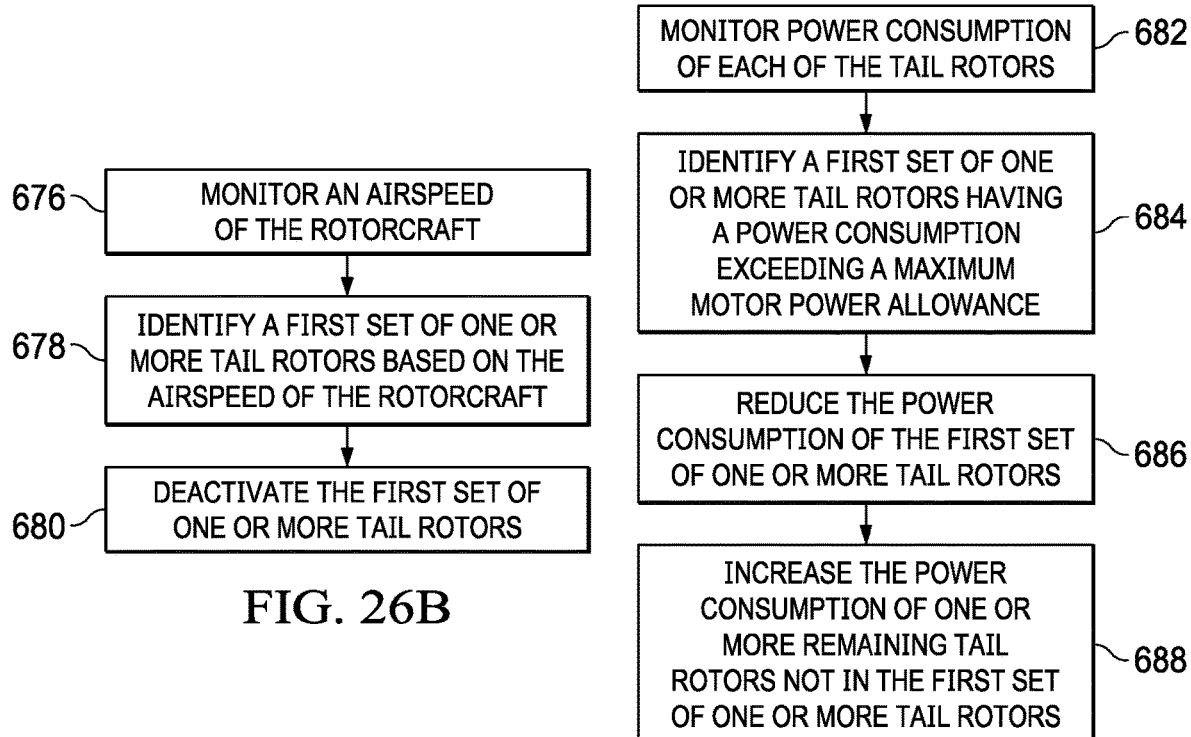
FIG. 26B
FIG. 26C

ROTORCRAFT QUIET MODES

TECHNICAL FIELD OF THE DISCLOSURE

The present disclosure relates, in general, to yaw control systems for use on aircraft and, in particular, to rotorcraft yaw control systems with one or more tail rotors selectively switchable into a quiet mode to reduce the noise emitted by the rotorcraft.

BACKGROUND

The main rotor of a helicopter, which produces lift necessary for flight, also produces a counteracting torque force on the fuselage of the helicopter, turning the tailboom of the helicopter in the opposite direction of the main rotor. The helicopter's tail rotor, located on a tailboom aft of the main rotor, is used to counteract this torque and control the yaw of the helicopter during flight. Tail rotors are normally mounted on a horizontal axis perpendicular to the direction of flight of the helicopter. The tail rotor blades of conventional tail rotors change pitch to control anti-torque thrust direction and intensity, although some tail rotors include fixed pitch tail rotor blades. Most conventional tail rotors are rotationally driven by an engine mechanically linked to the tail rotor by a gearbox and a driveshaft extending through the tailboom.

Traditional tail rotors suffer from several drawbacks. For example, current tail rotors may be prone to blade stall within their operational envelopes. Also, the main rotor of a helicopter produces a transverse airflow while the tail rotor may be driven at high angular velocities to provide adequate aerodynamic responses to such airflow. Sometimes, vortices produced by the main rotor of the helicopter and the tail rotor can interact to reduce the efficiency of the thrust created by the rotors. Traditional tail rotors can also be a significant source of noise in current helicopters, thus diminishing effectiveness when a reduced noise environment is preferable such as during air reconnaissance or clandestine operations or in urban environments. For example, the interference of the vortices produced by the main rotor of the helicopter and the tail rotor may cause an increase in noise. In addition, although the anti-torque requirement of a helicopter is significantly less in forward flight than in hover, many current tail rotors continue to rotate at high speed in forward flight, thus producing unnecessary noise both directly by the spinning blades and indirectly via transmission noise. Some tail rotors may also pose a threat to the structural integrity of the helicopter. For example, sharp changes in the anti-torque load of a tail rotor in some flight conditions may result in structural damage to the airframe of the helicopter or to the tail rotor itself. The power consumption characteristics of tail rotors can also vary dramatically depending on various factors such as the flight mode of the helicopter. Current helicopters require power sources that are sized to provide peak power values even though such power values are unnecessary in most modes of flight. In addition, for helicopters having multiple tail rotors, the power consumption, load or other operating parameters of the respective tail rotors can differ from one another, sometimes causing severe imbalances affecting the efficiency of the tail rotors. Current helicopters fail to balance such operating parameters of the tail rotors during flight to improve efficiency. Accordingly, a need has arisen for improved yaw control systems that address these and other drawbacks of current tail rotors.

SUMMARY

In a first aspect, the present disclosure is directed to a yaw control system for a helicopter having a tailboom including one or more tail rotors rotatably coupled to the tailboom and a quiet mode controller. The quiet mode controller includes a noise monitoring module configured to monitor one or more flight parameters of the helicopter and a quiet mode command module configured to selectively switch the one or more tail rotors to a quiet mode based on the one or more flight parameters. The quiet mode command module is also configured to modify one or more operating parameters of the one or more tail rotors in the quiet mode to reduce noise emitted by the helicopter.

In some embodiments, the noise monitoring module may include an altitude monitoring module to monitor the altitude of the helicopter, the quiet mode command module switching the one or more tail rotors to the quiet mode when the altitude of the helicopter is less than an altitude threshold. In certain embodiments, the noise monitoring module may include a location monitoring module to monitor the location of the helicopter, the quiet mode command module switching the one or more tail rotors to the quiet mode based on the location of the helicopter. In some embodiments, the quiet mode command module may switch the one or more tail rotors to the quiet mode when the helicopter enters an urban location. In certain embodiments, the one or more flight parameters monitored by the noise monitoring module may include the airspeed of the helicopter, the ambient temperature during flight and/or the ambient air density during flight. In such embodiments, the quiet mode command module may switch the one or more tail rotors to the quiet mode based on at least one of the airspeed of the helicopter, the ambient temperature during flight or the ambient air density during flight. In some embodiments, the one or more flight parameters monitored by the noise monitoring module may include manual input from an operator of the helicopter, the quiet mode command module switching the one or more tail rotors to the quiet mode based on the manual input. In certain embodiments, the quiet mode command module may include a rotational speed regulator to modify a maximum rotational speed of the one or more tail rotors, the rotational speed regulator limiting the rotational speed of the one or more tail rotors to the maximum rotational speed in the quiet mode.

In some embodiments, the quiet mode command module may include a rotational speed regulator to modify the rotational speed of the one or more tail rotors in the quiet mode. In certain embodiments, the rotational speed regulator may reduce the rotational speed of the one or more tail rotors in the quiet mode. In some embodiments, the quiet mode command module may include an acceleration regulator to modify a maximum angular acceleration of the one or more tail rotors, the acceleration regulator limiting angular acceleration of the one or more tail rotors to the maximum angular acceleration in the quiet mode. In certain embodiments, the quiet mode command module may include an acceleration regulator to modify a maximum angular deceleration of the one or more tail rotors, the acceleration regulator limiting angular deceleration of the one or more tail rotors to the maximum angular deceleration in the quiet mode. In some embodiments, the one or more tail rotors may be rotatable in a first rotational direction to provide anti-torque thrust and a second, opposite rotational direction to provide pro-torque thrust, the one or more tail rotors reversing rotational direction at a motor reversal set point. In such embodiments, the quiet mode command module may include a motor reversal set point regulator to modify the motor reversal set point of the one or more tail rotors in the quiet mode.

In a second aspect, the present disclosure is directed a rotorcraft including a fuselage, a tailboom extending from the fuselage and a yaw control system. The yaw control system includes a shroud coupled to the aft portion of the tailboom and forming one or more ducts, one or more tail rotors disposed in the one or more ducts and a flight control computer implementing a quiet mode controller. The quiet mode controller includes a noise monitoring module configured to monitor one or more flight parameters of the rotorcraft and a quiet mode command module configured to selectively switch the one or more tail rotors to a quiet mode based on the one or more flight parameters. The quiet mode command module is configured to modify one or more operating parameters of the one or more tail rotors in the quiet mode to reduce noise emitted by the rotorcraft.

In some embodiments, the one or more tail rotors may include a plurality of tail rotors each having operating parameters. In such embodiments, the quiet mode command module may be configured to nonuniformly modify the operating parameters of the tail rotors based on the size and/or the position of each tail rotor. In certain embodiments, the quiet mode command module may switch the one or more tail rotors to the quiet mode when the one or more flight parameters traverse a regulatory threshold. In some embodiments, the rotorcraft may include a power system including a generator and a battery. In such embodiments, the quiet mode command module may include a power regulation module to reduce power supplied by the generator to the one or more tail rotors and increase power supplied by the battery to the one or more tail rotors in the quiet mode.

In a third aspect, the present disclosure is directed to a method for managing noise emitted by one or more tail rotors of a rotorcraft including detecting one or more flight parameters of the rotorcraft; switching the one or more tail rotors to a quiet mode based on the one or more flight parameters; and modifying one or more operating parameters of the one or more tail rotors in the quiet mode to reduce noise emitted by the rotorcraft.

In some embodiments, the method may include calculating a noise signature of the one or more tail rotors based on the one or more flight parameters and the one or more operating parameters. In such embodiments, switching the one or more tail rotors to the quiet mode based on the one or more flight parameters may include switching the one or more tail rotors to the quiet mode in response to the noise signature exceeding a noise signature threshold. In certain embodiments, the method may include comparing the one or more flight parameters with one or more flight parameter thresholds. In such embodiments, switching the one or more tail rotors to the quiet mode based on the one or more flight parameters may include switching the one or more tail rotors to the quiet mode based on the comparison between the one or more flight parameters and the one or more flight parameter thresholds. In some embodiments, the method may include detecting a maneuver being performed by the rotorcraft, wherein the one or more operating parameters are modified in the quiet mode based at least partially on the maneuver.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1C are schematic illustrations of a rotorcraft having a yaw control system in accordance with embodiments of the present disclosure;

FIGS. 3A-3B are block diagrams of a propulsion and control system for a rotorcraft having a yaw control system in accordance with embodiments of the present disclosure;

FIGS. 6A-6M are various views of yaw control systems for rotorcraft including yaw control matrices having different configurations in accordance with embodiments of the present disclosure;

FIGS. 11A-11B are flowcharts of various methods for controlling the yaw of a rotorcraft using a rudder in accordance with embodiments of the present disclosure;

FIGS. 13A-13D are various views of a rotorcraft having a yaw control system in different flight operating scenarios in accordance with embodiments of the present disclosure;

FIGS. 16A-16B are schematic illustrations of a yaw control system for a rotorcraft including an airframe protection system in accordance with embodiments of the present disclosure;

FIGS. 26A-26C are flowcharts of various methods for operating the tail rotors of a rotorcraft having a yaw control system in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1C:
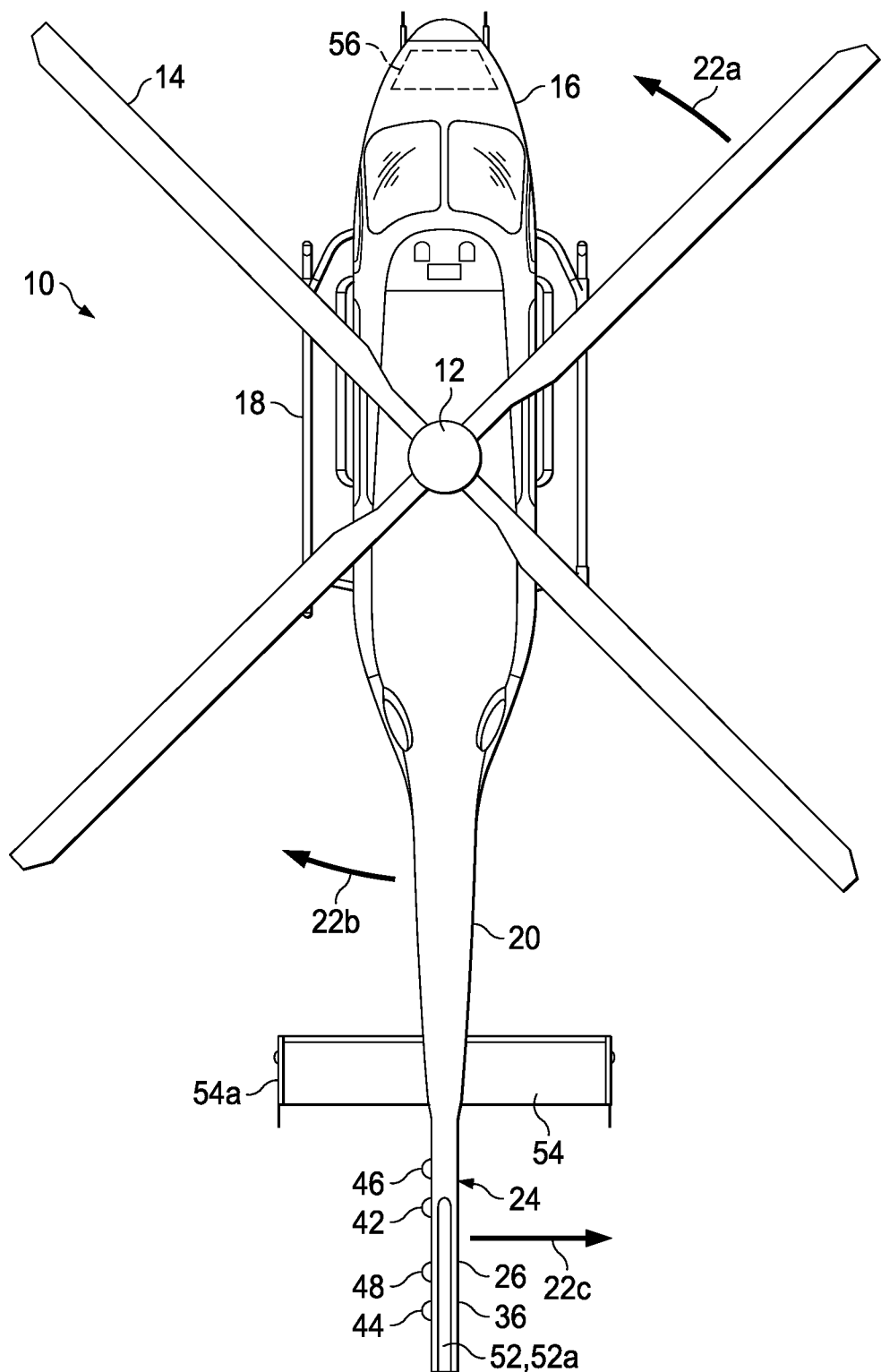

Referring to FIGS. 1A-1C in the drawings, a rotorcraft is schematically illustrated and generally designated 10. In the illustrated embodiment, rotorcraft 10 is depicted as a helicopter having a main rotor 12, which includes a plurality of rotor blades 14. Main rotor 12 is rotatable relative to a fuselage 16. The pitch of rotor blades 14 can be collectively and/or cyclically manipulated to selectively control direction, thrust and lift of rotorcraft 10. A landing gear system 18 provides ground support for rotorcraft 10. A tailboom 20 extends in an aft direction from fuselage 16. Main rotor 12 rotates in a direction indicated by arrow 22a, which produces a torque on fuselage 16 in a direction indicated by arrow 22b. Rotorcraft 10 has a yaw control system 24 including a yaw control matrix 26 coupled to an aft portion of tailboom 20. Yaw control system 24 produces anti-torque thrust 22c to counteract torque 22b and generally controls the yaw of rotorcraft 10 in various flight modes.

Figure 2:
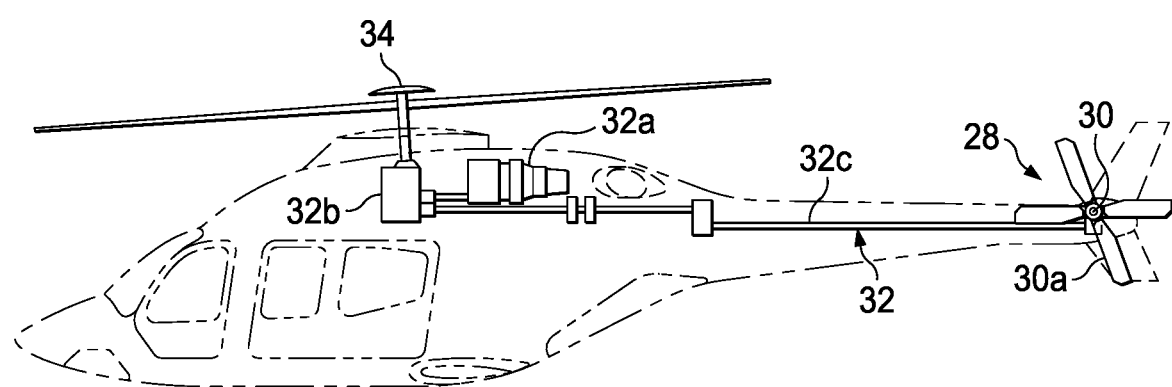
FIG. 2 is a side view of an anti-torque system used on previous aircraft.

Referring to FIG. 2 in conjunction with FIGS. 1A-1C in the drawings, an anti-torque system 28 used in previous aircraft is depicted. Traditional anti-torque systems such as anti-torque system 28 include a single tail rotor 30 having variable pitch tail rotor blades 30a. Tail rotor 30 is rotated at a fixed rotational speed by a mechanical drivetrain 32 including an engine 32a, a gearbox 32b and one or more driveshafts 32c. Tail rotor 30 also includes a pitch control assembly (not shown) that adjusts the pitch of variable pitch tail rotor blades 30a to vary the anti-torque thrust produced by tail rotor 30, thereby controlling the yaw of the helicopter during flight. Anti-torque system 28 suffers from several drawbacks. For example, tail rotor 30 may be prone to blade stall within its operational envelope. In addition, main rotor 34 produces a transverse airflow. Tail rotor 30 must sometimes be driven at high angular velocities to provide adequate aerodynamic responses to such airflow. Vortices produced by tail rotor 30 and main rotor 34 can interact to reduce the efficiency of the thrust produced by both rotors 30, 34. Tail rotor 30 can also be a significant source of noise, thus diminishing effectiveness when a reduced noise environment is preferable such as during air reconnaissance or clandestine operations. For example, the interference of the vortices produced by tail rotor 30 and main rotor 34 may cause an increase in noise. In addition, tail rotor 30 continues to rotate at high speed in forward flight, thus producing unnecessary noise generated both directly by the spinning of tail rotor blades 30a and indirectly via noise from gearbox 32b. Tail rotor 30 may also pose a threat to the structural integrity of the helicopter. For example, sharp changes in the anti-torque load of tail rotor 30 in some flight conditions may result in structural damage to the airframe of the helicopter or to tail rotor 30 itself. The power consumption characteristics of tail rotor 30 can also vary dramatically depending on various factors such as the flight mode of the helicopter. Current helicopters require power sources that are sized to provide peak power values even though such power values are unnecessary in most modes of flight.

Referring back to FIGS. 1A-1C, yaw control system 24 of rotorcraft 10 addresses these and other drawbacks of current anti-torque systems. Yaw control matrix 26 of yaw control system 24 includes a shroud 36 having a generally parallelogram or rhombus shape configuration, although shroud 36 may form any general shape. Shroud 36 is vertically oriented and therefore substantially aligned with centerline 38 of rotorcraft 10 when viewed from the front. In other embodiments, shroud 36 may be canted, or form an angle, relative to centerline 38. Shroud 36 forms ducts 40 in which tail rotors 42, 44, 46, 48 are disposed including upper forward tail rotor 42, upper aft tail rotor 44, lower forward tail rotor 46 and lower aft tail rotor 48. While four tail rotors 42, 44, 46, 48 are illustrated, yaw control system 24 may include any number of tail rotors such as two, three, five or more tail rotors. Shroud 36 increases safety for ground personnel and crew by preventing contact with spinning tail rotors 42, 44, 46, 48. It will be appreciated by one of ordinary skill in the art, however, that all or some of tail rotors 42, 44, 46, 48 may be open or non-ducted tail rotors that lack a shroud.

As illustrated, yaw control system 24 is an electrically distributed yaw control system in which each tail rotor 42, 44, 46, 48 has fixed pitch tail rotor blades 42a, 44a, 46a, 48a and a variable rotational speed motor 42b, 44b, 46b, 48b secured by stators, or spokes, 50. Each motor 42b, 44b, 46b, 48b may be operated individually or in any combination in either or both rotational directions to provide anti-torque or pro-torque forces for stabilizing the yaw of rotorcraft 10. In other embodiments, tail rotors 42, 44, 46, 48 may be variable pitch, fixed rotational speed or variable pitch, variable rotational speed tail rotor systems that are electrically, mechanically or hydraulically driven. In such embodiments, each tail rotor 42, 44, 46, 48 may include a pitch control assembly driven by an electrical or hydraulic actuator that changes the pitch of tail rotor blades 42a, 44a, 46a, 48a to adjust thrust. In other embodiments, the pitch control assembly may also be operated with mechanical linkages, bell cranks and/or other mechanical members without any actuators. It will be appreciated by one of ordinary skill in the art in view of the illustrative embodiments disclosed herein that yaw control matrix 26 may have any number of ducts and tail rotors forming, along with shroud 36, any shape or spatial positioning configuration. Yaw control system 24 may also include a combination of fixed pitch and variable pitch tail rotors. Yaw control system 24 includes a vertical fin 52, of which a top portion 52a is coupled to the top side of shroud 36 and a smaller bottom portion 52b is coupled to the bottom side of shroud 36. Bottom portion 52b of vertical fin 52 may be utilized as a bumper during takeoff and landing. A horizontal stabilizer 54 coupled to tailboom 20 includes stabilizer fins 54a to provide additional yaw stability in forward flight.

Yaw control system 24 manages the yaw of rotorcraft 10 throughout the various flight modes of rotorcraft 10. For example, in hover mode yaw control matrix 26 manages the yaw of rotorcraft 10 by producing anti-torque thrust 22c to counteract torque 22b on fuselage 16 caused by rotation 22a of main rotor 12. In hover mode yaw control matrix 26 may also provide maneuverability and trim to the operations of rotorcraft 10. Yaw control matrix 26 may also produce pro-torque thrust in the same direction as torque 22b on fuselage 16 for certain maneuvers such as quick turn maneuvers. During hover, the thrust vectors produced by tail rotors 42, 44, 46, 48 may be in a uniform or nonuniform direction. For example, one set of one or more tail rotors 42, 44, 46, 48 may direct their thrust in one direction such as in anti-torque direction 22c while a different set of one or more tail rotors 42, 44, 46, 48 direct their thrust in the opposite direction such as a pro-torque direction to provide finer rotational control for rotorcraft 10. The speed of each motor 42b, 44b, 46b, 48b may also be varied under the control of logic in a flight control computer 56 that calculates the optimum thrust magnitude for each tail rotor 42, 44, 46, 48 to achieve a desired yaw orientation. Flight control computer 56 also implements one or more systems or modules that control the operation of yaw control system 24 to achieve various objectives such as noise reduction, thrust efficiency, airframe protection, load balancing and power consumption balancing, among others. Vertical fin 52 and stabilizer fins 54a provide rotorcraft 10 with yaw stability in forward flight. Yaw control matrix 26 may be selectively engaged to emit various thrust magnitudes in either direction during forward flight depending on the yaw adjustment requirements of rotorcraft 10. Yaw control matrix 26 also provides yaw stability for rotorcraft 10 during maneuvers such as sideward flight, sharp turns, climbs and descents.

It should be appreciated that rotorcraft 10 is merely illustrative of a variety of aircraft that can implement the embodiments disclosed herein. Indeed, the illustrative embodiments of yaw control system 24 described herein may be implemented on any aircraft that experiences yaw movement. Other aircraft implementations can include vertical takeoff and landing (VTOL) aircraft including electric VTOL (eVTOL) aircraft, hybrid aircraft, tiltrotor aircraft, tiltwing aircraft, quad tiltrotor aircraft, unmanned aircraft, gyrocopters, drones, quadcopters, airplanes including propeller-driven airplanes, compound helicopters, jets and the like. The illustrative embodiments of yaw control system 24 described herein may also be utilized on any rotorcraft having a distributed propulsion system with two or more rotors powered by an electrical, hydraulic, mechanical or other energy source. As such, those skilled in the art will recognize that the illustrative embodiments of yaw control system 24 described herein can be integrated into a variety of aircraft configurations. It should be appreciated that even though aircraft are particularly well-suited to implement the embodiments of the present disclosure, non-aircraft vehicles and devices can also implement the embodiments.

Figure 3A:
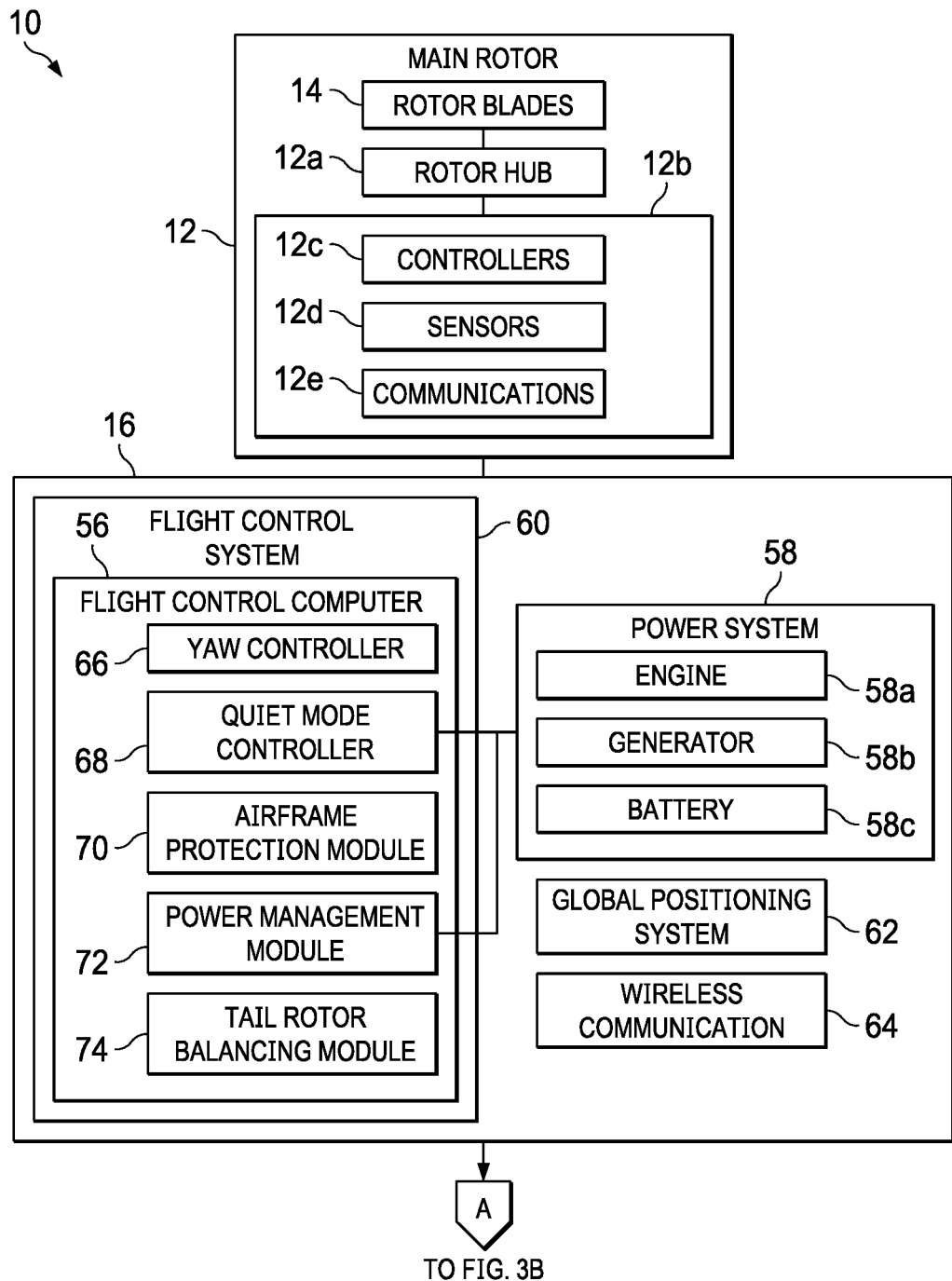

Referring to FIGS. 3A-3B in the drawings, various systems of rotorcraft 10 are depicted. Main rotor 12 includes a rotor hub 12a with rotor blades 14 radiating therefrom and an electronics node 12b including, for example, controllers 12c, sensors 12d and communications elements 12e, as well as other components suitable for use in the operation of main rotor 12. In some embodiments, rotor hub 12a includes one or more actuators (not shown) to adjust the collective and/or cyclic pitch of rotor blades 14. Fuselage 16 houses a power system 58 including an engine 58a, generator 58b and one or more batteries 58c to power the various systems of rotorcraft 10. Main rotor 12 is powered by engine 58a via a drivetrain that may include one or more gearboxes and driveshafts.

Rotorcraft 10 also includes yaw control matrix 26 coupled to tailboom 20 depicted as upper forward tail rotor 42, upper aft tail rotor 44, lower forward tail rotor 46 and lower aft tail rotor 48. Each tail rotor 42, 44, 46, 48 includes tail rotor blades 42a, 44a, 46a, 48a radiating from a tail rotor hub 42c, 44c, 46c, 48c. Each tail rotor 42, 44, 46, 48 also includes electronics nodes 42d, 44d, 46d, 48d depicted as having one or more controllers 42e, 44e, 46e, 48e such as a motor controller, one or more sensors 42f, 44f, 46f, 48f that may be used, for example, to detect operating parameters of tail rotors 42, 44, 46, 48 and communications elements 42g, 44g, 46g, 48g enabling tail rotors 42, 44, 46, 48 to send and receive data amongst each other and with other parts of rotorcraft 10. Each tail rotor 42, 44, 46, 48 includes at least one variable speed electric motor 42b, 44b, 46b, 48b. Tail rotor hubs 42c, 44c, 46c, 48c are coupled to the output drives of motors 42b, 44b, 46b, 48b. Tail rotor blades 42a, 44a, 46a, 48a are fixed pitch tail rotor blades that emit variable thrust proportional to the rotational speeds of motors 42b, 44b, 46b, 48b. In other embodiments, tail rotors 42, 44, 46, 48 may include variable pitch tail rotor blades that are electrically, mechanically or hydraulically driven at a fixed or variable rotational speed with the variable pitch tail rotor blades being actuated using an electrical or mechanical pitch control system. Power system 58 serves as the electrical energy source for tail rotors 42, 44, 46, 48 including motors 42b, 44b, 46b, 48b and electronics nodes 42d, 44d, 46d, 48d.

For example, tail rotors 42, 44, 46, 48 may be powered by generator 58*b* and/or battery 58*c*.

Battery 58*c* may be charged by an electrical energy generation system such as engine 58*a* and generator 58*b* or may be charged at a ground station. Battery 58*c* may also be interchangeably removed and installed to enable efficient refueling which may be particularly beneficial in embodiments of rotorcraft 10 wherein the sole electrical energy source is battery 58*c*. In embodiments that include an electrical energy generation system such as engine 58*a* and generator 58*b* housed within fuselage 16, the electrical energy generation system may include one or more fuel tanks such as liquid fuel tanks. In one non-limiting example, engine 58*a* may be used to drive electric generator 58*b*, which produces electrical energy that is fed to tail rotors 42, 44, 46, 48 to power motors 42*b*, 44*b*, 46*b*, 48*b* and electronics nodes 42*d*, 44*d*, 46*d*, 48*d*. Rotorcraft 10 may implement a hybrid power system including both engine 58*a* and battery 58*c*. This type of hybrid power system may be beneficial in that the energy density of liquid fuel exceeds that of batteries enabling greater endurance for rotorcraft 10. In the hybrid power system, battery 58*c* may provide a backup electrical power source to enable rotorcraft 10 to safely land in the event of a failure of engine 58*a*. In other embodiments, all propulsion systems of rotorcraft 10 including main rotor 12 and tail rotors 42, 44, 46, 48 are powered exclusively by battery 58*c*. In yet other embodiments, each tail rotor 42, 44, 46, 48 may include a respective battery to provide backup battery power in the event of a failure of power system 58. As another alternative, tail rotors 42, 44, 46, 48 may include hydraulic motors operating within a common hydraulic fluid system wherein one or more high pressure hydraulic sources or generators are housed within fuselage 16 to provide power to each of the hydraulic motors.

Rotorcraft 10 includes a flight control system 60 housed within fuselage 16. Flight control system 60, such as a digital flight control system, may preferably be a redundant flight control system and more preferably a triply redundant flight control system having independent flight control computers including flight control computer 56. Use of a dual, triple or more redundant flight control system 60 improves the overall safety and reliability of rotorcraft 10 in the event of a failure of flight control system 60. Flight control system 60 preferably includes non-transitory computer readable storage media including a set of computer instructions executable by one or more processors for controlling the operation of main rotor 12 and yaw control system 24. Flight control system 60 may be implemented on one or more general purpose computers, special purpose computers or other machines with memory or processing capability. For example, flight control system 60 may include one or more memory storage modules including, but not limited to, internal storage memory such as random access memory, non-volatile memory such as read only memory, removable memory such as magnetic storage memory, optical storage, solid-state storage memory or other suitable memory storage. Flight control system 60 may be a microprocessor-based system operable to execute program code in the form of machine executable instructions. In addition, flight control system 60 may be selectively connectable to other computer systems via a proprietary encrypted network, a public encrypted network, the Internet or other suitable communication network that may include both wired and wireless connections.

Flight control system 60 may be in electrical, mechanical, wired, wireless, computer, hydraulic or any other type of communication with electronics node 12*b* of main rotor 12, electronics nodes 42*d*, 44*d*, 46*d*, 48*d* of tail rotors 42, 44, 46, 48 and other parts of rotorcraft 10. For example, flight control system 60 may communicate via a wired and/or wireless communications network with electronics nodes 42*d*, 44*d*, 46*d*, 48*d* of tail rotors 42, 44, 46, 48. In some embodiments, any combination of electronics nodes 12*b*, 42*d*, 44*d*, 46*d*, 48*d* may instead be combined and centralized into fuselage 16. Flight control system 60 receives sensor data from and sends flight command information to electronics nodes 42*d*, 44*d*, 46*d*, 48*d* of tail rotors 42, 44, 46, 48 such that each tail rotor 42, 44, 46, 48 may be individually and independently controlled and operated. Flight control system 60 is configured to receive inputs from flight sensors 12*d*, 42*f*, 44*f*, 46*f*, 48*f* such as, but not limited to, gyroscopes, accelerometers or any other suitable sensing equipment configured to provide flight control system 60 with spatial, positional or force dynamics information, feedback or other data that may be utilized to manage the operation of rotorcraft 10. For example, flight control system 60 may use sensor data from flight sensors 42*f* to generate and send flight command information to electronics node 42*d* to control upper forward tail rotor 42.

Rotorcraft 10 may include global positioning system 62 configured to determine, receive and/or provide data related to the location of rotorcraft 10 including flight destinations, targets, no-fly zones, preplanned routes, flight paths or any other geospatial location-related information. Global positioning system 62 may be configured for bidirectional communication with flight control system 60, unidirectional communication from global positioning system 62 to flight control system 60 or unidirectional communication from flight control system 60 to global positioning system 62. Rotorcraft 10 may include wireless communication components 64 such as radio communication equipment configured to send and receive signals related to flight commands or other operational information. Wireless communication components 64 may be configured to transmit video, audio or other data gathered, observed or otherwise generated, carried by or obtained by rotorcraft 10. In some embodiments, flight control system 60 may also be operable to communicate with one or more remote systems via wireless communication components 64 using a wireless communications protocol. The remote systems may be operable to receive flight data from and provide commands to flight control system 60 to enable flight control over some or all aspects of flight operation. In other embodiments, rotorcraft 10 may instead be a manned or piloted vehicle. In both manned and unmanned missions, flight control system 60 may autonomously control some or all aspects of flight operation. Transitions between the various flight modes may be accomplished responsive to remote flight control, autonomous flight control, onboard pilot flight control or combinations thereof.

Flight control computer 56 implements one or more modules to control the operation of yaw control matrix 26. For example, flight control computer 56 includes a yaw controller 66 to determine the amount by which to change or correct the yaw of rotorcraft 10 and selectively activate tail rotors 42, 44, 46, 48 at various thrust magnitudes to achieve the desired yaw of rotorcraft 10. In some embodiments, yaw control system 24 includes one or more vertical control surfaces such as a rudder rotatably mounted adjacent to yaw control matrix 26. In such embodiments, yaw controller 66 may rotate the rudder in various flight modes of rotorcraft 10 such as the forward flight mode to control the yaw of rotorcraft 10. Flight control computer 56 includes a quiet mode controller 68 configured to selectively activate a quiet mode based on certain flight parameters of rotorcraft 10 to reduce the noise emitted by yaw control matrix 26. Flight control computer 56 includes an airframe protection module 70 that adjusts certain operating parameters of tail rotors 42, 44, 46, 48 to protect the airframe of rotorcraft 10. Flight control computer 56 may also include a power management module 72 configured to allocate power between the various elements of power system 58 and tail rotor motors 42*b*, 44*b*, 46*b*, 48*b* based on certain flight parameters of rotorcraft 10. Flight control computer 56 includes a tail rotor balancing module 74 to balance the power consumption of tail rotors 42, 44, 46, 48 and/or load experienced by tail rotors 42, 44, 46, 48 based on certain flight parameters of rotorcraft 10 and/or operating parameters of tail rotors 42, 44, 46, 48.

Figure 4:
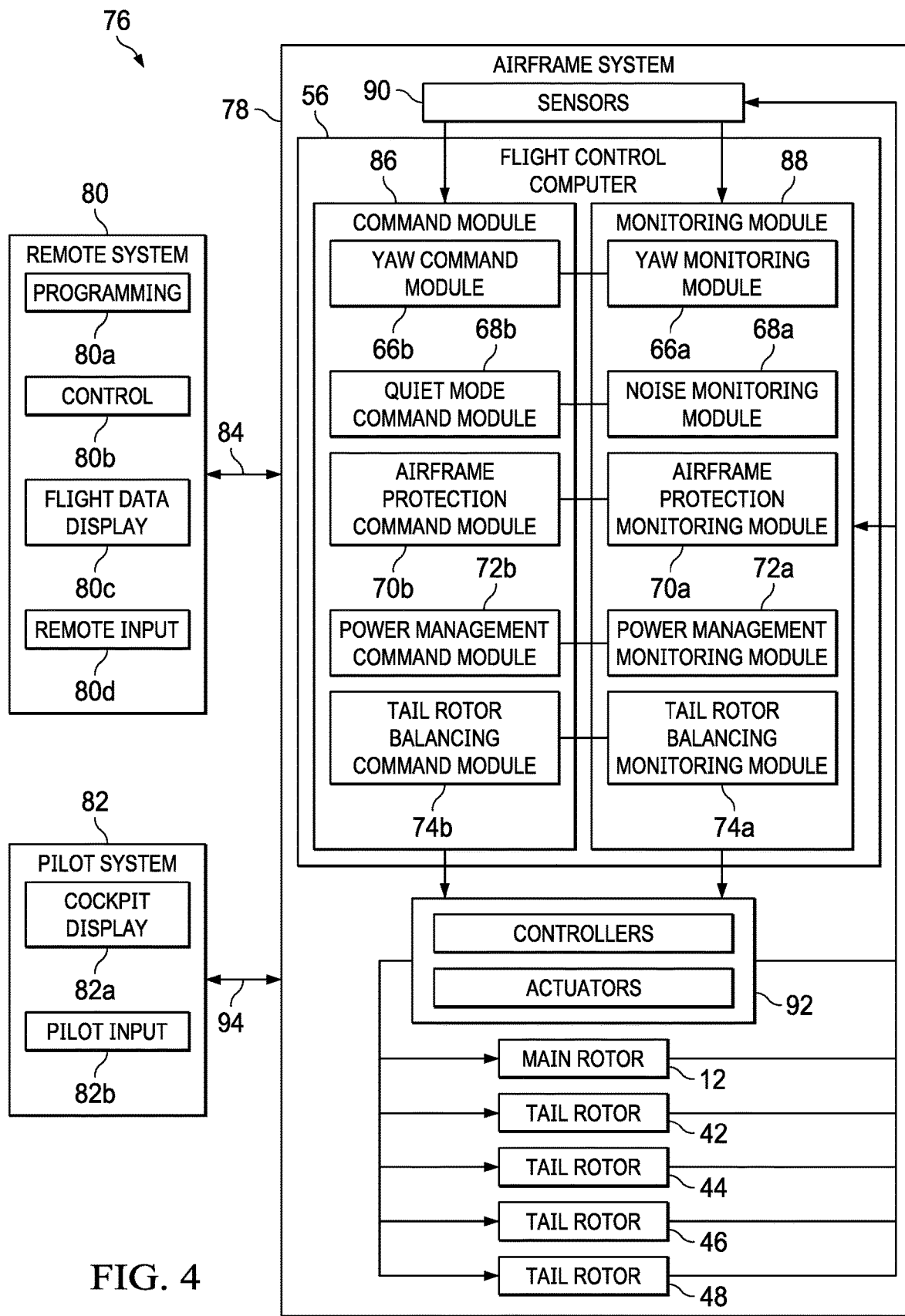
FIG. 4 is a block diagram of a control system for a rotorcraft having a yaw control system in accordance with embodiments of the present disclosure.

Referring additionally to FIG. 4 in the drawings, a block diagram depicts a control system 76 operable for use with rotorcraft 10 of the present disclosure. In the illustrated embodiment, control system 76 includes three primary computer based subsystems; namely, an airframe system 78, a remote system 80 and a pilot system 82. In some implementations, remote system 80 includes a programming application 80*a* and a remote control application 80*b*. Programming application 80*a* enables a user to provide a flight plan and mission information to rotorcraft 10 such that flight control computer 56 may engage in autonomous control over rotorcraft 10. For example, programming application 80*a* may communicate with flight control computer 56 over a wired or wireless communication channel 84 to provide a flight plan including, for example, a starting point, a trail of waypoints and an ending point such that flight control computer 56 may use waypoint navigation during the mission.

In the illustrated embodiment, flight control computer 56 is a computer based system that includes one or more command modules 86 and one or more monitoring modules 88. Flight control computer 56 may include redundant command and/or monitoring modules. It is to be understood by those skilled in the art that these and other modules executed by flight control computer 56 may be implemented in a variety of forms including hardware, software, firmware, special purpose processors and combinations thereof. Flight control computer 56 receives input from a variety of sources including internal sources such as sensors 90, controllers and actuators 92, main rotor 12, tail rotors 42, 44, 46, 48 and external sources such as remote system 80 as well as global positioning system satellites or other location positioning systems and the like. Sensors 90 may include redundant sensors. During the various flight modes of rotorcraft 10 including hover mode, forward flight mode and transitions therebetween, command module 86 provides commands to controllers and actuators 92 of main rotor 12 and tail rotors 42, 44, 46, 48. These commands enable independent operation of each tail rotor 42, 44, 46, 48 such as rotational speed, blade pitch and rotational direction as well as others depending on the tail rotor type. Flight control computer 56 receives feedback and sensor measurements from sensors 90, controllers and actuators 92, main rotor 12 and tail rotors 42, 44, 46, 48. This feedback is processed by monitoring module 88, which can supply data and other information to command module 86 and/or controllers and actuators 92. Sensors 90, such as strain sensors, distance sensors, accelerometers, vibration sensors, location sensors, attitude sensors, altitude sensors, airspeed sensors, environmental sensors, fuel sensors, temperature sensors and the like also provide information to flight control computer 56 to further enhance autonomous control capabilities.

Monitoring module 88 includes a yaw monitoring module 66*a* to determine an amount by which to change or correct the yaw of rotorcraft 10. In determining the yaw adjustment for rotorcraft 10, yaw monitoring module 66*a* may utilize sensors 90 such as a yaw rate sensor and/or a yaw position sensor. A yaw command module 66*b* of command module 86 modifies the yaw of rotorcraft 10 using tail rotors 42, 44, 46, 48. Yaw command module 66*b* may determine the magnitudes of the thrusts from tail rotors 42, 44, 46, 48 that are required to achieve the desired yaw of rotorcraft 10 as determined by yaw monitoring module 66*a*. Yaw command module 66*b* may also determine how quickly anti-torque or pro-torque thrust must be implemented so that the desired yaw is achieved in a timely manner. Yaw command module 66*b* may also determine whether and how fast to rotate each tail rotor 42, 44, 46, 48, taking into account various characteristics of each tail rotor 42, 44, 46, 48 such as motor size, diameter, position and blade pitch, as well as others. Yaw command module 66*b* thus enhances yaw management of rotorcraft 10 by selectively activating tail rotors 42, 44, 46, 48 depending on the thrust, responsiveness, noise, power, load and/or structural requirements of the operational circumstance. In one non-limiting example, yaw monitoring module 66*a* receives measurements related to the yaw rotation of rotorcraft 10 from sensors 90 such as a rotation sensor. Yaw command module 66*b* may change the respective speed of the variable speed motors of tail rotors 42, 44, 46, 48 to adjust anti-torque or pro-torque thrust to achieve a desired rotation of rotorcraft 10, which may include no rotation.

Yaw command module 66*b* may reference a lookup table of known or estimated torque calculations or formulas for each of the variable speed motors of tail rotors 42, 44, 46, 48 depending on the size of the motor, blade pitch, rotational direction, position in yaw control matrix 26 or other characteristics. The position of each tail rotor 42, 44, 46, 48 in yaw control matrix 26 affects their individual contribution to the rotation of rotorcraft 10. For example, assuming all the variable speed motors and fixed pitch blades are of equivalent size and power, then the variable speed motors and fixed pitch blades in the aft-most position will have the greatest effect on rotorcraft anti-torque, while variable speed motors and fixed pitch blades that are forward of other motors will have less overall effect on rotorcraft anti-torque assuming equivalent rotational speed. As such, yaw command module 66*b* may look up the estimated or measured effect on anti-torque for each individual tail rotor motor and then increase or decrease the rotational speed of any combination of tail rotors 42, 44, 46, 48 to adjust the yaw orientation of rotorcraft 10. Yaw monitoring module 66*a* may receive data from a rotation sensor that reflects actual rotorcraft yaw rotation and yaw command module 66*b* may compare the estimated or calculated rotation of rotorcraft 10 versus actual rotation and then adjust the rotational speed of one or more of the variable speed motors of tail rotors 42, 44, 46, 48 to control yaw orientation. In some embodiments, yaw command module 66*b* may be in data communication with a table that includes the calculated rotorcraft anti-torque versus tail rotor speed for each variable speed motor of tail rotors 42, 44, 46, 48. Yaw command module 66*b* may look up estimated anti-torques for the variable speed motors to adjust the rotational speeds of the motors based on cockpit pedal input for overall rotorcraft rotation, then measure actual rotation and finally adjust the rotational speed of one or more of the variable speed motors of tail rotors 42, 44, 46, 48 to achieve the desired yaw orientation.

Monitoring module 88 may include direct sensing capabilities such as vibration sensors, voltage sensors, current sensors, strain gauges as well as others. Monitoring module 88 may also include indirect sensing capabilities that monitor parameters such as altitude or temperature and then activate or modify operating parameters of tail rotors 42, 44, 46, 48 manually or automatically based on the aircraft flight parameter or condition using predefined characteristics demonstrated during development. Monitoring module 88 includes a noise monitoring module 68a configured to monitor one or more flight parameters of rotorcraft 10. A quiet mode command module 68b of command module 86 is configured to selectively switch tail rotors 42, 44, 46, 48 to a quiet mode based on the one or more flight parameters monitored by noise monitoring module 68a. Quiet mode command module 68b is also configured to modify certain operating parameters of tail rotors 42, 44, 46, 48 in the quiet mode to reduce noise emissions from rotorcraft 10. For example, quiet mode command module 68b may modify the rotational speed, angular acceleration, angular deceleration or maximum rotational speed of any combination of tail rotors 42, 44, 46, 48 with predefined values. In embodiments in which one or more tail rotors 42, 44, 46, 48 have a reversible rotational direction, quiet mode command module 68b may also control a motor reversal set point of the motors of such tail rotors using predefined values. Monitoring module 88 includes an airframe protection monitoring module 70a configured to monitor certain flight parameters of rotorcraft 10. An airframe protection command module 70b of command module 86 is configured to modify certain operating parameters of tail rotors 42, 44, 46, 48 based on the flight parameters monitored by airframe protection monitoring module 70a to protect the airframe of rotorcraft 10. Monitoring module 88 includes a power management monitoring module 72a configured to monitor certain flight parameters of rotorcraft 10. A power management command module 72b of command module 86 is configured to allocate power between power system 58 and tail rotors 42, 44, 46, 48 based on the flight parameters monitored by power management monitoring module 72a. Monitoring module 88 also includes a tail rotor balancing monitoring module 74a configured to monitor certain parameters of rotorcraft 10 and identify a first set of one or more tail rotors amongst tail rotors 42, 44, 46, 48 based on the monitored parameters. A tail rotor balancing command module 74b of command module 86 is configured to modify certain operating parameters of the tail rotor(s) identified by tail rotor balancing monitoring module 74a.

Some or all of the autonomous control capability of flight control computer 56 can be augmented or supplanted by remote flight control from, for example, remote system 80. Remote system 80 may include one or more computing systems that may be implemented on general-purpose computers, special purpose computers or other machines with memory and processing capability. Remote system 80 may be a microprocessor-based system operable to execute program code in the form of machine-executable instructions. In addition, remote system 80 may be connected to other computer systems via a proprietary encrypted network, a public encrypted network, the Internet or other suitable communication network that may include both wired and wireless connections. Remote system 80 communicates with flight control computer 56 via communication link 84 that may include both wired and wireless connections.

While operating remote control application 80b, remote system 80 is configured to display information relating to one or more aircraft of the present disclosure on one or more flight data display devices 80c. Remote system 80 may also include audio output and input devices such as a microphone, speakers and/or an audio port allowing an operator to communicate with other operators, a base station and/or a pilot onboard rotorcraft 10. Display device 80c may also serve as a remote input device 80d if a touch screen display implementation is used, although other remote input devices such as a keyboard or joystick may alternatively be used to allow an operator to provide control commands to an aircraft being operated responsive to remote control.

Some or all of the autonomous and/or remote flight control of rotorcraft 10 can be augmented or supplanted by onboard pilot flight control from a pilot interface system 82 that includes one or more computing systems that communicate with flight control computer 56 via one or more wired communication channels 94. Pilot system 82 preferably includes one or more cockpit display devices 82a configured to display information to the pilot. Cockpit display device 82a may be configured in any suitable form including, for example, a display panel, a dashboard display, an augmented reality display or the like. Pilot system 82 may also include audio output and input devices such as a microphone, speakers and/or an audio port allowing an onboard pilot to communicate with, for example, air traffic control. Pilot system 82 also includes a plurality of user interface devices 82b to allow an onboard pilot to provide control commands to rotorcraft 10 including, for example, a control panel with switches or other inputs, mechanical control devices such as steering devices or sticks, voice control as well as other control devices.

Figure 5A:
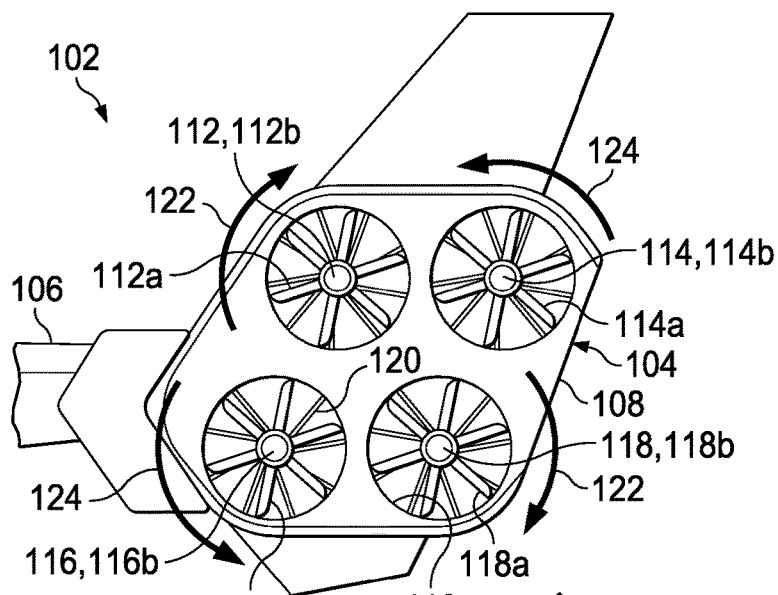
FIGS. 5A-5B are various views of a rotorcraft having a yaw control system including a yaw control matrix having various configurations in accordance with embodiments of the present disclosure.
Figure 5B:
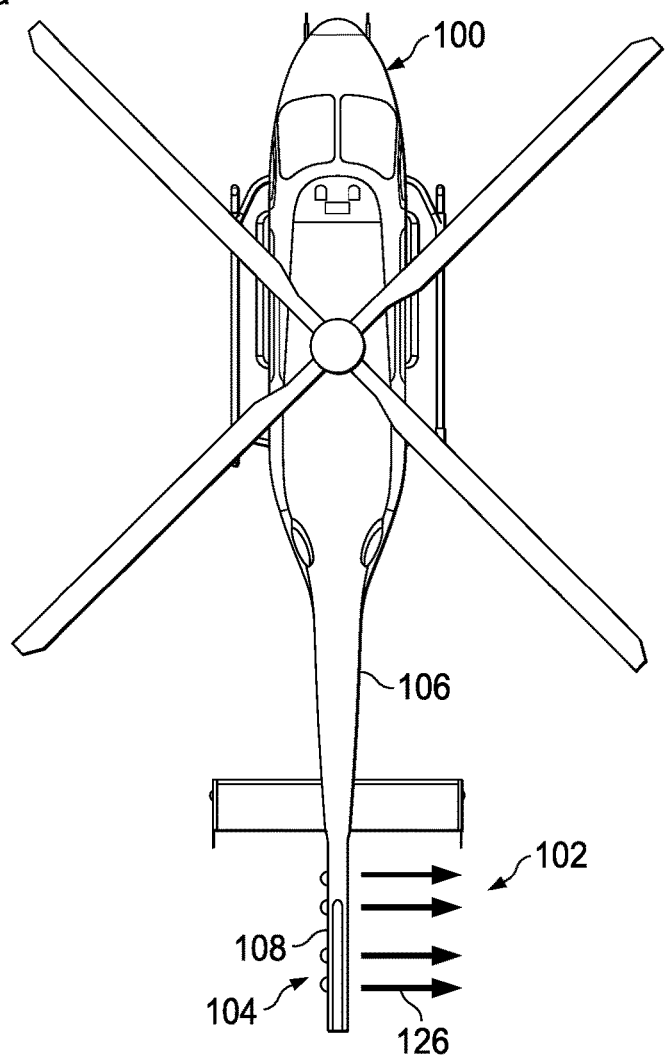

Referring to FIGS. 5A-5B in the drawings, rotorcraft 100 including yaw control system 102 is schematically illustrated. Yaw control matrix 104 is coupled to an aft portion of tailboom 106 of rotorcraft 100. Yaw control matrix 104 includes shroud 108, which forms ducts 110. Upper forward tail rotor 112, upper aft tail rotor 114, lower forward tail rotor 116 and lower aft tail rotor 118 are disposed in ducts 110 and secured by stators 120. In the illustrated embodiment, shroud 108, ducts 110 and tail rotors 112, 114, 116, 118 collectively form a generally rhombus shape configuration, although shroud 108, ducts 110 and tail rotors 112, 114, 116, 118 may separately or collectively form any shape configuration. Upper and lower forward tail rotors 112, 116 are vertically offset and upper and lower aft tail rotors 114, 118 are vertically offset. In addition, upper forward tail rotor 112 is substantially horizontally aligned with upper aft tail rotor 114 and lower forward tail rotor 116 is substantially horizontally aligned with lower aft tail rotor 118. It will be appreciated by one of ordinary skill in the art, however, that tail rotors 112, 114, 116, 118 may be positioned in an infinite number of configurations relative to one another depending on the embodiment, and that yaw control matrix 104 may include any number of ducts and tail rotors. In the illustrated embodiment, yaw control system 102 is an electrically distributed yaw control system in which tail rotor blades 112a, 114a, 116a, 118a are fixed pitch tail rotor blades and motors 112b, 114b, 116b, 118b are variable rotational speed motors capable of changing revolutions per minute (RPMs). In other embodiments, however, tail rotor blades 112a, 114a, 116a, 118a may be variable pitch tail rotor blades having a fixed or variable rotational speed and may be electrically, mechanically or hydraulically driven. In yet other embodiments, one set of one or more tail rotors 112, 114, 116, 118 may be fixed pitch, variable rotational speed tail rotors while a different set of one or more tail rotors 112, 114, 116, 118 are variable pitch, fixed rotational speed tail rotors. It will also be appreciated that tail rotor blades 112a, 114a, 116a, 118a need not all be formed from the same material. For example, one set of one or more tail rotors 112, 114, 116, 118 may have tail rotor blades formed from a heavy or metallic material such as aluminum while a different set of one or more tail rotors 112, 114, 116, 118 has tail rotor blades formed from a lighter or composite material such as a carbon-based material. The thrust capability and responsiveness of tail rotors 112, 114, 116, 118 may be customized by differentiating the material composition of tail rotor blades 112a, 114a, 116a, 118a.

Current tail rotor systems are prone to blade stall within their operational envelope depending on the static blade angle of attack. The illustrative embodiments avoid this drawback by being configurable into numerous operational and spatial configurations such that tail rotors 112, 114, 116, 118 are less prone to stall simultaneously or at all. For example, to reduce the potential for blade stall, one set of one or more tail rotors 112, 114, 116, 118 may be rotatable in a first rotational direction while a different set of one or more tail rotors 112, 114, 116, 118 are rotatable in a second and opposite rotational direction. As illustrated in FIGS. 5A-5B, tail rotors 112, 118 are clockwise tail rotors that rotate in rotational direction 122 while tail rotors 114, 116 are counterclockwise tail rotors that rotate in rotational direction 124, which is opposite of rotational direction 122. Any combination of one or more tail rotors 112, 114, 116, 118 may rotate in either clockwise rotational direction 122 or counterclockwise rotational direction 124. In the illustrated embodiment, each tail rotor 112, 114, 116, 118 is rotatable only in a single rotational direction indicated by arrows 122, 124. In other embodiments, however, the rotational direction of one or more tail rotors 112, 114, 116, 118 may be reversible. As best seen in FIG. 5B, tail rotors 112, 114, 116, 118 each emit thrust in the same anti-torque direction 126. In other embodiments, however, tail rotors 112, 114, 116, 118 may emit thrusts in opposite directions. For example, clockwise tail rotors 112, 118 may emit thrust in anti-torque direction 126 while counterclockwise tail rotors 114, 116 emit thrust in a pro-torque direction. In embodiments in which the rotational direction of each tail rotor 112, 114, 116, 118 is reversible, each tail rotor 112, 114, 116, 118 may selectively emit thrust in either direction. Also, the thrust magnitudes of tail rotors 112, 114, 116, 118 may be uniform or nonuniform depending on the rotational speeds of tail rotor motors 112b, 114b, 116b, 118b.

Figure 6H:
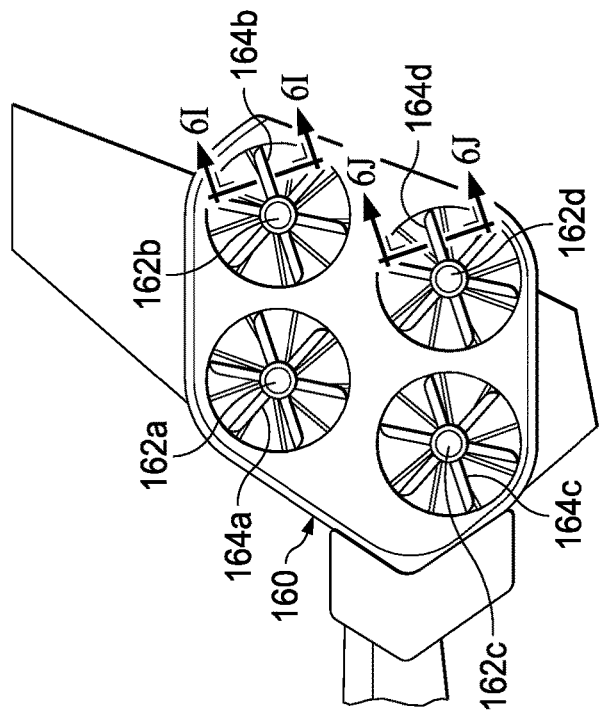

Referring to FIGS. 6A-6M in the drawings, various yaw control matrices having different tail rotor configurations are depicted. In FIG. 6A, shroud 130 of yaw control matrix 132 forms ducts 134a, 134b, 134c, 134d and includes tail rotors 136a, 136b, 136c, 136d that are different sizes. In the illustrated embodiment, upper forward duct 134a, upper forward tail rotor 136a, lower aft duct 134d and lower aft tail rotor 136d have a larger diameter than upper aft duct 134b, upper aft tail rotor 136b, lower forward duct 134c and lower forward tail rotor 136c. Although two larger ducts and tail rotors and two smaller ducts and tail rotors are shown in the illustrated embodiment, yaw control matrix 132 may have any ratio of large ducts or tail rotors to small ducts or tail rotors such as 1:3 or 3:1. Upper forward duct 134a and lower aft duct 134d have the same diameter, upper forward tail rotor 136a and lower aft tail rotor 136d have the same diameter, upper aft duct 134b and lower forward duct 134c have the same diameter and upper aft tail rotor 136b and lower forward tail rotor 136c have the same diameter. Although two duct diameters and two tail rotor diameters are shown in the illustrated embodiment, yaw control matrix 132 may contain ducts and tail rotors having any number of nonuniform diameters such as three or four different diameters. Because tail rotors 136a, 136d have a larger diameter than tail rotors 136b, 136c, the tail rotor blades of tail rotors 136a, 136d have a larger blade length than the tail rotor blades of tail rotors 136b, 136c. In addition, the motors of tail rotors 136a, 136d may be larger than the motors of tail rotors 136b, 136c in proportion to their respective sizes. Tail rotors 136a, 136b, 136c, 136d also have nonuniform numbers of tail rotor blades. In the illustrated embodiment, tail rotor 136a has eight tail rotor blades, tail rotor 136b has five tail rotor blades, tail rotor 136c has four tail rotor blades and tail rotor 136d has eight tail rotor blades. In embodiments in which tail rotors 136a, 136b, 136c, 136d have nonuniform numbers of tail rotor blades, each tail rotor 136a, 136b, 136c, 136d may have any desired number of tail rotor blades to customize the thrust, rotational inertia, angular acceleration and/or other characteristics of each tail rotor blade 136a, 136b, 136c, 136d. In some embodiments, tail rotors 136a, 136b, 136c, 136d may have equidistant or nonequidistant spacing between their respective tail rotor blades. For example, one or more of tail rotors 136a, 136b, 136c, 136d may have tail rotor blades with equidistant spacing therebetween while another one or more of tail rotors 136a, 136b, 136c, 136d has tail rotor blades that are nonuniformly, or nonequidistantly, spaced. Nonuniformly spaced tail rotor blades may be radially nonsymmetric. In other embodiments, all of tail rotors 136a, 136b, 136c, 136d may have either equidistant or nonuniform spacing between their rotor blades.

In FIGS. 6B-6D, yaw control matrix 140 includes tail rotors 142a, 142b, 142c, 142d having tail rotor blades 144a, 144b, 144c, 144d with nonuniform blade twists. In the illustrated embodiment, tail rotor blades 144b of tail rotor 142b have little or no twist while tail rotor blades 144d of tail rotor 142d have a larger blade twist than tail rotor blades 144b of tail rotor 142b. Tail rotor blades 144a, 144c of tail rotors 142a, 142c may have little or no blade twist as in tail rotor 142b, a larger blade twist as in tail rotor 142d or different blade twists altogether. Varying the blade twists of tail rotors 142a, 142b, 142c, 142d allows for customization of thrust efficiency, aerodynamic response and other characteristics of each tail rotor 142a, 142b, 142c, 142d. In FIGS. 6E-6G, yaw control matrix 148 includes tail rotors 150a, 150b, 150c, 150d having fixed pitch tail rotor blades 152a, 152b, 152c, 152d with nonuniform pitches, or angles of attack. In the illustrated embodiment, tail rotor blades 152b of tail rotor 150b have a fixed pitch 154 that is smaller than fixed pitch 156 of tail rotor blades 152d of tail rotor 150d. Tail rotor blades 152a, 152c of tail rotors 150a, 150c may have fixed pitch 154 as in tail rotor 150b, fixed pitch 156 as in tail rotor 150d or different blade pitches altogether. In yet other embodiments, a set of one or more tail rotors 150a, 150b, 150c, 150d may have variable pitch tail rotor blades while the remaining tail rotors 150a, 150b, 150c, 150d have fixed pitch tail rotor blades. Varying the fixed pitch of tail rotor blades 152a, 152b, 152c, 152d of each tail rotor 150a, 150b, 150c, 150d allows for the customization of thrust characteristics for each tail rotor 150a, 150b, 150c, 150d.

Figure 6I:
Figure 6J:
Figure 6E:
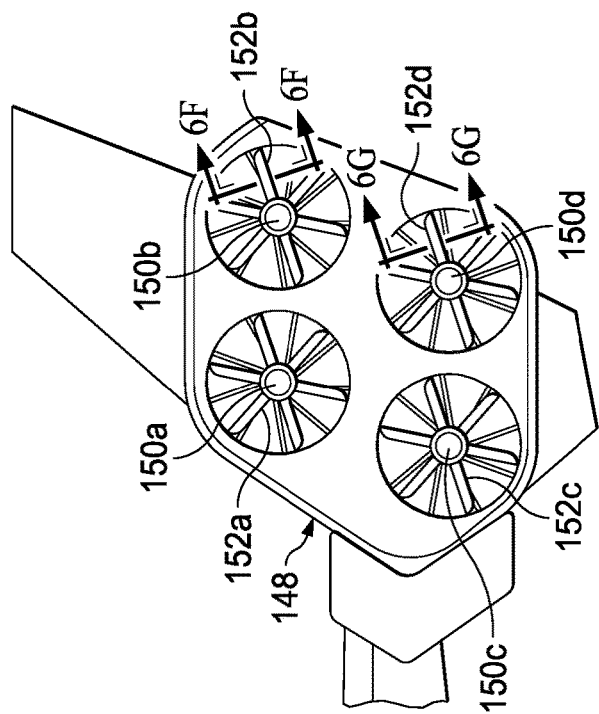
Figure 6F:
Figure 6G:
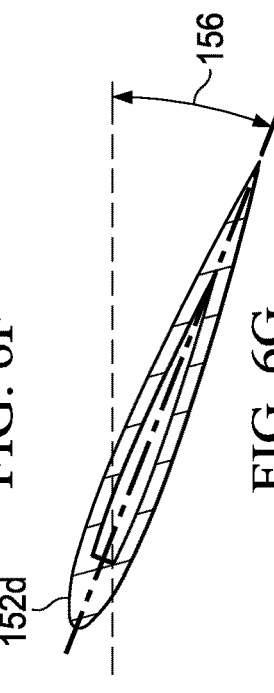

In FIGS. 6H-6J, yaw control matrix 160 includes tail rotors 162a, 162b, 162c, 162d having tail rotor blades 164a, 164b, 164c, 164d with nonuniform airfoil shapes. In the illustrated embodiment, tail rotor blades 164b of tail rotor 162b have a substantially symmetrical cross-sectional airfoil shape while tail rotor blades 164d of tail rotor 162d have a substantially nonsymmetrical cross-sectional airfoil shape. Tail rotor blades 164a of tail rotor 162a and tail rotor blades 164c of tail rotor 162c may have a symmetrical airfoil shape as in tail rotor 162b, a nonsymmetrical airfoil shape as in tail rotor 162d or different airfoil shapes altogether. Non-limiting examples of airfoil shapes of tail rotor blades 164a, 164b, 164c, 164d include symmetrical, symmetrical biconvex, semi-symmetrical, nonsymmetrical, nonsymmetrical biconvex, flat bottom, cambered, under-cambered, reflex cambered, supercritical or any other airfoil shapes. Tail rotor blades 164a, 164b, 164c, 164d may also have a uniform airfoil shape.

Figure 6K:
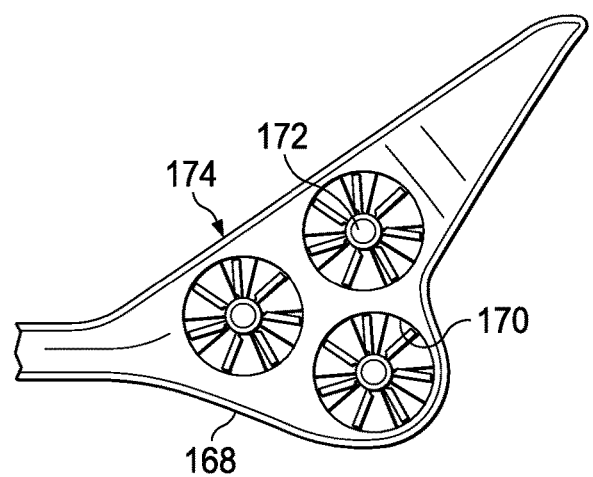
Figure 6L:
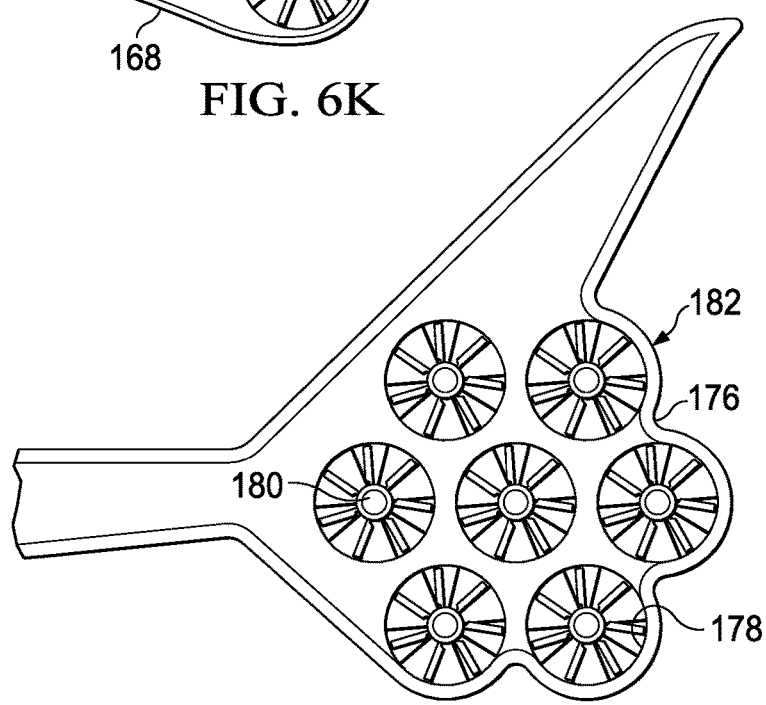
Figure 6M:
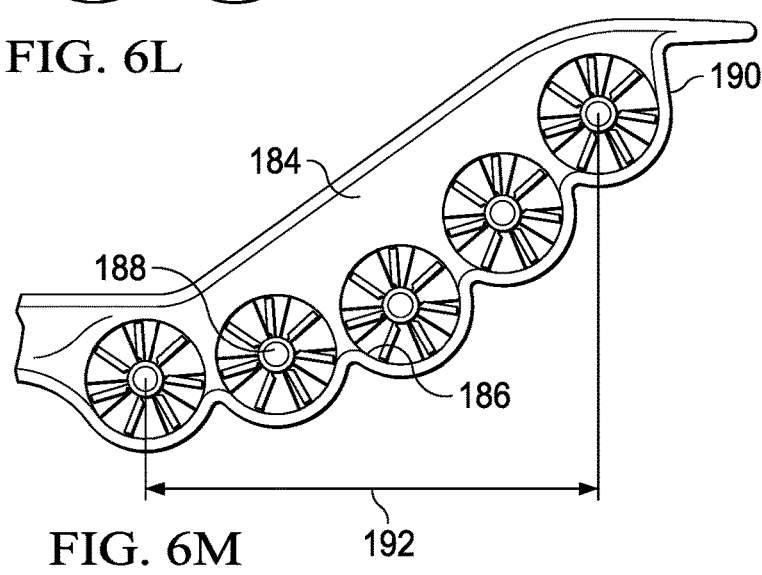

In FIG. 6K, shroud 168, ducts 170 and tail rotors 172 of yaw control matrix 174 collectively form a generally triangular shape configuration. Yaw control matrix 174 has three tail rotors 172, thus reducing the overall weight of yaw control matrix 174. In other embodiments, yaw control matrix 174 may have any number of tail rotors such as two, five, twenty, thirty or more tail rotors. In FIG. 6L, shroud 176, ducts 178 and tail rotors 180 of yaw control matrix 182 collectively form a generally hexagonal shape configuration. Yaw control matrix 182 includes seven tail rotors 180, allowing for greater redundancy in the event of a tail rotor failure as well as greater variation or nonuniformity amongst tail rotors 180 themselves. In FIG. 6M, shroud 184, ducts 186 and tail rotors 188 of yaw control matrix 190 collectively form a generally arc shape configuration. Yaw control matrix 190 slopes upward such that the aft-most tail rotor is higher than the forward-most tail rotor. Yaw control matrix 190 includes five tail rotors 188, although any number of tail rotors may be included in yaw control matrix 190. The arc shape of yaw control matrix 190 allows for a greater distance 192 between the forward-most and aft-most tail rotors 188, thus allowing for greater variation between the fuselage moments exerted by each tail rotor 188. While the illustrated embodiments show several shape configurations, it will be appreciated by one of ordinary skill in the art that the shrouds, ducts and tail rotors disclosed herein may have any shape configuration such as a square, circular, parallelogram, straight-line, irregular, elliptical, polygonal or other shape configuration. The various yaw control matrix configurations disclosed herein provide for redundancy in the event of loss of effectiveness of one or more of the tail rotors due to blade stall, malfunction or other factors. Multiple tail rotors and customized spacing between the tail rotors may also prevent all tail rotors from being simultaneously within a potentially dangerous turbulent airflow during flight of the rotorcraft.

Referring to FIGS. 7A-7D in the drawings, rotorcraft 200 is depicted as a helicopter including yaw control system 202. Yaw control matrix 204 is coupled to an aft portion of tailboom 206 of rotorcraft 200. Yaw control matrix 204 includes shroud 208, which forms ducts 210. Upper forward tail rotor 212, upper aft tail rotor 214, lower forward tail rotor 216 and lower aft tail rotor 218 are disposed in ducts 210 and secured by stators 220. In the illustrated embodiment, shroud 208, ducts 210 and tail rotors 212, 214, 216, 218 collectively form a generally rhombus shape configuration, although shroud 208, ducts 210 and tail rotors 212, 214, 216, 218 may separately or collectively form any shape configuration. It will be appreciated by one of ordinary skill in the art that tail rotors 212, 214, 216, 218 may be positioned in an infinite number of configurations relative to one another depending on the embodiment, and that yaw control matrix 204 may include any number of ducts and tail rotors. In the illustrated embodiment, yaw control system 202 is an electrically distributed yaw control system in which the tail rotor blades of tail rotors 212, 214, 216, 218 are fixed pitch tail rotor blades and the motors of tail rotors 212, 214, 216, 218 are variable rotational speed motors capable of changing RPMs. In other embodiments, however, the tail rotor blades of tail rotors 212, 214, 216, 218 may be variable pitch tail rotor blades having a fixed or variable rotational speed and may be electrically, mechanically or hydraulically driven. In yet other embodiments, one set of one or more tail rotors 212, 214, 216, 218 may be fixed pitch, variable rotational speed tail rotors while a different set of one or more tail rotors 212, 214, 216, 218 are variable pitch, fixed rotational speed tail rotors or variable pitch, variable rotational speed tail rotors.

Conventional helicopters use a tail rotor to control yaw in forward flight. For example, some helicopter tailbooms include a fixed vertical fin positioned to provide a suitable anti-torque thrust for a given forward airspeed. The fine tuning of anti-torque thrust in such helicopters is typically performed by varying blade pitch in a variable pitch tail rotor system. The noise produced by traditional tail rotors, however, can be unacceptably high, creating flyover acoustic problems. Such noise may be undesirable in a low noise environment or during clandestine operations. Yaw control system 202 includes a rotatable vertical control surface to manage the yaw of rotorcraft 200 especially during forward flight mode of rotorcraft 200. In particular, a rudder 222 is rotatably coupled to the aft edge of shroud 208 via hinge joint 224. In other embodiments, rudder 222 may be located above, below or forward of yaw control matrix 204. Hinge joint 224 is canted relative to a vertical reference axis, although in other embodiments hinge joint 224 may be substantially vertical. A rudder actuator 226 is configured to rotate rudder 222 about hinge joint 224.

Yaw control system 202 includes yaw controller 228 implemented by flight control computer 230. Yaw controller 228 is in wired or wireless electrical communication with rudder actuator 226 and tail rotors 212, 214, 216, 218. Rudder actuator 226 rotates rudder 222 in response to commands from yaw controller 228. Rudder actuator 226 may mechanically, electrically or hydraulically actuate rudder 222. In embodiments in which rudder 222 is electrically actuated, rudder actuator 226 may use aircraft power (e.g., 28VDC) and/or the same power source as tail rotors 212, 214, 216, 218. Rudder 222 may also be rotated using mechanical linkages and other members interconnecting rudder 222 to anti-torque controls such as pedals. In other embodiments, yaw controller 228 may be in mechanical or hydraulic communication with rudder 222 and tail rotors 212, 214, 216, 218. Yaw controller 228 allows for manual control of tail rotors 212, 214, 216, 218 and rudder 222 and/or autonomous control of tail rotors 212, 214, 216, 218 and rudder 222 based on the flight mode, forward airspeed, altitude, air temperature, maneuver, operation or other flight parameters of rotorcraft 200. Yaw controller 228 includes a tail rotor rotational speed reduction module 232 and a rudder control module 234, which work in conjunction with one another to control tail rotors 212, 214, 216, 218 and rudder 222. Tail rotor rotational speed reduction module 232 selectively switches tail rotors 212, 214, 216, 218 into a rotational speed reduction mode while rotorcraft 200 is in forward flight mode. Rotational speed reduction mode may be activated by tail rotor rotational speed reduction module 232 when rotorcraft 200 is in forward flight mode or when forward airspeed 236 of rotorcraft 200 exceeds a forward airspeed threshold 238. In other examples, rotational speed reduction mode may be activated by tail rotor rotational speed reduction module 232 when aircraft altitude and/or ambient air temperature exceeds or falls below a predetermined threshold. When rotational speed reduction mode is activated, tail rotor rotational speed reduction module 232 reduces the rotational speed of one or more tail rotors 212, 214, 216, 218. For example, tail rotor rotational speed reduction module 232 may reduce the rotational speeds of all tail rotors 212, 214, 216, 218 in the rotational speed reduction mode. In some embodiments, tail rotor rotational speed reduction module 232 may turn off, or shut down, at least one or all of tail rotors 212, 214, 216, 218 in the rotational speed reduction mode.

Tail rotor rotational speed reduction module 232 includes quiet mode controller 240, which selectively switches tail rotors 212, 214, 216, 218 into a quiet mode when rotorcraft 200 is in forward flight mode and/or exceeds forward airspeed threshold 238. As described in the illustrative embodiments, quiet mode controller 240 controls various operating parameters of tail rotors 212, 214, 216, 218 such as rotational speed and angular acceleration to lower the noise emissions of yaw control matrix 204. Tail rotor rotational speed reduction module 232 may also switch tail rotors 212, 214, 216, 218 into rotational speed reduction mode based on manual input from an operator of rotorcraft 200 or from elsewhere. For example, tail rotor rotational speed reduction module 232 may turn off or slow down tail rotors 212, 214, 216, 218 in response to the pilot of rotorcraft 200 engaging a button or switch in cockpit 242 of rotorcraft 200. In embodiments in which tail rotors 212, 214, 216, 218 are mechanically driven using one or more driveshafts, tail rotors 212, 214, 216, 218 may be slowed down or shut off using a clutch assembly.

Rudder control module 234 controls the yaw of rotorcraft 200 by rotating rudder 222 when tail rotors 212, 214, 216, 218 are in rotational speed reduction mode. In some embodiments, rudder control module 234 may rotate rudder 222 based on forward airspeed 236, ambient air temperature and/or the altitude of rotorcraft 200. For example, yaw controller 228 may include a yaw change determination module 244 that determines a yaw adjustment based on forward airspeed 236 of rotorcraft 200. In this non-limiting example, rudder control module 234 rotates rudder 222 based on the yaw adjustment determined by yaw change determination module 244. In another non-limiting example, yaw change determination module 244 may determine an amount by which to change or correct the yaw of rotorcraft 200 based on direct measurement. In determining the yaw adjustment for rotorcraft 200 based on direct measurement, yaw change determination module 244 may include or utilize one or more sensors such as a yaw rate sensor, a yaw position sensor and/or one or more accelerometers. Rudder control module 234 may then modify the yaw of rotorcraft 200 using rudder 222 based on the direct measurements from yaw change determination module 244. Rudder control module 234 may also determine the magnitude of anti-torque or pro-torque thrust that is required to achieve the desired yaw of rotorcraft 200 as determined by yaw change determination module 244. Rudder control module 234 may determine how quickly anti-torque or pro-torque thrust must be initiated so that the desired yaw is achieved in a timely manner. Rudder control module 234 may thus determine whether, how far and how quickly to rotate rudder 222. Rudder control module 234 may also rotate rudder 222 based on manual input from an operator of rotorcraft 200. For example, rudder control module 234 may rotate rudder 222 based on pedal input from pedals 246 in cockpit 242. Any type of manual input may be used to control rudder 222 such as a joystick, voice control, one or more switches or any other interface type. Using yaw controller 228, noise emissions from yaw control matrix 204 are reduced or eliminated since rudder 222 and not tail rotors 212, 214, 216, 218 are relied upon for most or all yaw control in forward flight. Yaw control system 202 is also more energy efficient than traditional tail rotors since rudder 222 consumes less power than a traditional tail rotor.

Figure 7A:
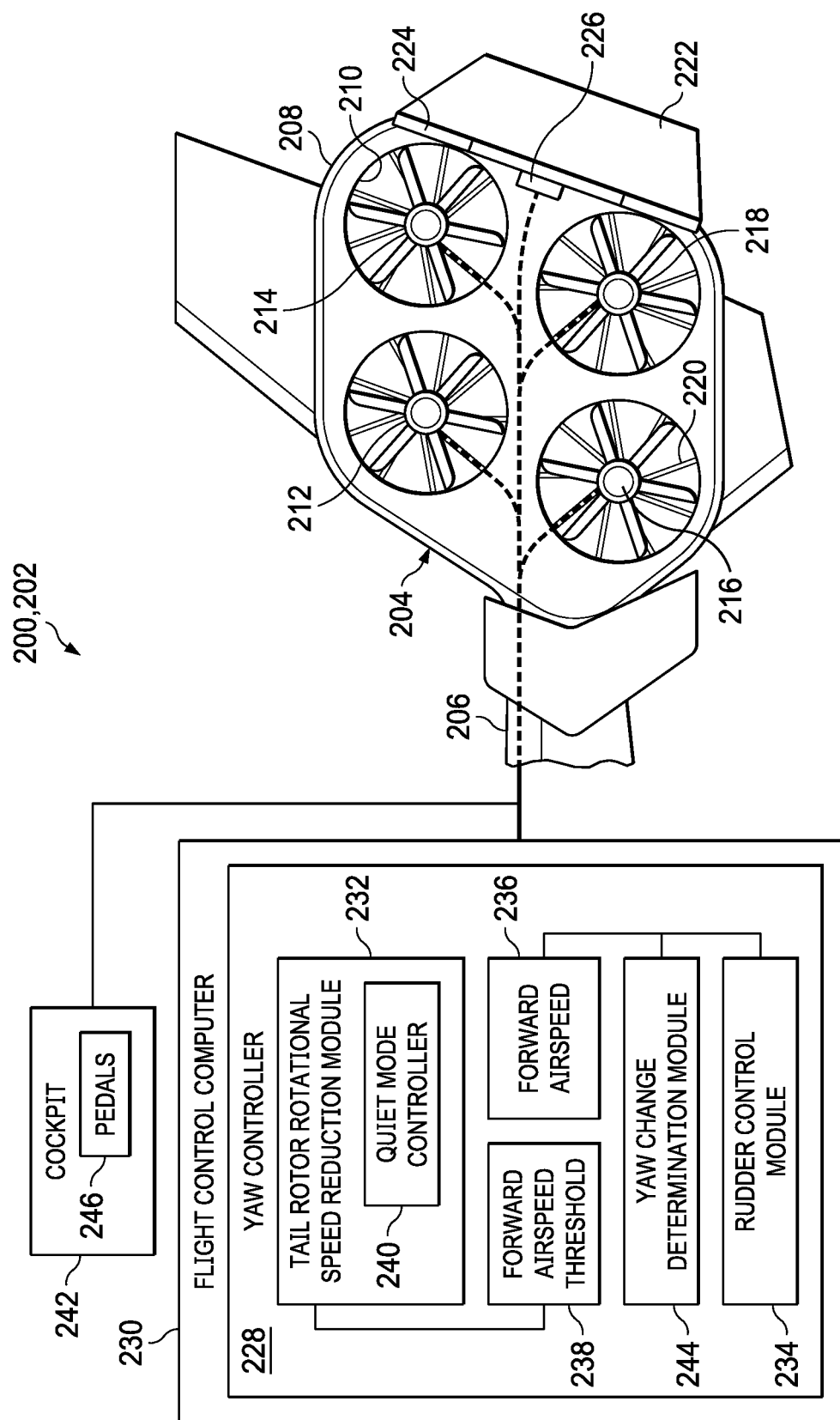
FIGS. 7A-7D are schematic illustrations of a yaw control system for a rotorcraft including a rudder in accordance with embodiments of the present disclosure.
Figure 7D:
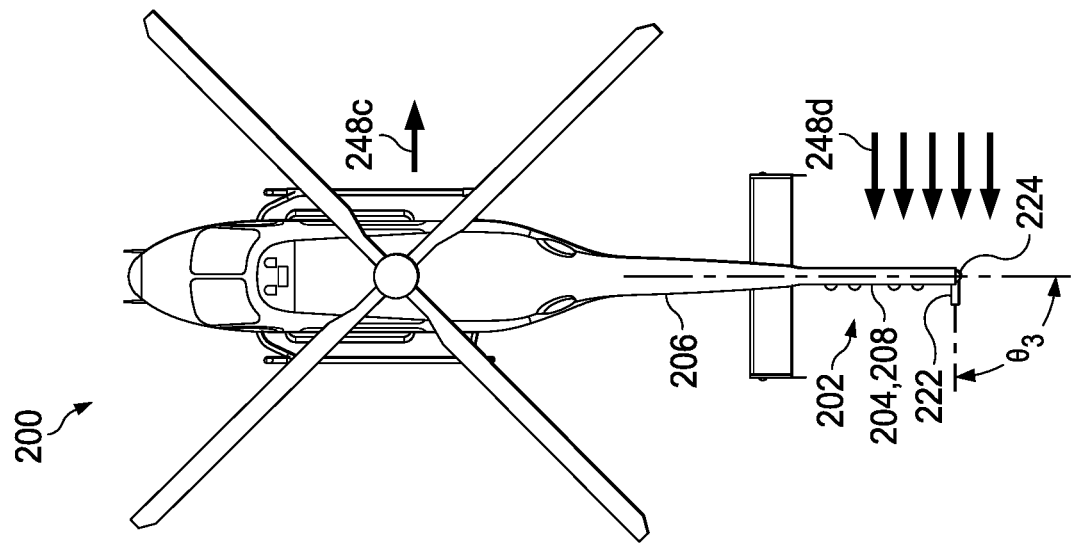
Figure 7C:
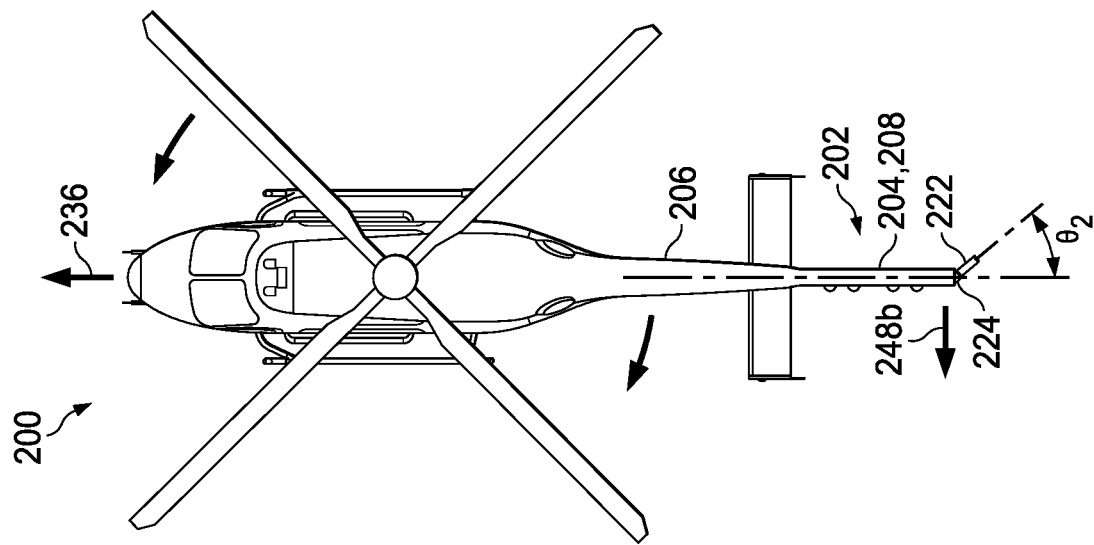
Figure 7B:
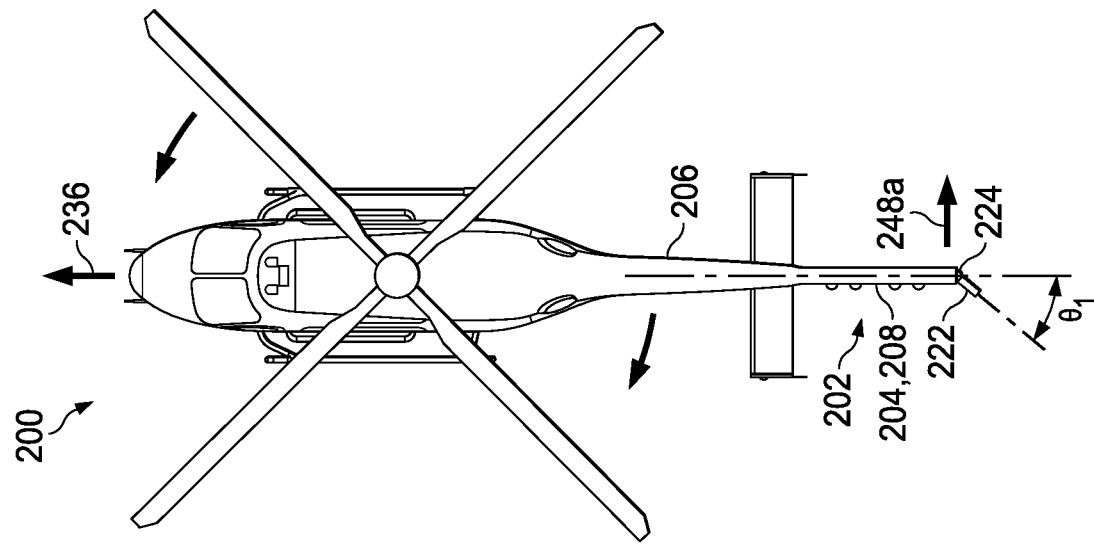

FIGS. 7B-7D show various operational scenarios of yaw control system 202. In FIG. 7B, rotorcraft 200 is in forward flight mode and has forward airspeed 236. Tail rotor rotational speed reduction module 232 has slowed down or shut off tail rotors 212, 214, 216, 218 in response to receiving manual input from an operator of rotorcraft 200 or in response to forward airspeed 236 exceeding forward airspeed threshold 238. Rudder control module 234 has rotated rudder 222 by an angle $\theta_1$ relative to the longitudinal axis of rotorcraft 200 to produce anti-torque thrust 248*a*, which counteracts the torque on the fuselage of rotorcraft 200 caused by the main rotor. Angle $\theta_1$ by which rudder 222 is rotated may be determined based on the yaw adjustment calculated by yaw change determination module 244. The magnitude of angle $\theta_1$ may also be determined based on manual input such as pedal input received from an operator of rotorcraft 200. In some embodiments, rudder 222 may be automated to rotate to a position that maintains a proper yaw orientation as described above while fine-tuning of the rudder position is provided manually by a pilot via pedals 246. For example, rudder 222 may be controlled by pedals 246 above a given airspeed to provide anti-torque fine tuning for rotorcraft 200. In some non-limiting examples, rudder 222 may be only slightly rotated to one side in forward flight to keep rotorcraft 200 properly aligned.

In FIG. 7C, rudder 222 has been rotated in the opposite direction by angle $\theta_2$ relative to the longitudinal axis of rotorcraft 200 to provide pro-torque thrust 248*b* for rotorcraft 200. Pro-torque thrust 248*b* may sometimes be desired during certain maneuvers such as quick turns. Any magnitude of pro-torque thrust 248*b* may be obtained by varying angle $\theta_2$ of rudder 222. Angle $\theta_2$ of rudder 222 may be at or near zero such that rudder 222 is substantially aligned with shroud 208 when rotorcraft 200 is in hover mode. In FIG. 7D, rotorcraft 200 is performing a right sideward flight maneuver in a sideward flight mode. Rudder control module 234 has rotated rudder 222 such that rudder 222 forms an approximately 90 degree angle $\theta_3$ with the longitudinal axis of rotorcraft 200. Rudder 222 is rotated opposite of direction of flight 248*c* of rotorcraft 200 to tuck rudder 222 out of the way and reduce the overall drag experienced by rotorcraft 200 during sideward flight. Rudder 222 may also be positioned orthogonally relative to the longitudinal axis of rotorcraft 200 when rotorcraft 200 experiences strong crosswinds 248*d*.

Figure 8A:
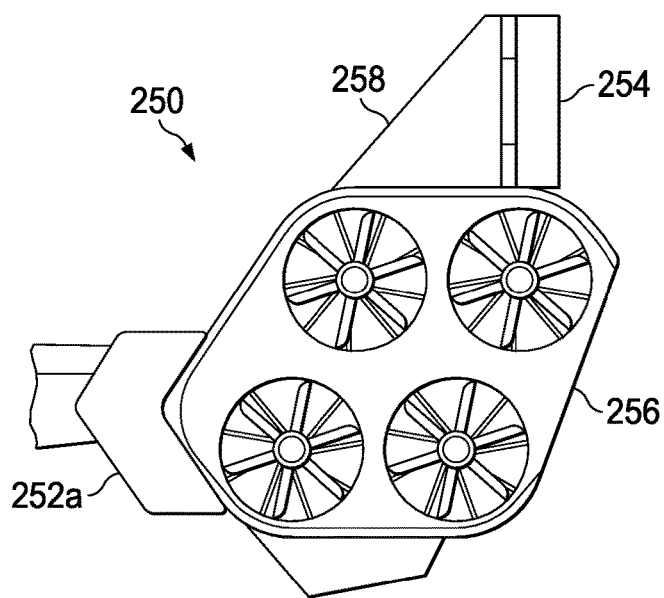
FIGS. 8A-8C are various views of a yaw control system for a rotorcraft including multiple rudders in accordance with embodiments of the present disclosure.
Figure 8B:
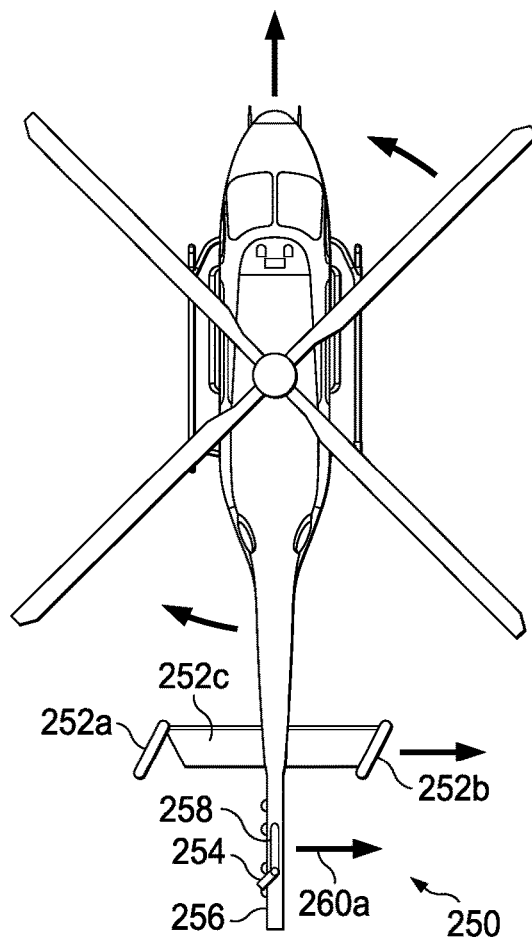
Figure 8C:
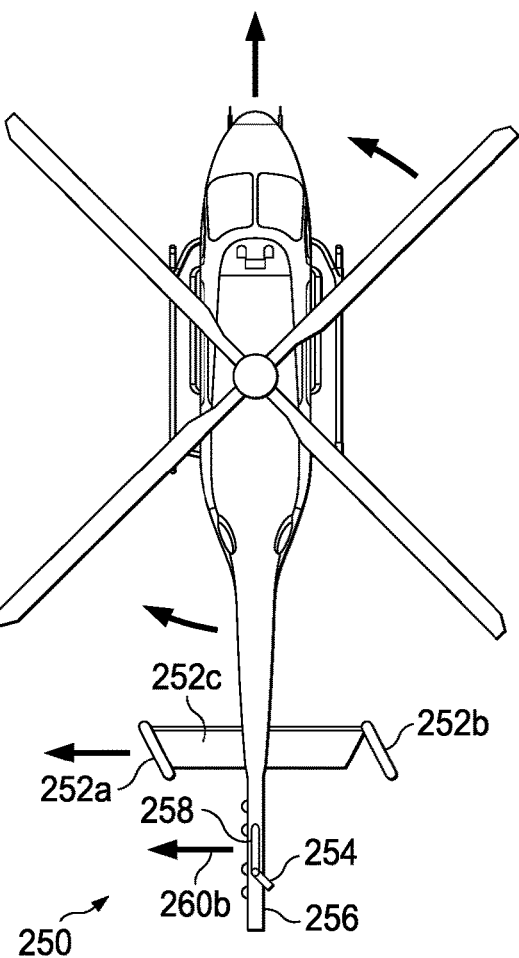

Referring to FIGS. 8A-8C in the drawings, a yaw control system for a rotorcraft is schematically illustrated and generally designated 250. Yaw control system 250 utilizes a yaw controller such as yaw controller 228 in FIG. 7A and has multiple rudders to control the yaw of the rotorcraft. In particular, yaw control system 250 includes left and right stabilizer rudders 252*a*, 252*b* rotatably coupled to the outboard ends of horizontal stabilizer 252*c*, which is fixedly coupled to the tailboom of the rotorcraft. Yaw control system 250 also controls yaw using rudder 254. Rudder 254 is rotatably coupled to shroud 256 via vertical fin 258. Vertical fin 258 is fixedly coupled to the top side of shroud 256. In other embodiments, vertical fin 258 may be rotatably coupled to the top side of shroud 256 such that vertical fin 258 acts as a rotatable rudder and/or replaces rudder 254. Any percentage of vertical fin 258 may be rotatable such as 10, 25, 50, 75, or 100 percent, with the remaining portion of vertical fin 258 being fixed. In yet other embodiments, rudder 254 may be rotatably coupled to a vertical fin on the forward, bottom or aft sides of shroud 256. In operation, rudder control module 234 may rotate stabilizer rudders 252a, 252b and/or rudder 254 in either direction to provide anti-torque thrust 260a or pro-torque thrust 260b for the rotorcraft.

Figure 9A:
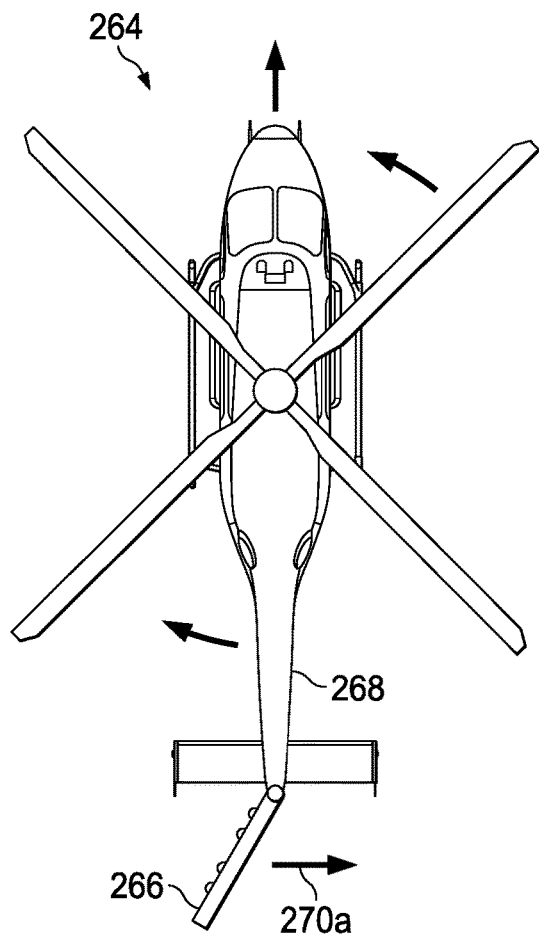
FIGS. 9A-9B are top views of a rotorcraft having a yaw control system including a rotatable yaw control matrix in accordance with embodiments of the present disclosure.
Figure 9B:
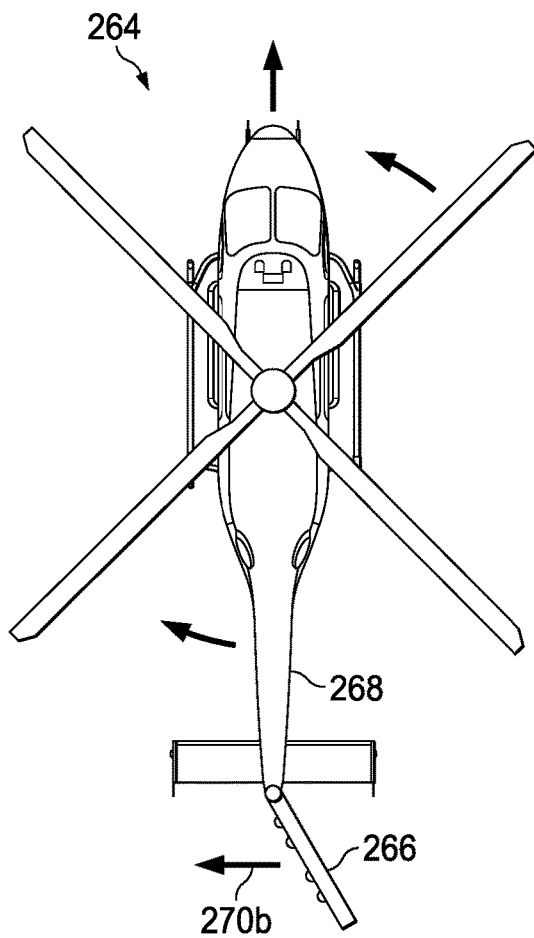

Referring to FIGS. 9A-9B in the drawings, rotorcraft 264 includes a yaw control matrix 266. Instead of relying on a rudder appended to yaw control matrix 266, the entire yaw control matrix 266 acts as a rotatable vertical control surface and is rotatably coupled to the aft end of tailboom 268. In the illustrated embodiment, rudder control module 234 may rotate the entirety of yaw control matrix 266 in either direction to provide anti-torque thrust 270a or pro-torque thrust 270b for rotorcraft 264. Yaw control matrix 266 may be rotated while the tail rotors of yaw control matrix 266 are either slowed down or shut off. In some embodiments, one or more rudders may be rotatably coupled to yaw control matrix 266. In other embodiments, the tail rotors of yaw control matrix 266 may be used to provide additional orientational control while yaw control matrix 266 is rotated in either direction away from the longitudinal axis of rotorcraft 264.

Figure 10A:
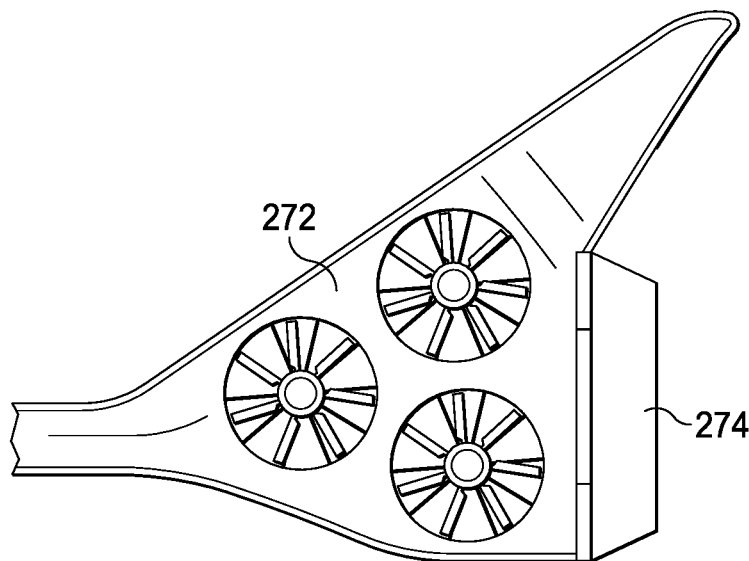
FIGS. 10A-10B are side views of yaw control systems for rotorcraft including yaw control matrices and rudders having different configurations in accordance with embodiments of the present disclosure.
Figure 10B:
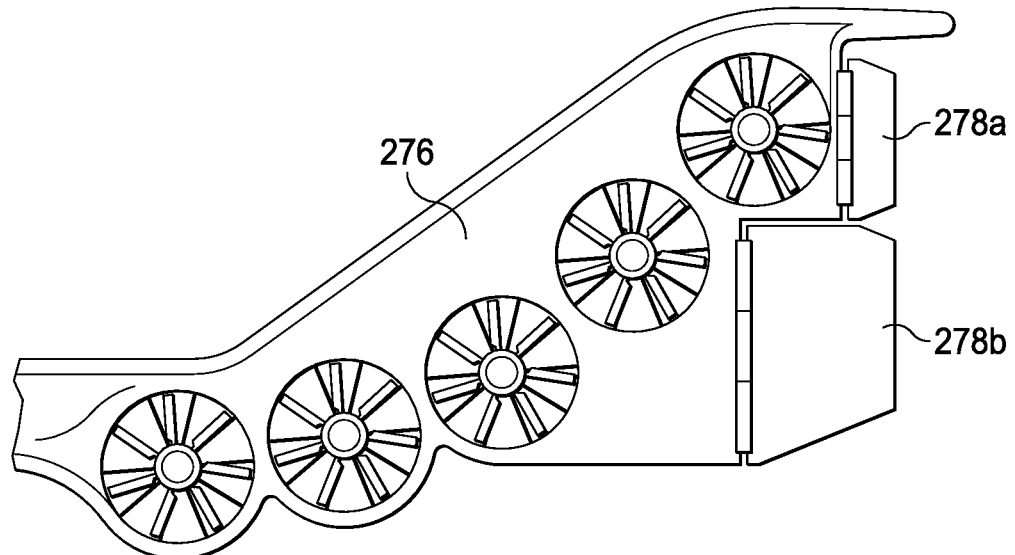

Referring to FIGS. 10A-10B in the drawings, various yaw control matrices and rudders are schematically illustrated. FIGS. 10A-10B illustrate the wide variety of yaw control matrix configurations to which a rudder of the illustrative embodiments may be rotatably coupled for yaw control. In FIG. 10A, yaw control matrix 272 has a substantially triangular shape configuration and rudder 274 is rotatably coupled to the aft edge of yaw control matrix 272 using a vertical and noncanted hinge joint. In FIG. 10B, yaw control matrix 276 has an arc shape configuration to which upper and lower rudders 278a, 278b are rotatably coupled. Rudders 278a, 278b are coupled to the aft edge of yaw control matrix 276 using vertical hinge joints, although canted hinge joints may also be employed. Larger lower rudder 278b may be used to meet most of the anti-torque demand of the aircraft while smaller upper rudder 278a, which is more responsive, may be used to generate smaller and quicker anti-torque correction to stabilize yaw in forward flight. The rudders of the illustrative embodiments may be rotatably coupled to any portion of a yaw control matrix using any number of hinges. Additionally, any number of rudders may be rotatably coupled to the yaw control matrices disclosed herein.

Referring to FIGS. 11A-11B in the drawings, various methods for controlling the yaw of a rotorcraft such as a helicopter are depicted. In FIG. 11A, the method includes flying a rotorcraft in forward flight mode (step 280). The method also includes reducing the rotational speed of one or more tail rotors (step 282). Step 282 may include shutting down one or more tail rotors or switching one or more tail rotors into quiet mode. The method also includes rotating a rudder to control the yaw of the rotorcraft (step 284). In FIG. 11B, the method includes flying a rotorcraft in forward flight mode (step 286). The method determines whether the forward airspeed of the rotorcraft exceeds a forward airspeed threshold (step 288). If the method determines that the forward airspeed of the rotorcraft does not exceed the forward airspeed threshold, the method loops back to step 288. If the method determines that the forward airspeed of the rotorcraft exceeds the forward airspeed threshold, the method determines whether to automatically reduce the rotational speed of one or more tail rotors (step 290). If the method determines to automatically reduce the rotational speed of one or more tail rotors, the method reduces the rotational speed of one or more tail rotors (step 292). Optionally or alternatively, the method may increase tail rotor speed with forward airspeed to ensure that the rudder does not stall. If the method determines not to automatically reduce the rotational speed of one or more tail rotors, the method determines whether manual input is received to reduce the rotational speed of one or more tail rotors (step 291). If the method determines that manual input has been received to reduce the rotational speed of one or more tail rotors, the method reduces the rotational speed of one or more tail rotors (step 292). For safety reasons, the operator of the aircraft may be prohibited from reducing the rotational speed of one or more tail rotors and/or engaging quiet mode when the aircraft is below a predetermined or calculated forward airspeed threshold. If the method determines that manual input has not been received to reduce the rotational speed of one or more tail rotors, the method returns to step 288. The mode of step 292 to reduce the rotational speed of one or more tail rotors may automatically disengage below a predetermined or calculated airspeed, regardless of whether the mode was engaged automatically or manually. The method then determines whether manual input has been received to rotate the rudder (step 294). If the method determines that manual input to rotate the rudder has been received, the method skips to step 298 to rotate the rudder based on the manual input to control the yaw of the rotorcraft. If the method determines that manual input to rotate the rudder has not been received, the method determines whether a yaw adjustment has been determined or calculated for the rotorcraft (step 296). Such a yaw adjustment may be determined, for example, by yaw change determination module 244 in FIG. 7A or another module of the rotorcraft. If the method determines that a yaw adjustment has not been determined for the rotorcraft, the method returns to step 294. If the method determines that a yaw adjustment has been determined for the rotorcraft, the method rotates the rudder based on the determined yaw adjustment to control the yaw of the rotorcraft (step 298).

Figure 12A:
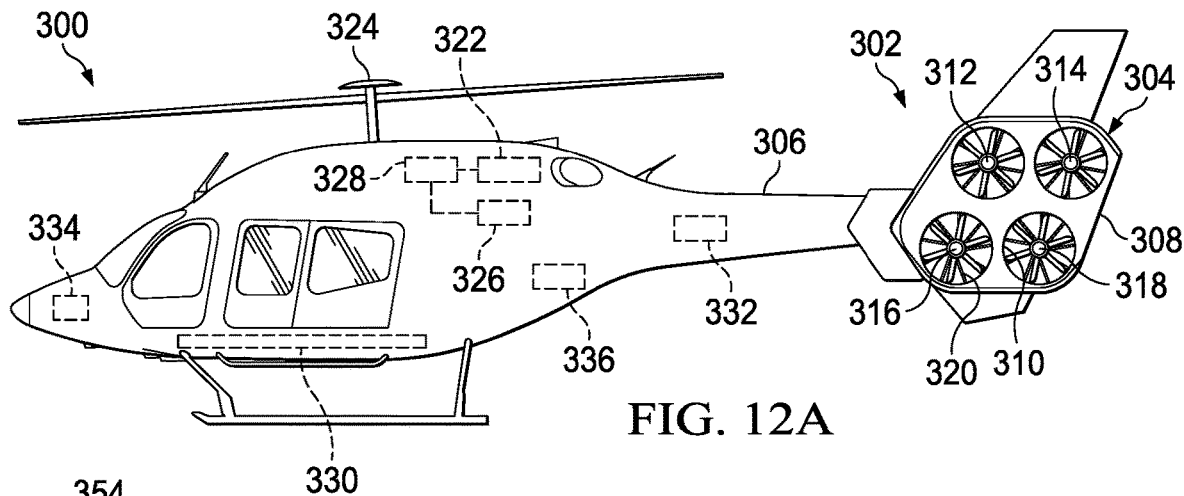
FIGS. 12A-12B are schematic illustrations of a yaw control system for a rotorcraft having a quiet mode in accordance with embodiments of the present disclosure.
Figure 12B:
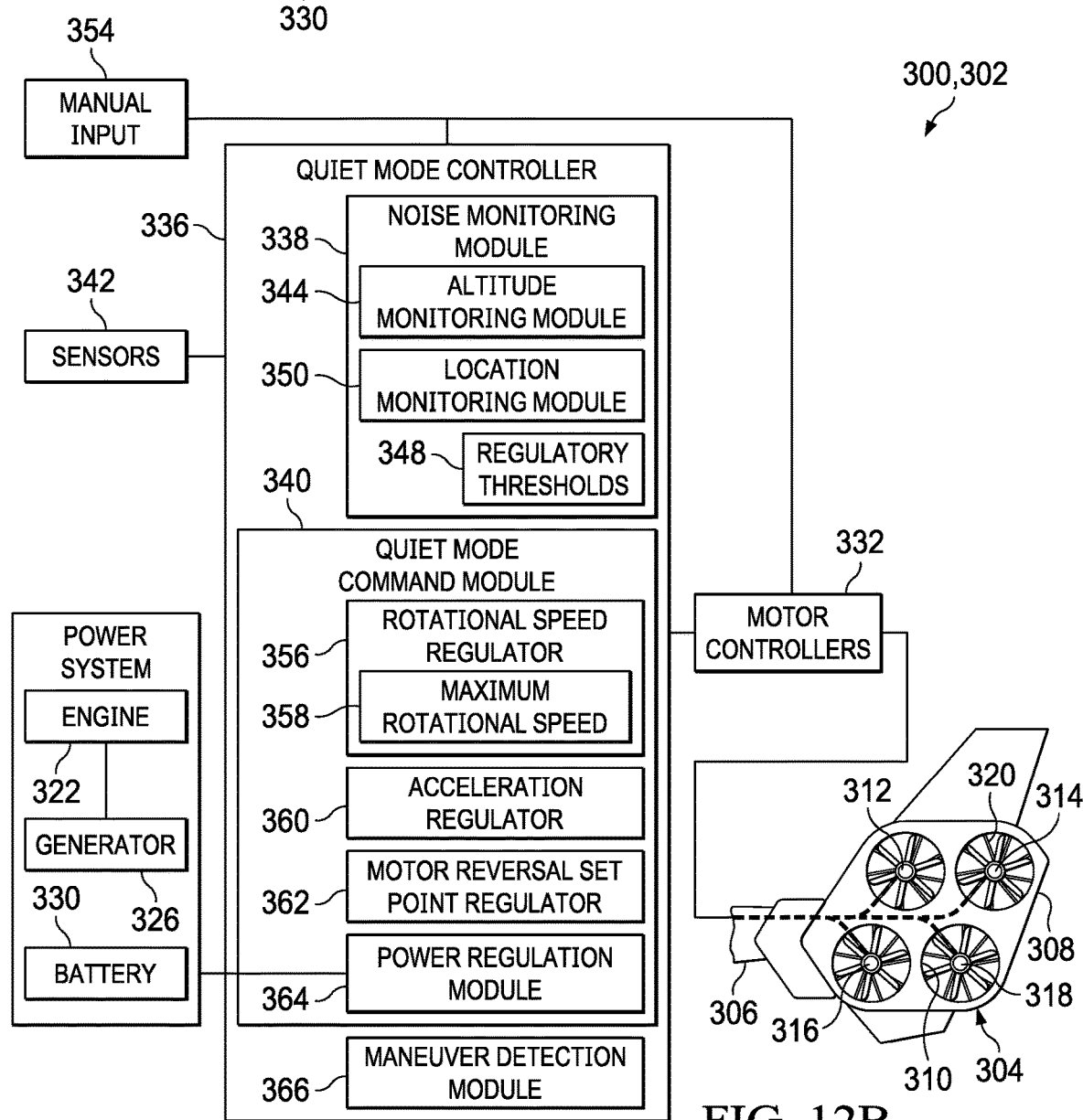

Referring to FIGS. 12A-12B in the drawings, rotorcraft 300 is depicted as a helicopter including yaw control system 302. Yaw control matrix 304 is coupled to an aft portion of tailboom 306 of rotorcraft 300. Yaw control matrix 304 includes shroud 308, which forms ducts 310. Upper forward tail rotor 312, upper aft tail rotor 314, lower forward tail rotor 316 and lower aft tail rotor 318 are disposed in ducts 310 and secured by stators 320. In the illustrated embodiment, shroud 308, ducts 310 and tail rotors 312, 314, 316, 318 collectively form a generally rhombus shape configuration, although shroud 308, ducts 310 and tail rotors 312, 314, 316, 318 may separately or collectively form any shape configuration. It will be appreciated by one of ordinary skill in the art that tail rotors 312, 314, 316, 318 may be positioned in an infinite number of configurations relative to one another depending on the embodiment, and that yaw control matrix 304 may include any number of ducts and tail rotors. In the illustrated embodiment, yaw control system 302 is an electrically distributed yaw control system in which the tail rotor blades of tail rotors 312, 314, 316, 318 are fixed pitch tail rotor blades and the motors of tail rotors 312, 314, 316, 318 are variable rotational speed motors capable of changing RPMs. In other embodiments, however, the tail rotor blades of tail rotors 312, 314, 316, 318 may be variable pitch tail rotor blades having a fixed or variable rotational speed and may be electrically, mechanically or hydraulically driven. In yet other embodiments, one set of one or more tail rotors 312, 314, 316, 318 may be fixed pitch, variable rotational speed tail rotors while a different set of one or more tail rotors 312, 314, 316, 318 are variable pitch, fixed rotational speed tail rotors or variable pitch, variable rotational speed tail rotors. Rotorcraft 300 includes engine 322, which powers main rotor 324 and generator 326 via gearbox 328. Yaw control matrix 304 including tail rotors 312, 314, 316, 318 may be powered by generator 326 and/or one or more batteries 330. The motors of tail rotors 312, 314, 316, 318 are controlled using motor controllers 332, which send and receive commands and other data to and from flight control computer 334.

Conventional tail rotors produce a significant portion of the total noise output of a rotorcraft. The additional noise produced by conventional tail rotors may cause the rotorcraft to exceed legal, or regulatory, noise emission limits and act as a nuisance for observers on the ground. Tail rotor noise may also interfere with missions or operations that require a low noise signature such as clandestine or reconnaissance missions. To address the noise issues present on current aircraft, rotorcraft 300 includes quiet mode controller 336. Quiet mode controller 336 may be implemented by flight control computer 334 or may be implemented as a separate unit in communication with flight control computer 334 as shown in FIG. 12A. Quiet mode controller 336 includes noise monitoring module 338 and quiet mode command module 340, which work in conjunction with one another to determine when to switch yaw control matrix 304 to quiet mode and modify the behavior of tail rotors 312, 314, 316, 318 in quiet mode to reduce the noise emitted by yaw control matrix 304.

Noise monitoring module 338 monitors and detects one or more flight parameters of rotorcraft 300 that may be used to trigger quiet mode. Noise monitoring module 338 monitors the flight parameters of rotorcraft 300 using sensors 342. Sensors 342 may include any number or combination of the following sensors: a temperature sensor, air density sensor, location or global positioning system sensor, noise sensor, ram air sensor, rotor downwash sensor, airspeed sensor, altitude sensor, attitude sensor, wind velocity sensor, cyclic control position sensor, collective control position sensor, roll rate sensor, yaw rate sensor, pitch rate sensor, acceleration sensor such as a normal, lateral and/or longitudinal acceleration sensor, swashplate angle sensor, rotor flapping sensor, mechanical failure sensor, health monitoring system, descent rate sensor, traffic alert sensor or any other sensor suitable to perform the illustrative embodiments disclosed herein. In some embodiments, noise monitoring module 338 and quiet mode command module 340 may compare certain flight parameters of rotorcraft 300 with corresponding flight parameter thresholds and switch one or more tail rotors 312, 314, 316, 318 to quiet mode based on the comparison between the flight parameter(s) and the flight parameter threshold(s). For example, noise monitoring module 338 includes an altitude monitoring module 344, which monitors the altitude of rotorcraft 300. Altitude monitoring module 344 uses sensors 342 to determine the altitude of rotorcraft 300. Quiet mode command module 340 switches one or more tail rotors 312, 314, 316, 318 to quiet mode based on the altitude of rotorcraft 300 as determined by altitude monitoring module 344. Referring to FIGS. 13A-13B in conjunction with FIGS. 12A-12B, quiet mode command module 340 switches one or more tail rotors 312, 314, 316, 318 to quiet mode when the altitude of rotorcraft 300 falls below an altitude threshold 346. In some jurisdictions, altitude threshold 346 may be a regulatory threshold 348 below which the noise emitted from rotorcraft 300 is regulated or limited to specified noise levels. Switching into quiet mode below altitude threshold 346 reduces the amount of noise from rotorcraft 300 to which observers on the ground are exposed.

Referring back to FIGS. 12A-12B, noise monitoring module 338 also includes a location monitoring module 350, which monitors the location of rotorcraft 300. Location monitoring module 350 uses sensors 342 such as a global positioning system sensor to determine the location of rotorcraft 300. Quiet mode command module 340 switches one or more tail rotors 312, 314, 316, 318 to quiet mode based on the location of rotorcraft 300 as determined by location monitoring module 350. Referring to FIGS. 13C-13D in conjunction with FIGS. 12A-12B, quiet mode command module 340 may switch one or more tail rotors 312, 314, 316, 318 into quiet mode when rotorcraft 300 enters location 352. Location 352 may be an urban area or other location where noise is legally regulated. The general boundary of location 352 is a non-limiting example of regulatory thresholds 348 which, when traversed, may trigger quiet mode command module 340 to switch one or more tail rotors 312, 314, 316, 318 to quiet mode. Restricting the noise emitted from rotorcraft 300 in urban airspace, legally restricted areas or other noise sensitive locations reduces the number of observers exposed to unacceptable noise emissions from rotorcraft 300.

Referring back to FIGS. 12A-12B, regulatory thresholds 348 may include other flight or operating parameter thresholds such as decibels of noise emission or the rotational speed of tail rotors 312, 314, 316, 318, and quiet mode command module 340 may switch one or more tail rotors 312, 314, 316, 318 into quiet mode when a flight or operating parameter of rotorcraft 300 or yaw control matrix 304 traverses any of these regulatory thresholds 348. Other predefined thresholds, other than legal or regulatory thresholds 348, may also be compared against the flight parameters of rotorcraft 300, the operating parameters of tail rotors 312, 314, 316, 318 or any sensor data detected by sensors 342 to determine when to switch one or more tail rotors 312, 314, 316, 318 into quiet mode. Thus, monitoring modules other than altitude monitoring module 344 and location monitoring module 350 may be included in noise monitoring module 338. For example, noise monitoring module 338 may calculate a noise signature of yaw control matrix 304 based on one or more flight parameters of rotorcraft 300, one or more operating parameters of yaw control matrix 304 and/or sensor data from sensors 342. The noise signature may include the volume, the frequency content and/or other characteristics of the noise emitted from tail rotors 312, 314, 316, 318. Quiet mode command module 340 may then switch one or more tail rotors 312, 314, 316, 318 to quiet mode based on the noise signature calculated by noise monitoring module 338. For example, quiet mode command module 340 may switch one or more tail rotors 312, 314, 316, 318 to quiet mode in response to the noise emission decibel level of yaw control matrix 304 exceeding a decibel threshold. The emission of undesired frequencies such as undesired excitation or nuisance frequencies may also be used by quiet mode command module 340 to determine when to activate the quiet mode. Other parameters that may be monitored by noise monitoring module 338 include the airspeed of rotorcraft 300, the ambient temperature during flight, the ambient air density during flight, the RPMs of the motors of tail rotors 312, 314, 316, 318, the blade pitch of the tail rotor blades of tail rotors 312, 314, 316, 318 or any sensor data from sensors 342, and quiet mode command module 340 may switch one or more tail rotors 312, 314, 316, 318 to the quiet mode based on any of these parameters.

In yet other embodiments, the noise emitted by yaw control matrix 304 may be directly measured using one or more microphones or vibration sensors, and quiet mode command module 340 may switch one or more tail rotors 312, 314, 316, 318 into quiet mode based on these direct measurements.

The flight parameters monitored by noise monitoring module 338 may also include manual input 354 from an operator of rotorcraft 300 such as a pilot, an aircraft occupant or a remote operator. In such embodiments, quiet mode command module 340 may switch one or more tail rotors 312, 314, 316, 318 to quiet mode based on manual input 354. For example, the pilot of rotorcraft 300 may become aware of the need to reduce the noise emitted by rotorcraft 300 such as in low altitude flight or in the proximity of a hostile party, in which case the pilot may send manual input 354 to cause yaw control matrix 304 to switch into quiet mode. Thus, the quiet mode may be activated either automatically or manually. In embodiments in which the quiet mode may be automatically activated, the operator of rotorcraft 300 may be alerted when rotorcraft 300 is in quiet mode, and the quiet mode may be overridden or deactivated by the operator if desired. The quiet mode may be activated for rotorcraft 300 during any flight mode or maneuver of rotorcraft 300 including forward flight mode or hover mode.

In quiet mode, quiet mode command module 340 modifies one or more operating parameters of one or more tail rotors 312, 314, 316, 318 to reduce the noise emitted by yaw control matrix 304. Quiet mode command module 340 includes a rotational speed regulator 356 to modify the rotational speed(s) of one or more tail rotors 312, 314, 316, 318 in quiet mode. For example, rotational speed regulator 356 may reduce the rotational speed(s) of one or more tail rotors 312, 314, 316, 318 in quiet mode. Rotational speed regulator 356 may also set or modify a maximum rotational speed 358 of one or more tail rotors 312, 314, 316, 318, thus limiting the rotational speed(s) of one or more tail rotors 312, 314, 316, 318 to maximum rotational speed 358 in quiet mode. Modifying maximum rotational speed 358 may include changing maximum rotational speed 358 from an infinite value to a lower value, thus effectively providing a maximum rotational speed for one or more tail rotors 312, 314, 316, 318 where none existed before.

In some embodiments, quiet mode command module 340 may also include an acceleration regulator 360 that sets or modifies a maximum angular acceleration or maximum angular deceleration for one or more tail rotors 312, 314, 316, 318, thus limiting the angular acceleration or angular deceleration of one or more tail rotors 312, 314, 316, 318 to the maximum angular acceleration or maximum angular deceleration in quiet mode. For example, if acceleration regulator 360 sets a maximum angular acceleration for one or more tail rotors 312, 314, 316, 318 to a value N, then the angular acceleration of the affected tail rotor(s) is limited to values of N and below in quiet mode. Conversely, if acceleration regulator 360 sets a maximum angular deceleration for one or more tail rotors 312, 314, 316, 318 to a value −N, then the angular deceleration of the affected tail rotor(s) is limited to values of −N and above in quiet mode. Modification of the maximum angular acceleration or maximum angular deceleration may include, in some instances, changing the maximum angular acceleration or maximum angular deceleration from a positive infinite value to a lower value or a negative infinite value to higher value, thus effectively providing a maximum angular acceleration or maximum angular deceleration where none existed before.

In some embodiments, one or more tail rotors 312, 314, 316, 318 may be rotatable in either rotational direction to provide anti-torque or pro-torque thrust based on the needs of rotorcraft 300. Such reversible tail rotors reverse rotational direction at a motor reversal set point. Depending on the embodiment, the motor reversal set point may be set as a relation between pedal position and tail rotor motor speed, or may also be based on total anti-torque or yaw rate. Reversing rotational direction, however, may be a noisy operation since the tail rotor passes through a large range of rotational speeds by slowing down, momentarily stopping and speeding up again. Quiet mode command module 340 may control when and how quickly each tail rotor 312, 314, 316, 318 changes rotational direction so as to reduce overall noise, especially in flight conditions in which noise is least acceptable. In particular, quiet mode command module 340 may include a motor reversal set point regulator 362 to set or modify the motor reversal set point(s) of one or more tail rotors 312, 314, 316, 318 in quiet mode. By changing the motor reversal set point(s) of one or more tail rotors 312, 314, 316, 318, motor reversal set point regulator 362 may cause one or more tail rotors 312, 314, 316, 318 to change rotational direction less readily in quiet mode, thereby reducing the noise emissions of yaw control matrix 304. Motor reversal set point regulator 362 may be utilized during any flight mode or maneuver of rotorcraft 300. Quiet mode command module 340 may also have the capacity to lower transmission and/or generator noise by temporarily increasing battery power consumption by yaw control matrix 304. In particular, quiet mode command module 340 may include a power regulation module 364 to reduce the power supplied by generator 326 to one or more tail rotors 312, 314, 316, 318 and increase the power supplied by battery 330 to one or more tail rotors 312, 314, 316, 318 in quiet mode.

Quiet mode command module 340 may, in some instances, nonuniformly modify operating parameters such as rotational speed, angular acceleration and power consumption of tail rotors 312, 314, 316, 318 based on the size, the position or other characteristics of each tail rotor 312, 314, 316, 318. For example, larger and louder motors of tail rotors 312, 314, 316, 318 may be more strictly limited in quiet mode than smaller motors. Also, because motors of different sizes have different noise signature frequencies, quiet mode command module 340 may regulate certain frequency emissions from yaw control matrix 304 such as those that are capable of traveling longer distances. In this example, the motors of tail rotors 312, 314, 316, 318 that emit frequencies with longer travel distances may be more strictly limited in quiet mode than other motors. As a further example, the position of each tail rotor 312, 314, 316, 318 on shroud 308 is a factor in determining noise signature. Thus, each tail rotor 312, 314, 316, 318 may be regulated differently by quiet mode command module 340 based on the position of each tail rotor 312, 314, 316, 318. In one example, the tail rotors that have the largest effect on helicopter torque such as the aft-most tail rotor may be used in quiet mode to full capacity while quiet mode command module 340 regulates the operating parameters of the tail rotors that have the least effect on helicopter torque such as the forward-most tail rotor. Also, smaller tail rotors may be shut down or more highly regulated by quiet mode command module 340 than larger tail rotors. The flight mode of rotorcraft 300 may also determine how each tail rotor 312, 314, 316, 318 is regulated by quiet mode command module 340. For example, each tail rotor 312, 314, 316, 318 may be regulated differently in hover mode than in forward flight mode.

The activation, deactivation and/or extent of quiet mode may also be affected by the maneuver being performed by rotorcraft 300. Quiet mode controller 336 may include a maneuver detection module 366 to detect the maneuver being performed by rotorcraft 300. Quiet mode command module 340 may modify one or more operating parameters of one or more tail rotors 312, 314, 316, 318 in quiet mode based at least partially on the maneuver detected by maneuver detection module 366. For example, maneuvers that require a large amount of thrust from yaw control matrix 304 such as sideward flight may attenuate the amount of noise reduction implemented by quiet mode command module 340 until after the maneuver is complete. Maneuver detection module 366 may detect the maneuver being performed by rotorcraft 300 using sensor data from sensors 342. In other embodiments, the maneuver being performed by rotorcraft 300 may be determined based on the power consumption of each tail rotor 312, 314, 316, 318. The maneuver may also be manually inputted by a pilot or from elsewhere.

Figure 14A:
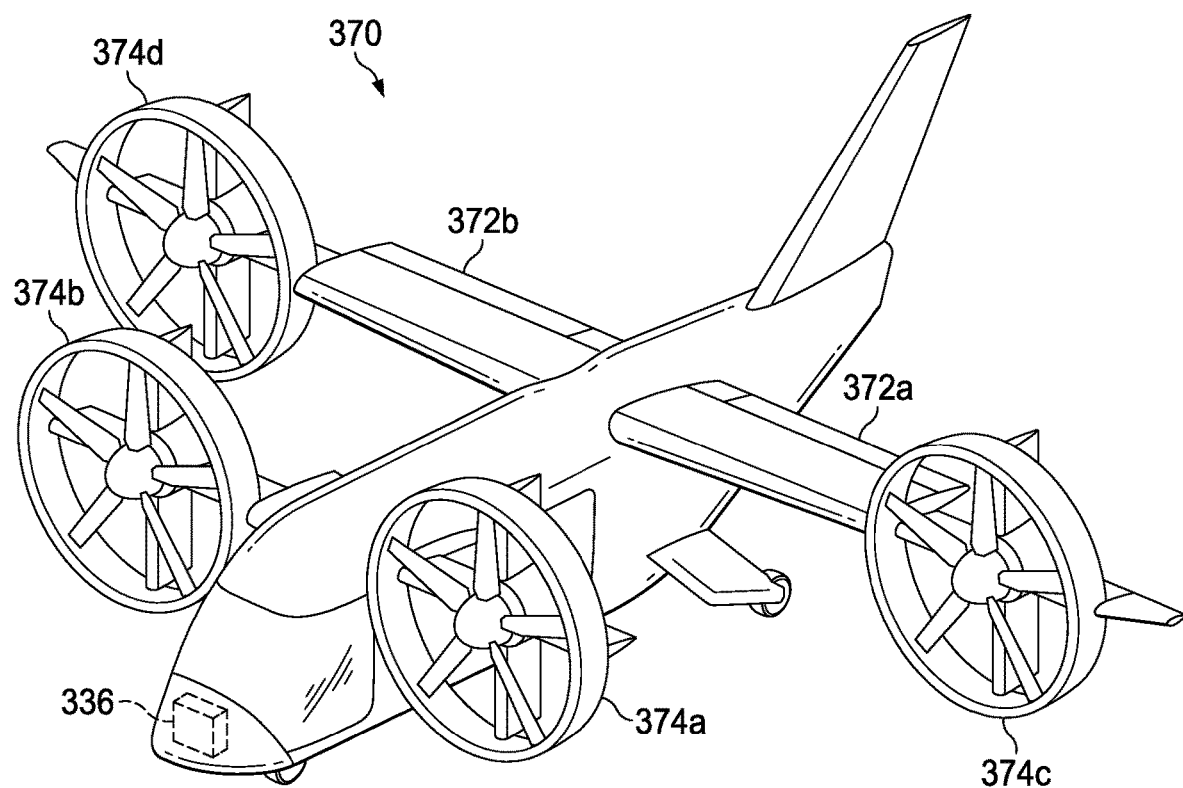
FIGS. 14A-14B are isometric views of an electric vertical takeoff and landing aircraft having a quiet mode in accordance with embodiments of the present disclosure.
Figure 14B:
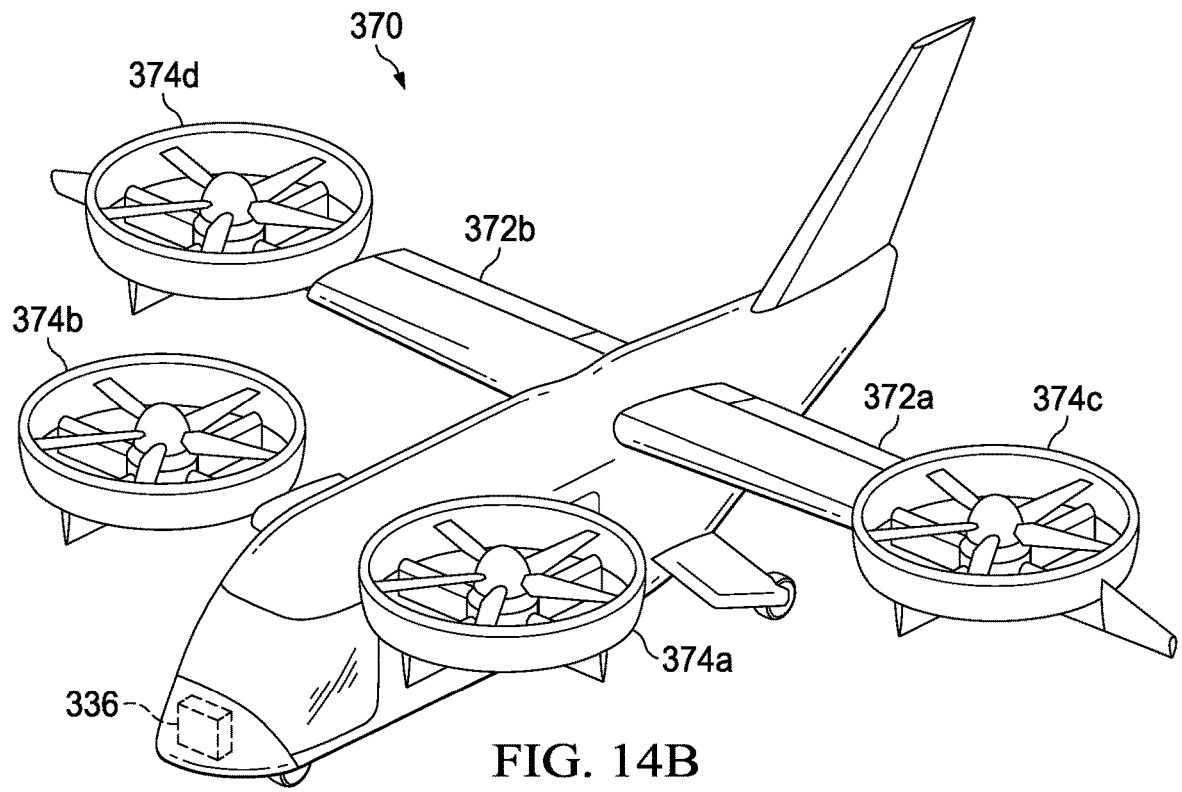

Referring to FIGS. 14A-14B in the drawings, isometric views of an electric vertical takeoff and landing (eVTOL) aircraft 370 for use with quiet mode controller 336 are depicted. FIG. 14A depicts eVTOL aircraft 370 in a forward flight mode wherein the rotor systems provide forward thrust with the forward airspeed of eVTOL aircraft 370 providing wing-borne lift enabling eVTOL aircraft 370 to have a high speed and/or high endurance forward flight mode. FIG. 14B depicts eVTOL aircraft 370 in a VTOL flight mode wherein the rotor systems provide thrust-borne lift. VTOL flight mode includes takeoff, hover and landing phases of flight. In the illustrated embodiment, eVTOL aircraft 370 includes wings 372a, 372b. Wings 372a, 372b have an airfoil cross-section that generates lift responsive to the forward airspeed of eVTOL aircraft 370.

In the illustrated embodiment, eVTOL aircraft 370 includes four rotor systems forming a two-dimensional distributed thrust array. The thrust array of eVTOL aircraft 370 includes a forward-port rotor system 374a, a forward-starboard rotor system 374b, an aft-port rotor system 374c and an aft-starboard rotor system 374d, which may be referred to collectively as rotor systems 374. Forward-port rotor system 374a and forward-starboard rotor system 374b are each rotatably mounted to a shoulder portion of the fuselage at a forward station thereof. Aft-port rotor system 374c is rotatably mounted on the outboard end of wing 372a. Aft-starboard rotor system 374d is rotatably mounted on the outboard end of wing 372b. In the illustrated embodiment, rotor systems 374 are ducted rotor systems each having a five bladed rotor assembly with variable pitch rotor blades operable for collective pitch control. Rotor systems 374 may each include at least one variable speed electric motor and a speed controller configured to provide variable speed control to the rotor assembly over a wide range of rotor speeds, or alternatively may each include at least one constant speed electric motor to provide fixed RPM. In other embodiments, the rotor systems could be non-ducted or open rotor systems, the number of rotor blades could be either greater than or less than five and/or the rotor blades could have a fixed pitch. eVTOL aircraft 370 may include any number of rotor systems either greater than or less than four rotor systems such as a coaxial rotor system or six rotor systems.

When eVTOL aircraft 370 is operating in the forward flight orientation and supported by wing-borne lift, rotor systems 374 each have a generally vertical position with the forward rotor assemblies rotating generally in a forward vertical plane and the aft rotor assemblies rotating generally in an aft vertical plane, as best seen in FIG. 14A. When eVTOL aircraft 370 is operating in the VTOL orientation and supported by thrust-borne lift, rotor systems 374 each have a generally horizontal position such that the rotor assemblies are rotating in generally the same horizontal plane, as best seen in FIG. 14B. Transitions between the VTOL orientation and the forward flight orientation of eVTOL aircraft 370 are achieved by changing the angular positions of rotor systems 374 between their generally horizontal positions and their generally vertical positions. Quiet mode controller 336 in FIG. 12B may be used to control the noise emissions of rotor systems 374 in a similar manner to that described for yaw control matrix 304. For example, noise monitoring module 338 may monitor one or more parameters of eVTOL aircraft 370 and quiet mode command module 340 may modify one or more operating parameters of rotor systems 374 based on the parameters monitored and detected by noise monitoring module 338. Thus, noise controller 336 is not limited to being used for yaw control systems only and may be used for a wide variety of rotor propulsion systems utilized on rotorcraft.

Figure 15:
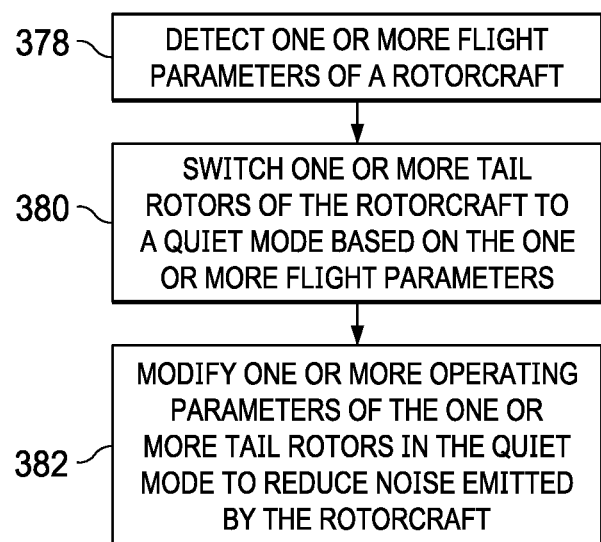
FIG. 15 is a flowchart of a method for managing noise emissions from one or more tail rotors of a rotorcraft in accordance with embodiments of the present disclosure.

Referring to FIG. 15 in the drawings, a method for managing the noise emissions of one or more tail rotors of a rotorcraft such as a helicopter is depicted. The method includes detecting one or more flight parameters of a rotorcraft (step 378). The method also includes switching one or more tail rotors of the rotorcraft to a quiet mode based on the one or more flight parameters (step 380). The method also includes modifying one or more operating parameters of the one or more tail rotors in quiet mode to reduce the noise emitted by the rotorcraft (step 382). In some embodiments, the method may include calculating a noise signature of one or more tail rotors based on one or more flight parameters of the rotorcraft and/or one or more operating parameters of the tail rotors. Such a method may include switching one or more tail rotors to quiet mode in response to the noise signature exceeding a noise signature threshold. In other embodiments, the method may include comparing one or more flight parameters with one or more flight parameter thresholds. Such a method may include switching one or more tail rotors to quiet mode based on the comparison between one or more flight parameters and one or more flight parameter thresholds. In other embodiments, the method may include detecting a maneuver being performed by the rotorcraft. In such a method, one or more operating parameters of one or more tail rotors may be modified in quiet mode based at least partially on the detected maneuver.

Referring to FIGS. 16A-16B in the drawings, rotorcraft 400 is depicted as a helicopter including yaw control system 402. Yaw control matrix 404 is coupled to an aft portion of tailboom 406 of rotorcraft 400. Yaw control matrix 404 includes shroud 408, which forms ducts 410. Upper forward tail rotor 412, upper aft tail rotor 414, lower forward tail rotor 416 and lower aft tail rotor 418 are disposed in ducts 410 and secured by stators 420. In the illustrated embodiment, shroud 408, ducts 410 and tail rotors 412, 414, 416, 418 collectively form a generally rhombus shape configuration, although shroud 408, ducts 410 and tail rotors 412, 414, 416, 418 may separately or collectively form any shape configuration. It will be appreciated by one of ordinary skill in the art that tail rotors 412, 414, 416, 418 may be positioned in an infinite number of configurations relative to one another depending on the embodiment, and that yaw control matrix 404 may include any number of ducts and tail rotors. In the illustrated embodiment, yaw control system 402 is an electrically distributed yaw control system in which tail rotor blades 412a, 414a, 416a, 418a of tail rotors 412, 414, 416, 418 are fixed pitch tail rotor blades and the motors of tail rotors 412, 414, 416, 418 are variable rotational speed motors capable of changing RPMs. In other embodiments, however, tail rotor blades 412a, 414a, 416a, 418a of tail rotors 412, 414, 416, 418 may be variable pitch tail rotor blades having a fixed or variable rotational speed and may be electrically, mechanically or hydraulically driven. In yet other embodiments, one set of one or more tail rotors 412, 414, 416, 418 may be fixed pitch, variable rotational speed tail rotors while a different set of one or more tail rotors 412, 414, 416, 418 are variable pitch, fixed rotational speed tail rotors variable pitch, variable rotational speed tail rotors.

Sharp or sudden anti-torque input such as pedal input from the pilot of a helicopter can cause the tail rotor to flap out of its plane of rotation and contact the tailboom or other portion of the helicopter airframe. For example, as shown in FIG. 16B, loads such as bending loads on tail rotor blades 412a, 414a, 416a, 418a of tail rotors 412, 414, 416, 418 may cause tail rotor blades 412a, 414a, 416a, 418a to bend and potentially collide with a portion of the airframe of rotorcraft 400 such as stators 420. Such a collision may cause damage to tail rotors 412, 414, 416, 418 or the airframe of rotorcraft 400 such as stators 420, shroud 408 or tailboom 406. To address this issue, yaw control system 402 includes an airframe protection system 422, which includes airframe protection module 424 implemented by flight control computer 426 of rotorcraft 400. Airframe protection system 422 protects the integrity of the airframe of rotorcraft 400 as well as tail rotors 412, 414, 416, 418 during the various flight modes, maneuvers and other flight conditions of rotorcraft 400. For example, airframe protection system 422 may prevent the pilot of rotorcraft 400 from inputting an excessive anti-torque input at high airspeeds or during certain maneuvers to prevent damage to the airframe of rotorcraft 400. To protect the airframe of rotorcraft 400, airframe protection system 422 controls the behavior of tail rotors 412, 414, 416, 418 based on monitored flight parameters of rotorcraft 400 and/or operating parameters of tail rotors 412, 414, 416, 418. Airframe protection module 424 includes an airframe protection monitoring module 428 and an airframe protection command module 430, which work in conjunction with one another to monitor one or more parameters of rotorcraft 400 and modify one or more operating parameters of one or more tail rotors 412, 414, 416, 418 based on the one or more monitored parameters of rotorcraft 400, thereby protecting the airframe of rotorcraft 400.

Figure 17C:
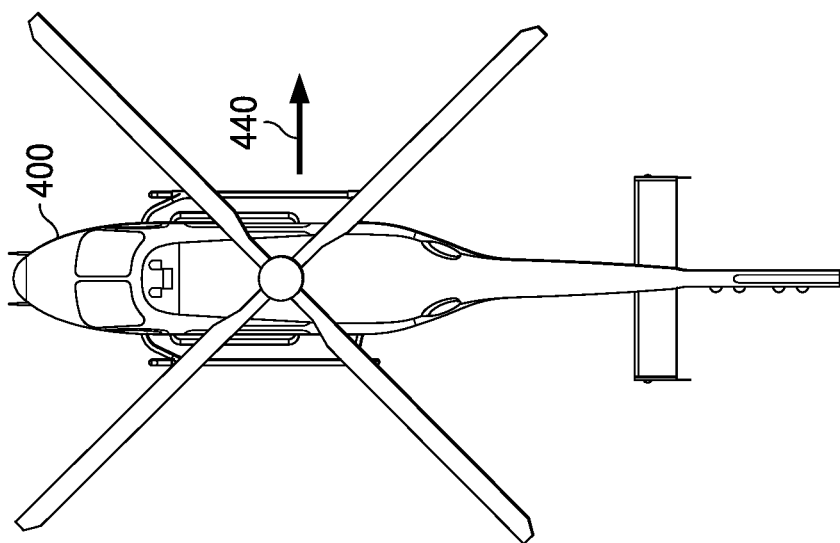
FIGS. 17A-17C are top views of a rotorcraft having a yaw control system including an airframe protection system in various flight operating scenarios in accordance with embodiments of the present disclosure.
Figure 17B:
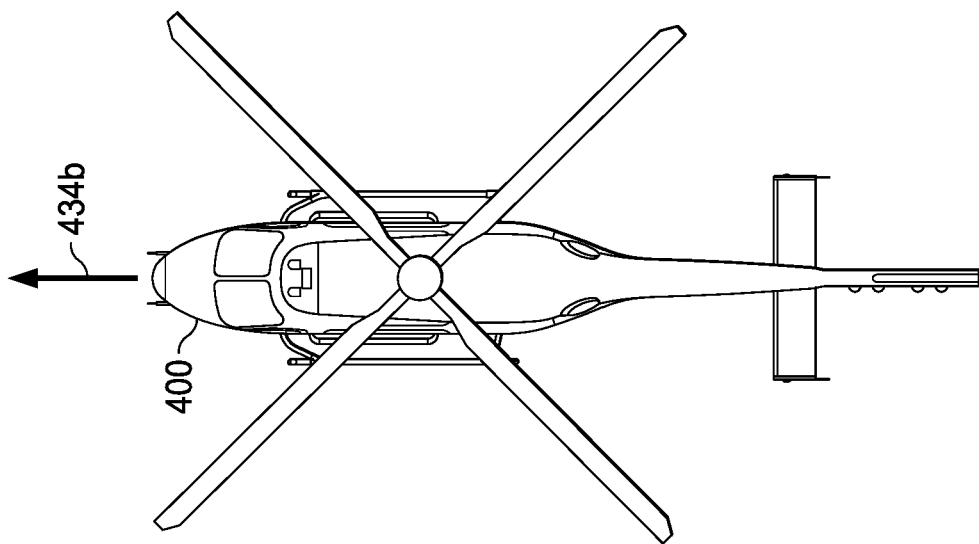
Figure 17A:
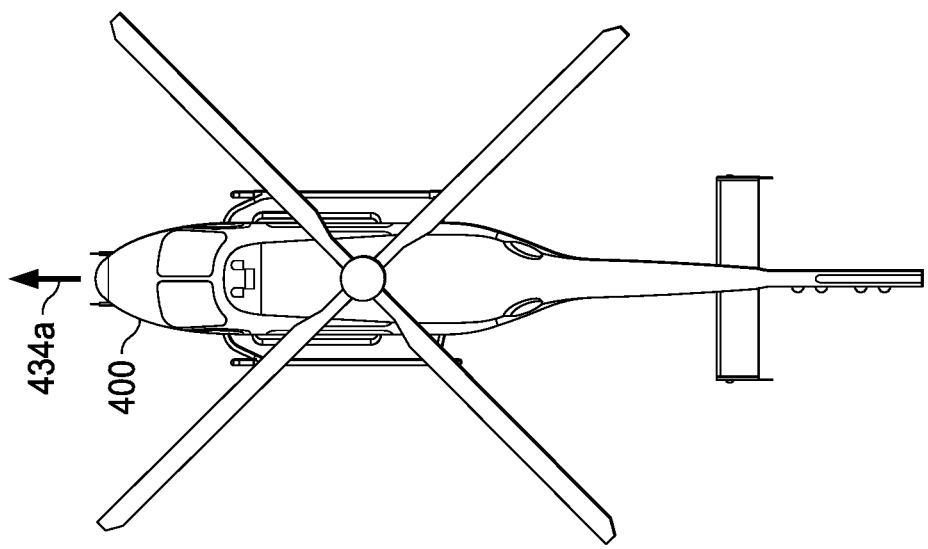

Airframe protection monitoring module 428 includes an airspeed monitoring module 432 to monitor the airspeed of rotorcraft 400. Airframe protection command module 430 modifies one or more operating parameters of one or more tail rotors 412, 414, 416, 418 based on the airspeed of rotorcraft 400 detected by airspeed monitoring module 432. Referring to FIGS. 17A-17B in conjunction with FIGS. 16A-16B, rotorcraft 400 is shown traveling at a low airspeed 434a and a higher airspeed 434b. Airframe protection command module 430 may modify one or more operating parameters of one or more tail rotors 412, 414, 416, 418 in response to the airspeed of rotorcraft 400 exceeding an airspeed threshold 436. For example, airframe protection command module 430 may modify one or more operating parameters of one or more tail rotors 412, 414, 416, 418 when rotorcraft 400 is traveling at airspeed 434b as shown in FIG. 17B if airspeed 434b exceeds airspeed threshold 436. Controlling the behavior of tail rotors 412, 414, 416, 418 at high airspeeds 434b is particularly beneficial since tail rotor blades 412a, 414a, 416a, 418a may be more susceptible to bending loads when rotorcraft 400 is traveling at higher speeds. In certain embodiments, however, the operating parameters of tail rotors 412, 414, 416, 418 may be controlled at lower airspeeds 434a or during hover mode since tail rotor blades 412a, 414a, 416a, 418a may in some cases be susceptible to bending loads at lower airspeeds 434a as well.

Returning to FIGS. 16A-16B, airframe protection monitoring module 428 may include maneuver detection module 438, which detects the maneuver being performed by rotorcraft 400. Airframe protection command module 430 modifies one or more operating parameters of one or more tail rotors 412, 414, 416, 418 based on the maneuver detected by maneuver detection module 438. Maneuver detection module 438 may detect the maneuver being performed by rotorcraft 400 using sensor data from on-board sensors. In other embodiments, the maneuver being performed by rotorcraft 400 may be determined based on the power consumption of each tail rotor 412, 414, 416, 418. The maneuver may also be manually inputted by a pilot or from elsewhere. Referring to FIG. 17C in conjunction with FIGS. 16A-16B, rotorcraft 400 is performing a sideward flight maneuver by traveling in a sideward direction 440. Because high thrust may be required from yaw control matrix 404 when rotorcraft 400 performs a sideward flight maneuver, tail rotor blades 412a, 414a, 416a, 418a may be particularly susceptible to bending loads when performing such maneuvers. Airframe protection command module 430 modifies one or more operating parameters of one or more tail rotors 412, 414, 416, 418 in response to maneuver detection module 438 detecting the sideward flight maneuver. The sideward flight maneuver performed by rotorcraft 400 in FIG. 17C is one among many maneuvers that may be detected by maneuver detection module 438. Other non-limiting examples of maneuvers that may trigger a change in behavior of tail rotors 412, 414, 416, 418 include full power climbs, sharp turns or steep descents.

Returning to FIGS. 16A-16B, airframe protection monitoring module 428 may include load determination module 442. Load determination module 442 detects loads such as bending loads on tail rotor blades 412a, 414a, 416a, 418a using one or more sensors such as strain gauges, accelerometers, Hall Effect sensors or other sensor types. Such sensors may be located on or near each tail rotor 412, 414, 416, 418. Airframe protection command module 430 modifies one or more operating parameters of one or more tail rotors 412, 414, 416, 418 based on the loads on tail rotor blades 412a, 414a, 416a, 418a as detected by load determination module 442. In some embodiments, airframe protection command module 430 may modify one or more operating parameters of one or more tail rotors 412, 414, 416, 418 in response to the detected load on one or more tail rotors 412, 414, 416, 418 exceeding a load threshold 444. Load threshold 444 may be predetermined based on the design of rotorcraft 400 and/or validated during flight testing. For example, flight tests may be conducted on rotorcraft 400 to determine the maximum tolerable load on tail rotor blades 412a, 414a, 416a, 418a and operator input 446 such as anti-torque input that correlates to the maximum tolerable load. In this example, airframe protection command module 430 may limit operator input 446 to values that result in the load on tail rotor blades 412a, 414a, 416a, 418a being less than the maximum tolerable load.

Load determination module 442 may also detect a load on the airframe of rotorcraft 400 using sensors 448 such as strain gauges, accelerometers, Hall Effect sensors or other sensor types. Airframe protection command module 430 may then modify one or more operating parameters of one or more tail rotors 412, 414, 416, 418 based on the airframe load detected by load determination module 442. In certain embodiments, airframe protection command module 430 may modify one or more operating parameters of one or more tail rotors 412, 414, 416, 418 in response to the airframe load on rotorcraft 400 exceeding load threshold 444, which may be predetermined in flight testing or calculated based on the design of rotorcraft 400 including the anticipated load tolerance of the airframe structure. For example, flight tests may be conducted to determine the maximum tolerable airframe load on tailboom 406. In this example, airframe protection command module 430 may limit operator input 446 to values that result in the load on tailboom 406 being less than the maximum tolerable airframe load.

Airframe protection monitoring module 428 may also include a tail rotor blade clearance monitoring module 450, which detects a clearance distance 452 between tail rotor blades 412a, 414a, 416a, 418a and the airframe of rotorcraft 400 using sensors such as accelerometers, Hall Effect sensors or other sensor types on or near tail rotors 412, 414, 416, 418. Airframe protection command module 430 modifies one or more operating parameters of one or more tail rotors 412, 414, 416, 418 based on clearance distance 452 detected by tail rotor blade clearance monitoring module 450. For example, airframe protection command module 430 may modify one or more operating parameters of one or more tail rotors 412, 414, 416, 418 in response to clearance distance 452 being less than a minimum tail rotor blade clearance threshold 454.

Airframe protection command module 430 is capable of modifying one or more operating parameters of one or more tail rotors 412, 414, 416, 418 based on one or more flight or operating parameters detected by airframe protection monitoring module 428 to prevent contact between tail rotor blades 412a, 414a, 416a, 418a and stators 420 or other portions of the airframe of rotorcraft 400. In controlling the behavior of tail rotors 412, 414, 416, 418, airframe protection command module 430 may directly control one or more operating parameters of tail rotors 412, 414, 416, 418 such as by directly controlling the motors of tail rotors 412, 414, 416, 418. Airframe protection command module 430 may also indirectly control the behavior of tail rotors 412, 414, 416, 418 by modifying operator input 446 such as anti-torque input from an operator of rotorcraft 400 based on the parameters detected by airframe protection monitoring module 428.

Airframe protection command module 430 includes rotational speed regulator 456, which modifies the rotational speed(s) of one or more tail rotors 412, 414, 416, 418 based on the parameters monitored by airframe protection monitoring module 428. In regulating the rotational speeds of tail rotors 412, 414, 416, 418, rotational speed regulator 456 also regulates the thrust emitted by each tail rotor 412, 414, 416, 418, thereby also limiting thrust variation. Rotational speed regulator 456 may reduce the rotational speed(s) of one or more tail rotors 412, 414, 416, 418 based on one or more of the parameters monitored by airframe protection monitoring module 428. For example, rotational speed regulator 456 may reduce the rotational speed(s) of one or more tail rotors 412, 414, 416, 418 if rotorcraft 400 exceeds airspeed threshold 436. Rotational speed regulator 456 may also set or modify a maximum rotational speed 458 for one or more tail rotors 412, 414, 416, 418. Rotational speed regulator 456 may thus limit the rotational speed(s) of one or more tail rotors 412, 414, 416, 418 to maximum rotational speed 458 based on one or more parameters detected by airframe protection monitoring module 428. For example, rotational speed regulator 456 may set maximum rotational speed 458 for one or more tail rotors 412, 414, 416, 418 if rotorcraft 400 performs a sideward flight maneuver. Modifying maximum rotational speed 458 may include changing maximum rotational speed 458 from an infinite value to a lower value, thus effectively providing a maximum rotational speed for one or more tail rotors 412, 414, 416, 418 where none existed before.

Airframe protection command module 430 includes an acceleration regulator 460, which sets or modifies a maximum angular acceleration or a maximum angular deceleration of one or more tail rotors 412, 414, 416, 418. Acceleration regulator 460 may thus limit angular acceleration or angular deceleration of one or more tail rotors 412, 414, 416, 418 to the maximum angular acceleration or the maximum angular deceleration based on the one or more parameters monitored by airframe protection monitoring module 428. For example, if the load experienced by one of tail rotors 412, 414, 416, 418 exceeds load threshold 444, airframe protection command module 430 may limit the angular acceleration or angular deceleration for that tail rotor. If acceleration regulator 460 sets a maximum angular acceleration for one or more tail rotors 412, 414, 416, 418 to a value N, then the angular acceleration of the affected tail rotor(s) may be limited to values of N and below. Conversely, if acceleration regulator 460 sets a maximum angular deceleration for one or more tail rotors 412, 414, 416, 418 to a value −N, then the angular deceleration of the affected tail rotor(s) may be limited to values of −N and above. Modification of the maximum angular acceleration or maximum angular deceleration may include, in some instances, changing the maximum angular acceleration or maximum angular deceleration from a positive infinite value to a lower value or a negative infinite value to higher value, thus effectively providing a maximum angular acceleration or maximum angular deceleration where none existed before.

In embodiments in which one or more tail rotors 412, 414, 416, 418 have variable pitch tail rotor blades, airframe protection command module 430 may include a blade pitch regulator 462. Blade pitch regulator 462 may modify the blade pitch of the variable pitch tail rotor blades on one or more tail rotors 412, 414, 416, 418 based on the one or more parameters monitored by airframe protection monitoring module 428. For example, blade pitch regulator 462 may lower the blade pitch of the tail rotor blades of one or more tail rotors 412, 414, 416, 418 at high airspeeds to reduce the loads experienced by the tail rotor blades.

Airframe protection command module 430 may, in some embodiments, uniformly modify or set the operating parameters of tail rotors 412, 414, 416, 418. Airframe protection command module 430 may also nonuniformly modify the operating parameters of tail rotors 412, 414, 416, 418 based on the size, position or other characteristics of each tail rotor 412, 414, 416, 418. For example, larger motors of tail rotors 412, 414, 416, 418 may be more strictly limited than smaller motors when rotorcraft 400 exceeds airspeed threshold 436. Also, because motors of different sizes have different excitation frequencies, airframe protection command module 430 may target certain frequency emissions from yaw control matrix 404 such as those that overlap a natural frequency of the airframe. In this example, the motors of tail rotors 412, 414, 416, 418 that emit frequencies that overlap a natural frequency may be more strictly limited than other motors to protect the airframe structure of rotorcraft 400. Each tail rotor 412, 414, 416, 418 may also be regulated differently by airframe protection command module 430 based on the position of each tail rotor 412, 414, 416, 418 in yaw control matrix 404. In other non-limiting examples, smaller tail rotors may be shut down or more highly regulated by airframe protection command module 430 than larger tail rotors. The flight mode of rotorcraft 400 may also determine how each tail rotor 412, 414, 416, 418 is regulated by airframe protection command module 430. For example, each tail rotor 412, 414, 416, 418 may be regulated differently in hover mode than in forward flight mode. The maneuver being performed by rotorcraft 400, as detected by maneuver detection module 438, may also determine how each tail rotor 412, 414, 416, 418 is regulated by airframe protection command module 430. In the event that one or more tail rotors are not rotating due to, for example, being shut down to reduce noise or a motor failure, the maximum commandable rotational speed, acceleration and/or pitch angle may be different or absent on the remaining tail rotors. As such, airframe protection monitoring module 428 may also determine the current tail rotor configuration that is active on the aircraft. Alternatively or additionally, the cockpit may include an override switch that allows the operator of the aircraft to override the airframe protection system in some flight conditions or following an electrical motor failure, among other operational circumstances.

Airframe protection system 422 may be used by yaw control system 402 to prevent tail rotor blades 412a, 414a, 416a, 418a from contacting the airframe of rotorcraft 400 including stators 420 in each duct 410. Airframe protection system 422 may prevent the operator of rotorcraft 400 from commanding a sharp change in anti-thrust load in some flight conditions that could result in structural damage to the airframe of rotorcraft 400 or tail rotors 412, 414, 416, 418. Because airframe protection module 424 may be implemented by flight control computer 426, the cost and weight penalty typically associated with hardware components may be reduced or eliminated using the illustrative embodiments.

Figure 18A:
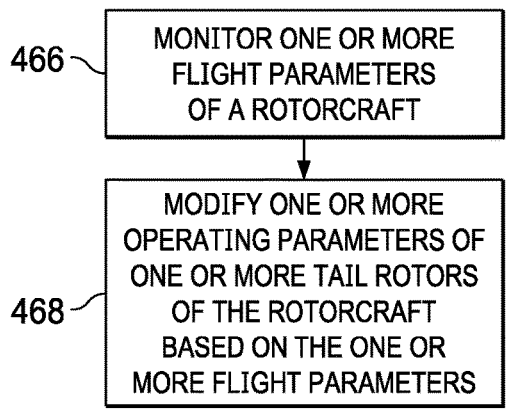
FIGS. 18A-18B are flowcharts of various methods for protecting the airframe of a rotorcraft having a yaw control system in accordance with embodiments of the present disclosure.
Figure 18B:
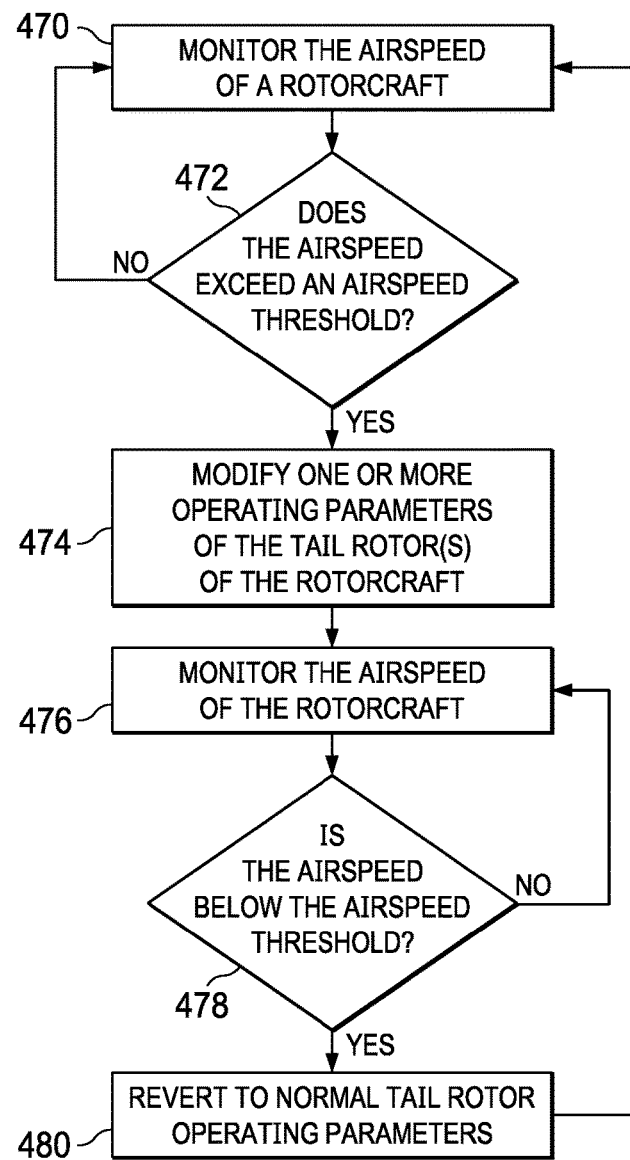

Referring to FIGS. 18A-18B in the drawings, methods for protecting an airframe of a rotorcraft such as a helicopter are depicted. In FIG. 18A, the method includes monitoring one or more flight parameters of a rotorcraft (step 466). In some embodiments, step 466 may include monitoring at least one of an airspeed of the rotorcraft, a maneuver being performed by the rotorcraft, a load experienced by the rotorcraft, a clearance distance between the airframe of the rotorcraft and the tail rotor blades of one or more tail rotors and/or the status of the tail rotors (e.g., operating, shut down or failed). The method may also include modifying one or more operating parameters of one or more tail rotors of the rotorcraft based on the one or more flight parameters (step 468). Step 468 may include modifying at least one of a maximum angular acceleration, a maximum angular deceleration, a maximum rotational speed, a rotational speed or a blade pitch of one or more tail rotors. In other embodiments, step 468 may include modifying anti-torque input from an operator of the rotorcraft based on the one or more flight parameters. In FIG. 18B, the method includes monitoring the airspeed of a rotorcraft (step 470). The method determines whether the airspeed of the rotorcraft exceeds an airspeed threshold (step 472). If the method determines that the airspeed of the rotorcraft does not exceed the airspeed threshold, the method returns to step 470. If it is determined that the airspeed of the rotorcraft exceeds the airspeed threshold, the method modifies one or more operating parameters of one or more tail rotors of the rotorcraft (step 474). The method continues to monitor the airspeed of the rotorcraft (step 476). The method determines whether the airspeed of the rotorcraft falls below the airspeed threshold (step 478). If the method determines that the airspeed of the rotorcraft has not fallen below the airspeed threshold, the method returns to step 476. If the method determines that the airspeed of the rotorcraft has fallen below the airspeed threshold, the method reverts back to normal operating parameters of the tail rotor(s) (step 480). The method may then return to step 470.

Figure 19:
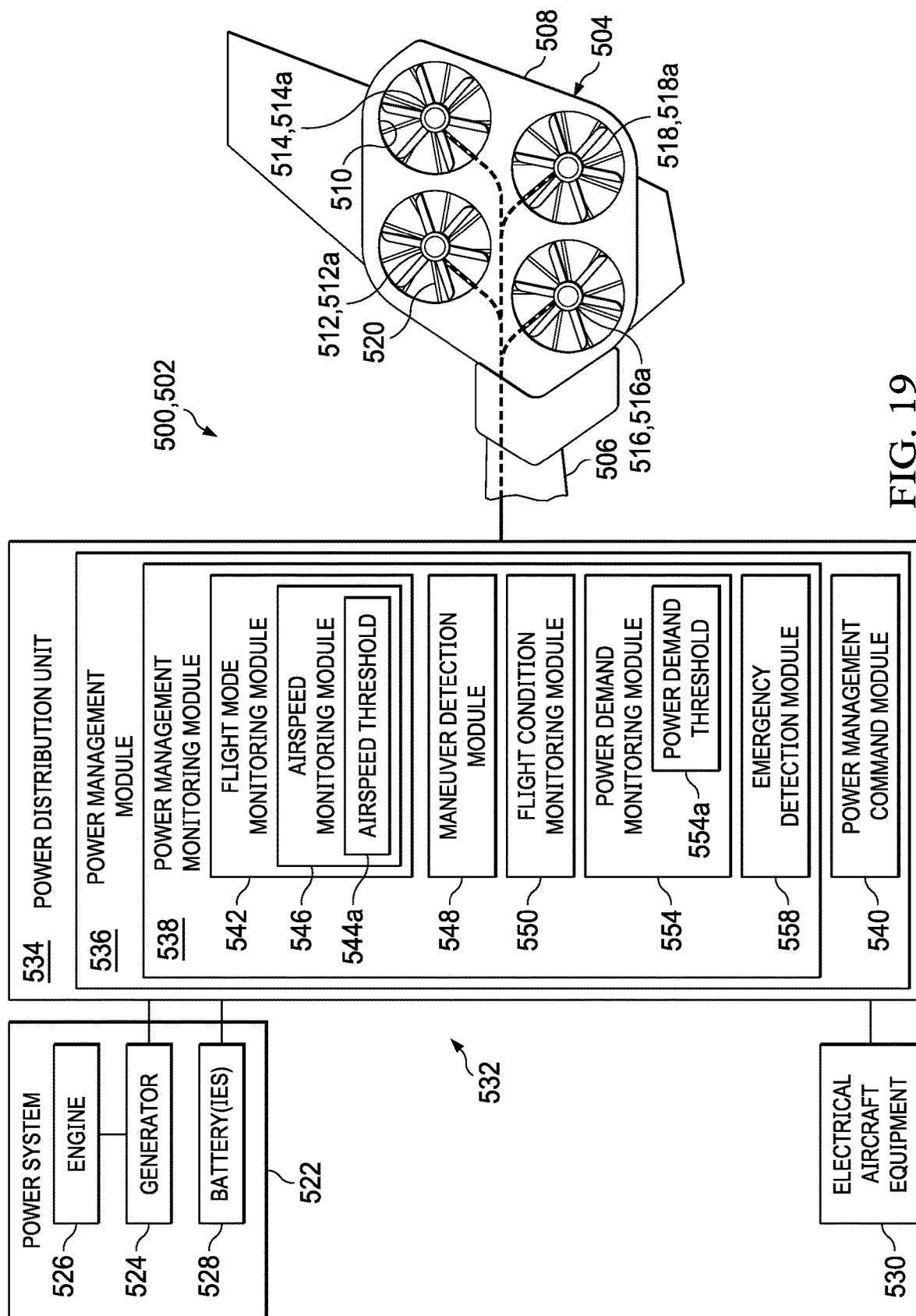
FIG. 19 is a schematic illustration of a yaw control system for a rotorcraft including a power management system in accordance with embodiments of the present disclosure.

Referring to FIG. 19 in the drawings, rotorcraft 500 is depicted as a helicopter including yaw control system 502. Yaw control matrix 504 is coupled to an aft portion of tailboom 506 of rotorcraft 500. Yaw control matrix 504 includes shroud 508, which forms ducts 510. Upper forward tail rotor 512, upper aft tail rotor 514, lower forward tail rotor 516 and lower aft tail rotor 518 are disposed in ducts 510 and secured by stators 520. In the illustrated embodiment, shroud 508, ducts 510 and tail rotors 512, 514, 516, 518 collectively form a generally rhombus shape configuration, although shroud 508, ducts 510 and tail rotors 512, 514, 516, 518 may separately or collectively form any shape configuration. It will be appreciated by one of ordinary skill in the art that tail rotors 512, 514, 516, 518 may be positioned in an infinite number of configurations relative to one another depending on the embodiment, and that yaw control matrix 504 may include any number of ducts and tail rotors. In the illustrated embodiment, yaw control system 502 is an electrically distributed yaw control system in which the tail rotor blades of tail rotors 512, 514, 516, 518 are fixed pitch tail rotor blades and motors 512a, 514a, 516a, 518a of tail rotors 512, 514, 516, 518 are variable rotational speed motors capable of changing RPMs. In other embodiments, however, the tail rotor blades of tail rotors 512, 514, 516, 518 may be variable pitch tail rotor blades having an electrically-driven fixed or variable rotational speed. In yet other embodiments, one set of one or more tail rotors 512, 514, 516, 518 may be fixed pitch, variable rotational speed tail rotors while a different set of one or more tail rotors 512, 514, 516, 518 are variable pitch, fixed rotational speed tail rotors.

Rotorcraft 500 includes power system 522 used to power yaw control system 502. Power system 522 includes generator 524 such as a starter generator powered by engine 526. Power system 522 also includes one or more batteries 528, which may include any number of batteries. For example, battery 528 may include additional batteries to lengthen the amount of time that rotorcraft 500 can perform an operation with a high power demand. In some embodiments, battery 528 may be used to power electrical aircraft equipment 530 such as cockpit displays, internal lights, external lights, motor controllers as well as other electrical components. Battery 528 may include a power converter to convert power to the format used by electrical aircraft equipment 530. For example, battery 528 may incorporate a 28-volt direct current power converter. By incorporating a power converter, generator 524 may be switched off in flight if desired, thereby improving power efficiency. In some embodiments, generator 524 may be switched off in flight while one or more high voltage electrical generators for yaw control system 502, which may be installed on the aircraft main gearbox, remain in operation. Battery 528 may also be used to power electrical aircraft equipment 530 during an engine loss event.

In traditional helicopters, power components such as generators and batteries must be sized to provide peak power values at all times simultaneously, even though such peak power values are used only in limited circumstances such as during certain maneuvers. Rotorcraft 500 includes a power management system 532 to address this issue. Power management system 532 uses battery 528 in conjunction with generator 524 to provide power to tail rotor motors 512a, 514a, 516a, 518a in electrically distributed yaw control system 502. Power management system 532 enables the downsizing of generator 524 so that it provides only a portion of the power required by yaw control system 502 in high demanding flight conditions such as during hover mode. In such conditions, battery 528 may be used to supplement the power provided by generator 524. When rotorcraft 500 transitions into flight conditions that require less power such as forward flight mode, generator 524 may recharge battery 528 while providing most or all of the power to tail rotor motors 512a, 514a, 516a, 518a. Power management system 532 includes a power distribution unit 534, which may be a standalone unit separate from the flight control computer of rotorcraft 500. In other embodiments, power distribution unit 534 including power management module 536 may be implemented by the flight control computer of rotorcraft 500. Power management module 536 includes power management monitoring module 538, which monitors one or more flight parameters of rotorcraft 500. Power management monitoring module 538 works in conjunction with power management command module 540, which allocates power between power system 522 and tail rotor motors 512a, 514a, 516a, 518a based on the one or more flight parameters of rotorcraft 500 monitored by power management monitoring module 538.

Figure 20A:
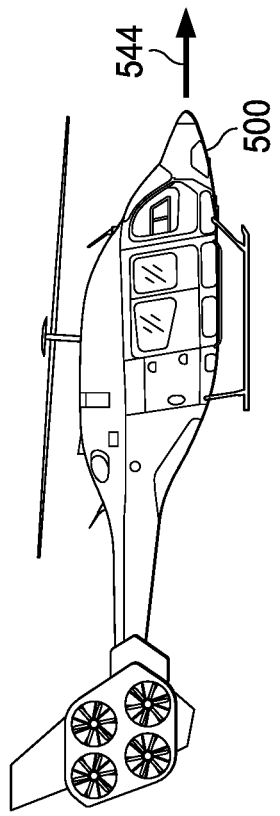
FIGS. 20A-20H are schematic illustrations of a rotorcraft having a yaw control system including a power management system in various flight operating scenarios in accordance with embodiments of the present disclosure.
Figure 20B:
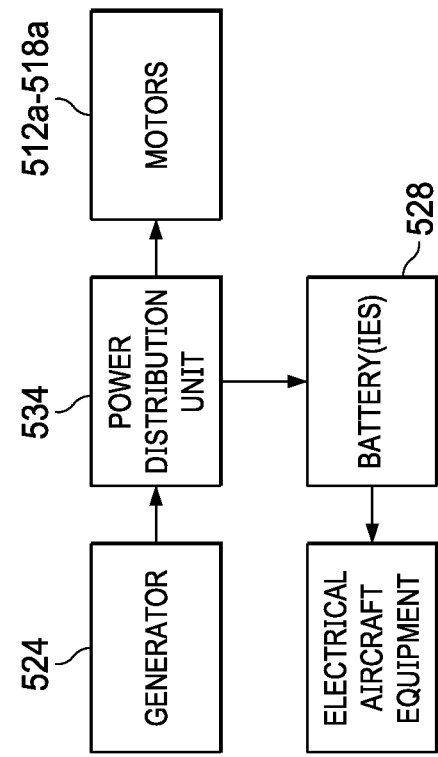

Power management monitoring module 538 may include a flight mode monitoring module 542 to monitor and detect the flight mode of rotorcraft 500. Power management command module 540 allocates power between power system 522 and one or more tail rotor motors 512a, 514a, 516a, 518a based on the flight mode detected by flight mode monitoring module 542. Referring to FIGS. 20A-20B in conjunction with FIG. 19, when flight mode monitoring module 542 detects that rotorcraft 500 is in hover mode as shown in FIG. 20A, power management command module 540 of power distribution unit 534 allocates power from generator 524 and battery 528 to one or more tail rotor motors 512a, 514a, 516a, 518a. Power from both generator 524 and battery 528 may be useful or necessary when rotorcraft 500 is in hover mode so that yaw control matrix 504 can provide sufficient anti-torque thrust to control the yaw of rotorcraft 500. Battery 528 may continue to provide power to electrical aircraft equipment 530 when rotorcraft 500 is in hover mode.

Figure 20C:
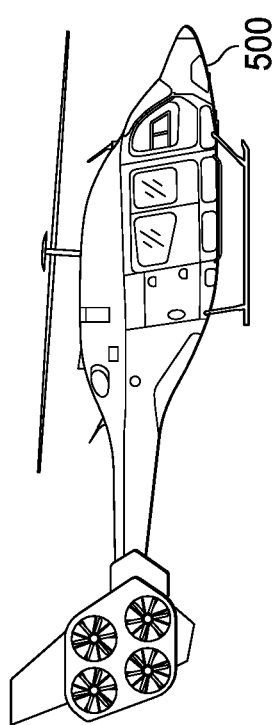
Figure 20D:
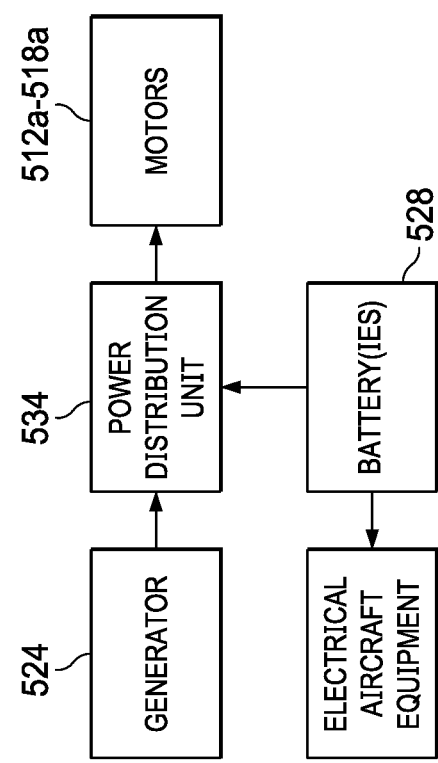

Referring to FIGS. 20C-20D in conjunction with FIG. 19, flight mode monitoring module 542 may also detect whether rotorcraft 500 is in forward flight mode. FIG. 20C illustrates rotorcraft 500 in forward flight mode having a forward airspeed 544. Power management command module 540 of power distribution unit 534 allocates power from generator 524 to one or more tail rotor motors 512a, 514a, 516a, 518a when rotorcraft 500 is in forward flight mode. In contrast to hover mode, however, power distribution unit 534 does not allocate power from battery 528 to tail rotor motors 512a, 514a, 516a, 518a when rotorcraft 500 is in forward flight mode. Power from battery 528 may be less essential when rotorcraft 500 is in forward flight mode since rotorcraft 500 can maintain a stable yaw orientation using fins or other control surfaces. In some embodiments, power management command module 540 of power distribution unit 534 may allocate power from generator 524 to battery 528 when rotorcraft 500 is in forward flight mode to recharge battery 528 during this time. Thus, battery 528 may be recharged and ready to provide power to tail rotor motors 512a, 514a, 516a, 518a during other flight modes or operations of rotorcraft 500 such as hover mode. Battery 528 may continue to supply power to electrical aircraft equipment 530 when rotorcraft 500 is in forward flight mode.

Referring back to FIG. 19, in some embodiments flight mode monitoring module 542 may include an airspeed monitoring module 546 to monitor the airspeed of rotorcraft 500. Power management command module 540 allocates power between power system 522 and one or more tail rotor motors 512a, 514a, 516a, 518a based on the airspeed of rotorcraft 500. Referring to FIGS. 20C-20D in conjunction with FIG. 19, when forward airspeed 544 of rotorcraft 500 exceeds airspeed threshold 544a as shown in FIG. 20C, power management command module 540 of power distribution unit 534 allocates power from generator 524 to one or more tail rotor motors 512a, 514a, 516a, 518a and does not allocate any power from battery 528 to tail rotor motors 512a, 514a, 516a, 518a. In addition, when forward airspeed 544 of rotorcraft 500 exceeds airspeed threshold 544a, power management command module 540 of power distribution unit 534 may recharge battery 528 by allocating power from generator 524 to battery 528. For example, power management command module 540 of power distribution unit 534 may allocate power from both generator 524 and battery 528 to one or more tail rotor motors 512a, 514a, 516a, 518a in response to forward airspeed 544 being less than airspeed threshold 544a.

Figure 20E:
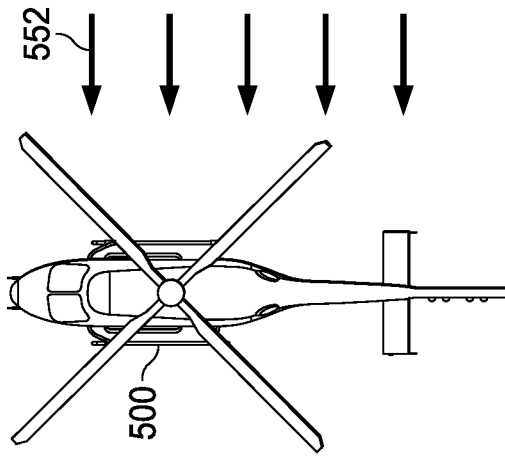
Figure 20G:
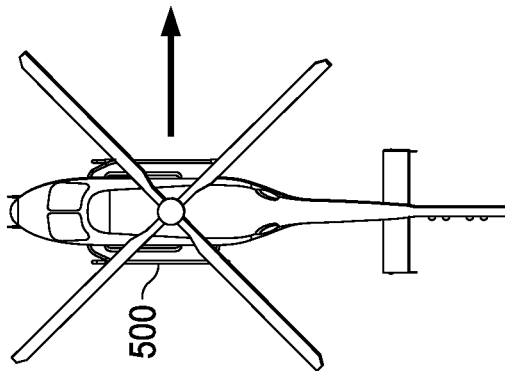
Figure 20F:
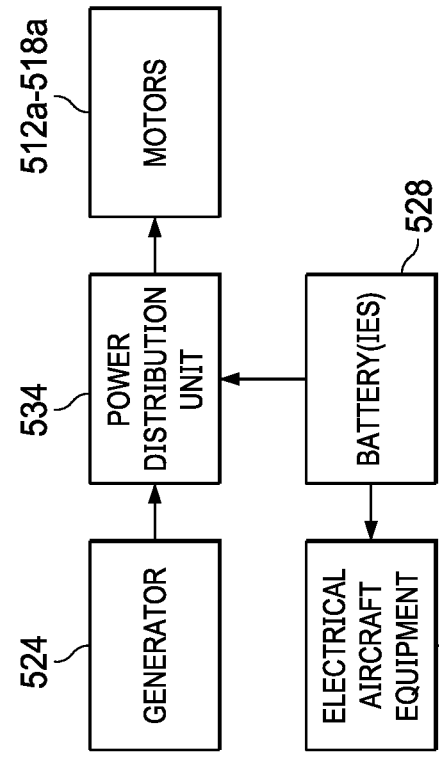

Returning to FIG. 19, power management monitoring module 538 may include a maneuver detection module 548 to detect the maneuver being performed by rotorcraft 500. Maneuver detection module 548 may detect the maneuver being performed by rotorcraft 500 using sensor data from on-board sensors. In other embodiments, the maneuver being performed by rotorcraft 500 may be determined based on the power consumption of each tail rotor 512, 514, 516, 518. The maneuver may also be manually inputted by a pilot or from elsewhere. Power management command module 540 allocates power between power system 522 and one or more tail rotor motors 512a, 514a, 516a, 518a based on the maneuver detected by maneuver detection module 548. Whether generator 524 and/or battery 528 is utilized to provide power to yaw control system 502 may depend on the amount of yaw control thrust required of yaw control matrix 504 for a particular maneuver. Referring to FIGS. 20E-20F in conjunction with FIG. 19, rotorcraft 500 is shown performing a sideward flight maneuver. Because sideward flight maneuvers generally require higher levels of thrust from the yaw control system of a helicopter, power management command module 540 of power distribution unit 534 allocates power from both generator 524 and battery 528 to one or more tail rotor motors 512a, 514a, 516a, 518a when maneuver detection module 548 detects that rotorcraft 500 is performing a sideward flight maneuver. Battery 528 may continue to provide power to electrical aircraft equipment 530 during the sideward flight maneuver. Power management command module 540 may also allocate power to yaw control matrix 504 based on other types of maneuvers. For example, power management command module 540 may allocate power from both generator 524 and battery 528 to one or more tail rotor motors 512a, 514a, 516a, 518a in response to maneuver detection module 548 detecting a high power or full power climb maneuver being performed by rotorcraft 500. Since rotorcraft 500 may not be moving forward at a fast airspeed during a high power or full power climb maneuver, additional power may be needed by yaw control matrix 504 to control the yaw of rotorcraft 500. Another maneuver that may be detected by maneuver detection module 548 is the attachment or carrying of external or internal payloads exceeding a weight threshold. When maneuver detection module 548 detects such a payload, power distribution unit 534 may allocate additional power to tail rotor motors 512a, 514a, 516a, 518a from battery 528 if required by yaw control matrix 504 to balance yaw while carrying the payload.

Figure 20H:
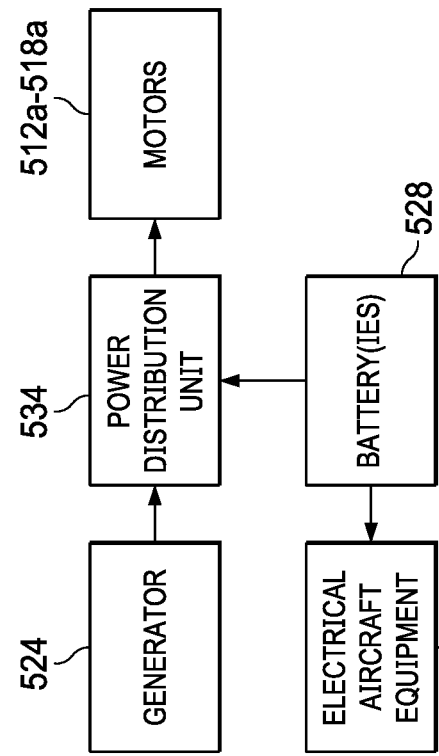

Returning to FIG. 19, power management monitoring module 538 may include a flight condition monitoring module 550 to monitor a flight condition of rotorcraft 500 during flight. For example, flight condition monitoring module 550 may monitor any ambient or environmental condition around rotorcraft 500 during flight such as crosswinds, temperature, air density, altitude, location or other conditions. Power management command module 540 allocates power between power system 522 and one or more tail rotor motors 512a, 514a, 516a, 518a based on the flight condition detected by flight condition monitoring module 550. For example, hover at sea level versus higher altitudes may not require the same power from yaw control matrix 504. In this example, power management command module 540 of power distribution unit 534 may allocate power from both generator 524 and battery 528 to one or more tail rotor motors 512a, 514a, 516a, 518a in response to rotorcraft 500 exceeding an altitude threshold. Referring to FIGS. 20G-20H in conjunction with FIG. 19, rotorcraft 500 is experiencing crosswinds 552. Power management command module 540 of power distribution unit 534 may allocate power from both generator 524 and battery 528 to one or more tail rotor motors 512a, 514a, 516a, 518a in response to crosswind 552 exceeding a crosswind threshold. Crosswinds 552 may have a similar impact on rotorcraft 500 as a sideward flight maneuver and therefore require additional power to be allocated from battery 528 to yaw control matrix 504. Battery 528 may continue to supply power to electrical aircraft equipment 530 while rotorcraft 500 experiences crosswinds 552.

Returning to FIG. 19, power management monitoring module 538 may include a power demand monitoring module 554, which monitors the power demand of one or more tail rotor motors 512a, 514a, 516a, 518a. Power management command module 540 allocates power between power system 522 and yaw control matrix 504 based on the power demand of tail rotor motors 512a, 514a, 516a, 518a as detected by power demand monitoring module 554. For example, power management command module 540 may allocate power from both generator 524 and battery 528 to one or more tail rotor motors 512a, 514a, 516a, 518a in response to the power demand of one or more tail rotor motors 512a, 514a, 516a, 518a as detected by power demand monitoring module 554 exceeding a power demand threshold 554a. Conversely, power management command module 540 may allocate power from only generator 524 to one or more tail rotor motors 512a, 514a, 516a, 518a in response to the power demand of one or more tail rotor motors 512a, 514a, 516a, 518a being less than power demand threshold 554a. Power management command module 540 may also allocate power from generator 524 to battery 528 when the power demand of one or more tail rotor motors 512a, 514a, 516a, 518a is less than power demand threshold 554a.

Power management monitoring module 538 may also include an emergency detection module 558, which detects an emergency event experienced by rotorcraft 500. For example, emergency detection module 558 may detect an engine loss event in which one or more engines 526 have reduced or no functionality. Power management command module 540 may allocate power from battery 528 to electrical aircraft equipment 530 in response to emergency detection module 558 detecting the engine loss event. Thus, electrical aircraft equipment 530, which may normally receive power from generator 524, may continue to function during the engine loss event by receiving power from battery 528. Power management command module 540 may also allocate full power to one or more tail rotor motors 512a, 514a, 516a, 518a in response to emergency detection module 558 detecting the engine loss event. It will be appreciated by one of ordinary skill in the art that any combination of modules 542, 546, 548, 550, 554, 558 may be present or implemented by power management monitoring module 538. For example, power management monitoring module 538 may employ only power demand monitoring module 554. In embodiments in which tail rotors 512, 514, 516, 518 are variable speed, battery 528 may also be recharged by using regenerative energy from tail rotor motors 512a, 514a, 516a, 518a during deceleration.

Power management system 532 reduces the weight and cost of electrically distributed yaw control system 502 by allowing for the selection of smaller power components that still meet the power consumption requirements of electrically distributed yaw control system 502. With careful analysis of expected mission profiles, it may be possible to select optimal component sizes to reduce the weight and cost of such components with little or no impact on the capability of rotorcraft 500 to complete its mission. For example, using the illustrative embodiments, generator 524 may be downsized from a larger generator such as a 100 kilowatt generator to a lighter generator such as a 50 kilowatt generator to reduce the overall weight and cost of rotorcraft 500 while still providing for the power demand requirements of yaw control system 502. Bigger or additional batteries or generators may be offered as a kit for helicopters with high power requirements. Power management system 532 also reduces the demand on engine 526 to provide a longer engine lifespan and allows rotorcraft 500 to stay in high power demand conditions for a longer period of time.

Figure 21:
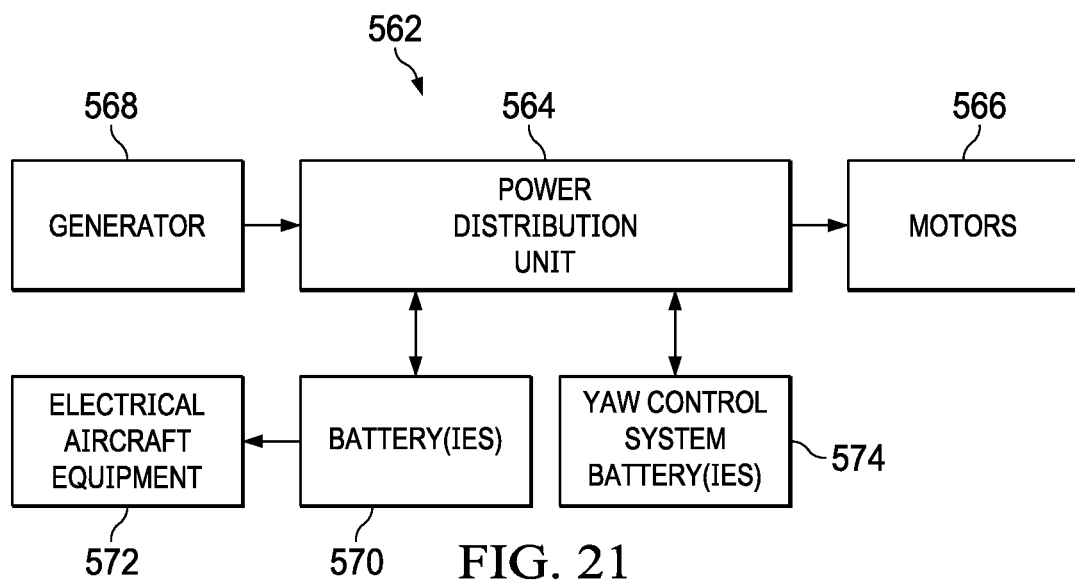
FIG. 21 is a schematic illustration of a power management system for a rotorcraft having a yaw control system in accordance with embodiments of the present disclosure.

Referring to FIG. 21 in the drawings, a power management system is schematically illustrated and generally designated 562. Power management system 562 includes power distribution unit 564, which allocates power between one or more tail rotor motors 566, generator 568 and battery 570. Battery 570 provides power to electrical aircraft equipment 572. The power system of power management system 562 includes one or more yaw control system batteries 574 in addition to battery 570. In contrast to battery 570, yaw control system battery 574 provides power only to tail rotor motors 566 and does not provide power to other systems of the rotorcraft such as electrical aircraft equipment 572. Yaw control system battery 574 allows power management system 562 to have additional power at its disposal should it be needed to power tail rotor motors 566. In other embodiments, power management system 562 may contain additional hybrid batteries that serve both tail rotor motors 566 and other systems of the rotorcraft.

Figure 22A:
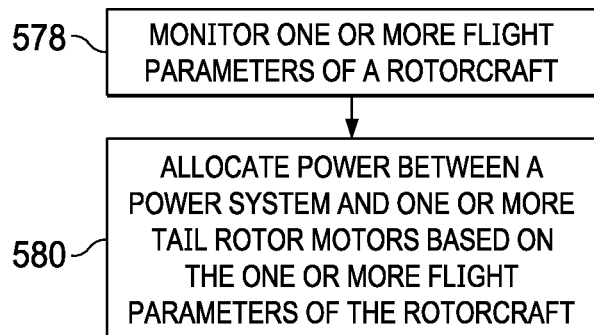
FIGS. 22A-22B are flowcharts of various methods for managing power for an electrically distributed yaw control system of a rotorcraft in accordance with embodiments of the present disclosure.
Figure 22B:
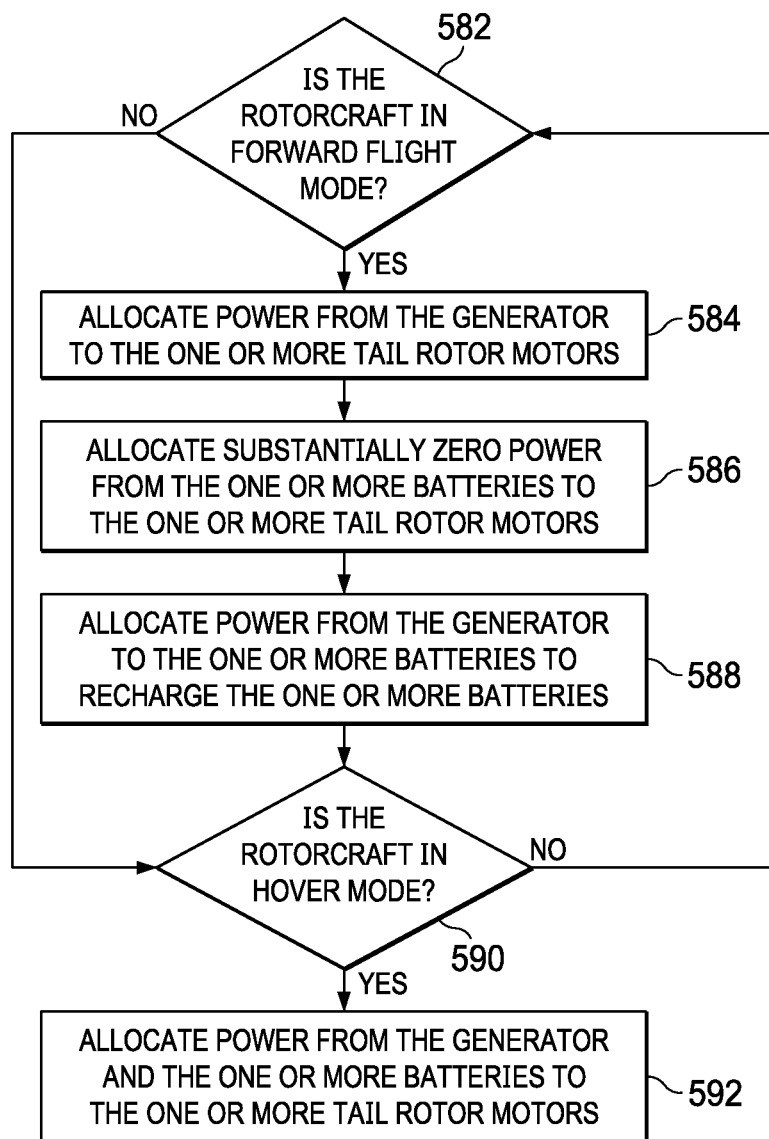

Referring to FIGS. 22A-22B in the drawings, methods for managing power for an electrically distributed yaw control system of a rotorcraft are depicted. In FIG. 22A, the method includes monitoring one or more flight parameters of a rotorcraft (step 578). The method also includes allocating power between a power system and one or more tail rotor motors based on the one or more flight parameters of the rotorcraft (step 580). In FIG. 22B, the method includes determining whether the rotorcraft is in forward flight mode (step 582). If the method determines that the rotorcraft is not in forward flight mode, the method skips to step 590. If the method determines that the rotorcraft is in forward flight mode, the method allocates power from the generator to the one or more tail rotor motors (step 584), allocates substantially zero power from the one or more batteries to the one or more tail rotor motors (step 586) and allocates power from the generator to the one or more batteries to recharge the one or more batteries (step 588). The method then determines whether the rotorcraft is in hover mode (step 590). If the method determines that the rotorcraft is not in hover mode, the method returns to step 582. If the method determines that the rotorcraft is in hover mode, the method allocates power from the generator and the one or more batteries to the one or more tail rotor motors (step 592).

Figure 23:
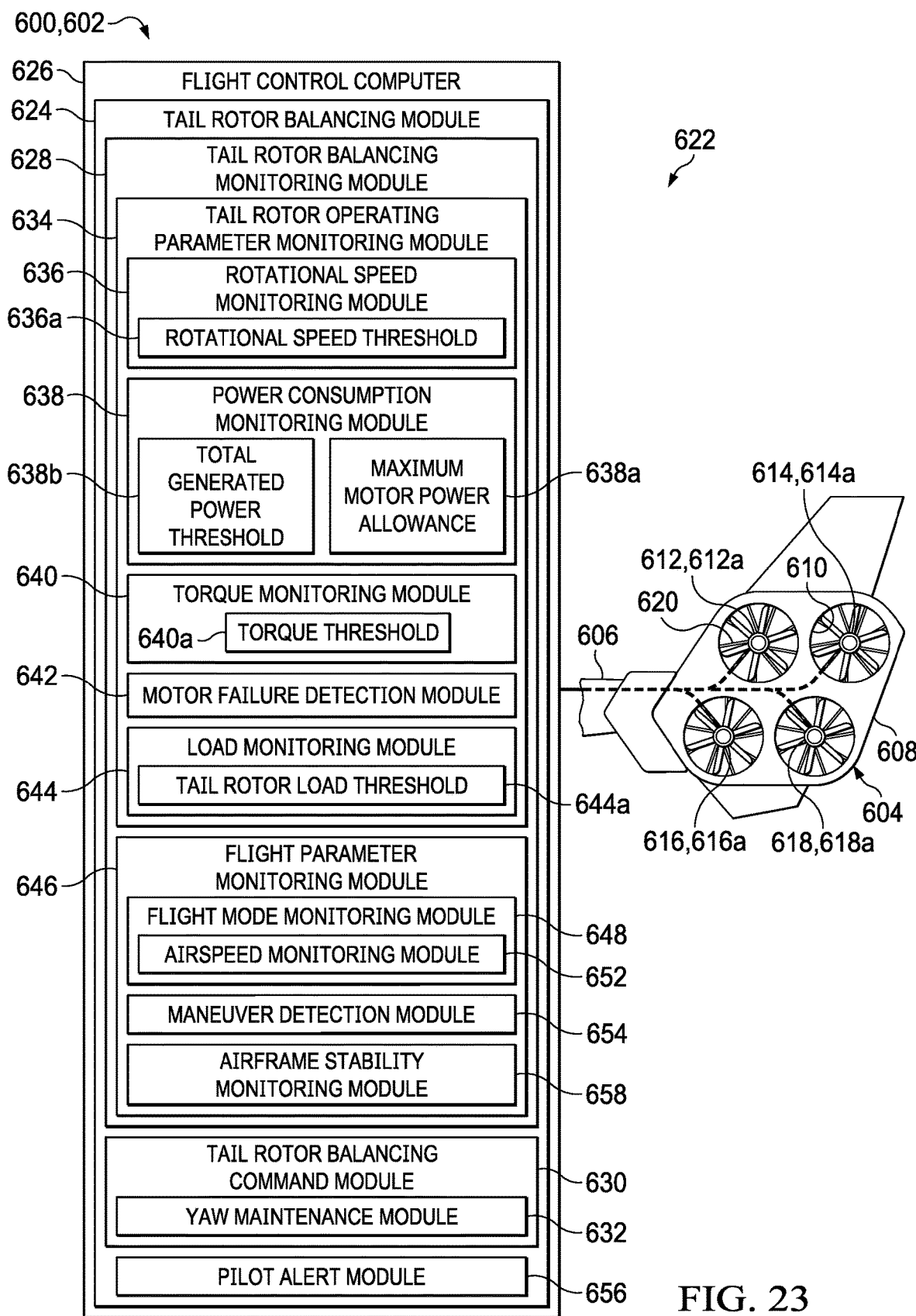
FIG. 23 is a schematic illustration of a yaw control system for a rotorcraft including a tail rotor balancing system in accordance with embodiments of the present disclosure.

Referring to FIG. 23 in the drawings, rotorcraft 600 is depicted as a helicopter including yaw control system 602. Yaw control matrix 604 is coupled to an aft portion of tailboom 606 of rotorcraft 600. Yaw control matrix 604 includes shroud 608, which forms ducts 610. Upper forward tail rotor 612, upper aft tail rotor 614, lower forward tail rotor 616 and lower aft tail rotor 618 are disposed in ducts 610 and secured by stators 620. In the illustrated embodiment, shroud 608, ducts 610 and tail rotors 612, 614, 616, 618 collectively form a generally rhombus shape configuration, although shroud 608, ducts 610 and tail rotors 612, 614, 616, 618 may separately or collectively form any shape configuration. It will be appreciated by one of ordinary skill in the art that tail rotors 612, 614, 616, 618 may be positioned in an infinite number of configurations relative to one another depending on the embodiment, and that yaw control matrix 604 may include any number of ducts and tail rotors. In the illustrated embodiment, yaw control system 602 is an electrically distributed yaw control system in which the tail rotor blades of tail rotors 612, 614, 616, 618 are fixed pitch tail rotor blades and motors 612a, 614a, 616a, 618a of tail rotors 612, 614, 616, 618 are variable rotational speed motors capable of changing RPMs. In other embodiments, however, the tail rotor blades of tail rotors 612, 614, 616, 618 may be variable pitch tail rotor blades having a fixed or variable rotational speed and may be electrically, mechanically or hydraulically driven. In yet other embodiments, one set of one or more tail rotors 612, 614, 616, 618 may be fixed pitch, variable rotational speed tail rotors while a different set of one or more tail rotors 612, 614, 616, 618 are variable pitch, fixed rotational speed tail rotors. Electrically distributed yaw control system 602 may have dual or multiple channels that are able to crosstalk and share information regarding the status and power consumption of tail rotor motors 612a, 614a, 616a, 618a in real time.

In traditional helicopters, thrust and power consumption do not always have a linear relationship and may be difficult to test and predict. Thus, if multiple tail rotors are utilized, power imbalances may occur during flight in which one tail rotor is overworked while another is not operating at full capacity. In addition, the operating loads on the tail rotors of a dual or multiple tail rotor system may become imbalanced as the flight regime or other flight parameters of the rotorcraft change during flight. Rotorcraft 600 includes a tail rotor balancing system 622 to address these issues with real-time monitoring of certain flight parameters of rotorcraft 600 and operating parameters of tail rotors 612, 614, 616, 618, which are used to balance power consumption, load and other operating parameters of tail rotors 612, 614, 616, 618 during flight. Tail rotor balancing system 622 includes a tail rotor balancing module 624 implemented by flight control computer 626. In other embodiments, flight control computer 626 may include one or more separate motor control units and tail rotor balancing module 624 may be implemented by the one or more separate motor control units.

Tail rotor balancing module 624 includes a tail rotor balancing monitoring module 628, which monitors one or more parameters of rotorcraft 600 such as one or more flight parameters of rotorcraft 600 or one or more operating parameters of tail rotors 612, 614, 616, 618. Tail rotor balancing monitoring module 628 also identifies one or more tail rotors 612, 614, 616, 618 based on the one or more monitored parameters. A tail rotor balancing command module 630 modifies one or more operating parameters of the one or more tail rotors 612, 614, 616, 618 identified by the tail rotor balancing monitoring module 628. Tail rotor balancing command module 630 may also modify one or more operating parameters of one or more tail rotors 612, 614, 616, 618 that are not identified by tail rotor balancing monitoring module 628. For example, during different maneuvers in flight, if one or more tail rotor motors 612a, 614a, 616a, 618a are detected consuming more power than the other tail rotor motors due to, for example, airflow, air density, motor usage or other factors which result in the exceedance of a power generation or power consumption threshold, tail rotor balancing command module 630 may activate a balance mode to limit power consumption for the overconsuming tail rotor motor(s) and increase the rotational speed of one or more of the remaining tail rotors 612, 614, 616, 618 to maintain the desired moment on the fuselage of rotorcraft 600. Since each tail rotor 612, 614, 616, 618 is in a different position in yaw control matrix 604 and therefore exerts a different moment arm on the fuselage of rotorcraft 600, a given thrust for each tail rotor 612, 614, 616, 618 translates to a different moment on the fuselage of rotorcraft 600. Tail rotor balancing command module 630 takes into account these spatial differences between tail rotors 612, 614, 616, 618 when selecting one or more tail rotors to compensate for the reduced thrust resulting from slowing down or shutting off the overconsuming tail rotor motor(s). Tail rotor balancing command module 630 may include a yaw maintenance module 632 that selects the compensating tail rotor(s) and determines the extent to which the compensating one or more tail rotors increase their thrust based on the predetermined or desired moment on the rotorcraft fuselage.

Tail rotor balancing monitoring module 628 includes a tail rotor operating parameter monitoring module 634 to monitor and detect various operating parameters of tail rotors 612, 614, 616, 618 that may be used as the basis for tail rotor balancing command module 630 to balance or otherwise modify certain operating parameters of tail rotors 612, 614, 616, 618. Tail rotor operating parameter monitoring module 634 includes a rotational speed monitoring module 636 that monitors the rotational speeds of tail rotors 612, 614, 616, 618 and identifies one or more tail rotors 612, 614, 616, 618 having a rotational speed that exceeds a rotational speed threshold 636a. Tail rotor balancing command module 630 may then reduce the rotational speed(s) of one or more tail rotors 612, 614, 616, 618 having a rotational speed exceeding rotational speed threshold 636a, thereby preventing these tail rotors from overconsuming power and being susceptible to wear or damage. To maintain the desired moment on the fuselage of rotorcraft 600, tail rotor balancing command module 630 may compensate for the reduced thrust resulting from reducing the rotational speed(s) of the tail rotor(s) exceeding rotational speed threshold 636*a* by increasing the rotational speed(s) of one or more different tail rotors 612, 614, 616, 618. For example, tail rotors that have not been slowed down by tail rotor balancing command module 630 may be sped up proportional to their respective current rotational speeds.

Each tail rotor motor 612*a*, 614*a*, 616*a*, 618*a* consumes different levels of power based on their position in yaw control matrix 604 as well as other factors, which allows power consumption to be used as a criterion for balancing tail rotors 612, 614, 616, 618. Thus, tail rotor operating parameter monitoring module 634 includes a power consumption monitoring module 638 that monitors the power consumption of each tail rotor 612, 614, 616, 618. In some embodiments, power consumption monitoring module 638 may identify one or more tail rotors 612, 614, 616, 618 having a power consumption that exceeds a maximum motor power allowance 638*a*. Tail rotor balancing command module 630 may then reduce the power consumption of the one or more tail rotors 612, 614, 616, 618 that exceed maximum motor power allowance 638*a*, which provides headroom for allowing an increase in the power consumption of another tail rotor. To maintain yaw control thrust, tail rotor balancing command module 630 may also increase the power consumption, and thus the rotational speed, of one or more tail rotors 612, 614, 616, 618 that were not identified by power consumption monitoring module 638 as exceeding maximum motor power allowance 638*a*.

In other embodiments, power consumption monitoring module 638 may determine whether tail rotors 612, 614, 616, 618 have a collective power consumption that exceeds a total generated power threshold 638*b*. Tail rotor balancing monitoring module 628 may also identify one or more tail rotors 612, 614, 616, 618 in response to the collective power consumption of tail rotors 612, 614, 616, 618 exceeding total generated power threshold 638*b*, and tail rotor balancing command module 630 may reduce the power consumption of the tail rotor(s) identified by tail rotor balancing monitoring module 628. The identification of which tail rotors to be stopped or slowed down when total generated power threshold 638*b* is exceeded may be performed based on several factors. For example, tail rotor balancing command module 630 may reduce the power consumption of the highest consuming or least efficient tail rotor(s) 612, 614, 616, 618. Tail rotor balancing command module 630 may also slow down or stop the one or more tail rotors 612, 614, 616, 618 that have the least effective anti-torque or pro-torque thrust based on the operation being performed and the position of each tail rotor 612, 614, 616, 618.

Tail rotor operating parameter monitoring module 634 includes a torque monitoring module 640, which monitors the torque of each tail rotor 612, 614, 616, 618. Torque monitoring module 640 identifies one or more tail rotors 612, 614, 616, 618 having a torque that exceeds a torque threshold 640*a*. Tail rotor balancing command module 630 may then reduce the torque of the one or more tail rotors 612, 614, 616, 618 that exceed torque threshold 640*a*, and may increase the torque or rotational speed of one or more remaining tail rotors 612, 614, 616, 618 that have not exceeded torque threshold 640*a*. Tail rotor operating parameter monitoring module 634 includes a motor failure detection module 642 that detects and identifies one or more tail rotors 612, 614, 616, 618 experiencing a motor failure. Motor failure detection module 642 may detect any mechanical or other potential failure issues of tail rotor motors 612*a*, 614*a*, 616*a*, 618*a* so that power balancing may be triggered either at the time or before the motor fails. In the event of a motor failure, the remaining one or more motors automatically compensate for the failed motor to provide or sustain the desired moment on the fuselage of rotorcraft 600. For example, tail rotor balancing command module 630 may deactivate one or more tail rotors 612, 614, 616, 618 for which motor failure detection module 642 has detected a motor failure. Tail rotor balancing command module 630 may also increase the rotational speed of one or more non-failing tail rotors to maintain a desired yaw control thrust.

Tail rotor balancing monitoring module 628 includes a load monitoring module 644 to monitor loads experienced by each tail rotor 612, 614, 616, 618. For example, load monitoring module 644 may detect the load and/or vibrations on the tail rotor blades of tail rotors 612, 614, 616, 618 using optical sensors, Hall Effect sensors, strain sensors, accelerometers or other sensor types. Load monitoring module 644 identifies one or more tail rotors 612, 614, 616, 618 experiencing a load exceeding a tail rotor load threshold 644*a*. Tail rotor balancing command module 630 reduces the load on the tail rotor(s) identified by load monitoring module 644 as exceeding tail rotor load threshold 644*a*. Load reduction may be performed in numerous ways such as by reducing power consumption, rotational speed or blade pitch. Tail rotor balancing command module 630 may also increase the load on one or more tail rotors 612, 614, 616, 618 that have not been identified by load monitoring module 644 as exceeding tail rotor load threshold 644*a*.

Tail rotor balancing monitoring module 628 includes a flight parameter monitoring module 646, which monitors various flight parameters of rotorcraft 600. In yaw control system 602, the aerodynamic environment of each tail rotor 612, 614, 616, 618 differs for various flight regimes. For example, some tail rotors may experience higher loads or different excitation frequencies than others depending on the flight mode and the anti-torque thrust requirement of rotorcraft 600. Flight parameter monitoring module 646 works in conjunction with tail rotor balancing command module 630 to share the total yaw control thrust requirement between tail rotors 612, 614, 616, 618 of yaw control matrix 604 in a manner that balances and/or reduces the operating loads for tail rotors 612, 614, 616, 618. Sharing of the total thrust demand may be dependent on the flight regime of rotorcraft 600 and may be performed in a manner that improves the overall load on yaw control matrix 604, which may reduce the noise produced by yaw control matrix 604 and improve the dynamics and loads experienced by the airframe of rotorcraft 600.

Flight parameter monitoring module 646 includes a flight mode monitoring module 648, which detects the flight mode of rotorcraft 600 using sensors or manual input. Rotorcraft 600 may be capable of various flight modes including hover mode and forward flight mode. Non-limiting examples of parameters that may be used to determine the flight mode of rotorcraft 600 include airspeed, climb rate, anti-torque requirement, main rotor torque and/or center of mass torque. Tail rotor balancing monitoring module 628 identifies one or more tail rotors 612, 614, 616, 618 based on the flight mode identified by flight mode monitoring module 648 so that tail rotor balancing command module 630 may reduce the rotational speed(s) or modify other operating parameters of the identified tail rotor(s). Tail rotor balancing command module 630 may also deactivate the one or more tail rotors 612, 614, 616, 618 identified by tail rotor balancing monitoring module 628 based on the flight mode detected by flight mode monitoring module 648. Additionally, tail rotor balancing command module 630 may activate or increase the rotational speed of one or more tail rotors 612, 614, 616, 618 that have not been slowed down or deactivated. Any combination of one, two, three or more tail rotors 612, 614, 616, 618 may be slowed down, deactivated, activated or sped up for a particular flight mode or other flight parameter monitored by flight parameter monitoring module 646. The logic that is used by tail rotor balancing module 624 to determine which tail rotors 612, 614, 616, 618 to slow down, deactivate, activate or speed up for a particular flight mode may be programmed based on flight test experience or may be actively controlled with a feedback loop using information from yaw control matrix 604 or the main rotor of rotorcraft 600.

Figure 24C:
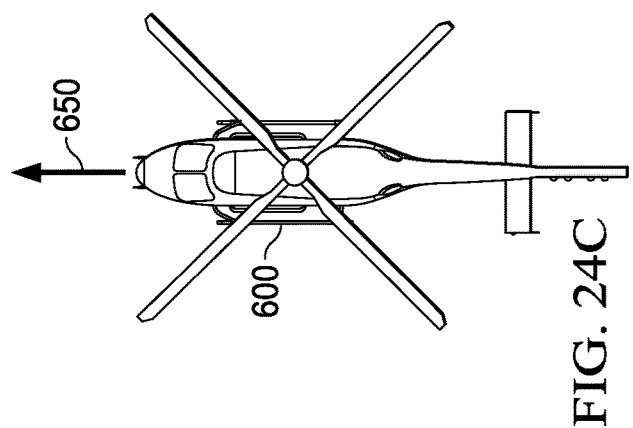
FIGS. 24A-24D are various views of a rotorcraft having a yaw control system including a tail rotor balancing system in various flight operating scenarios in accordance with embodiments of the present disclosure.
Figure 24D:
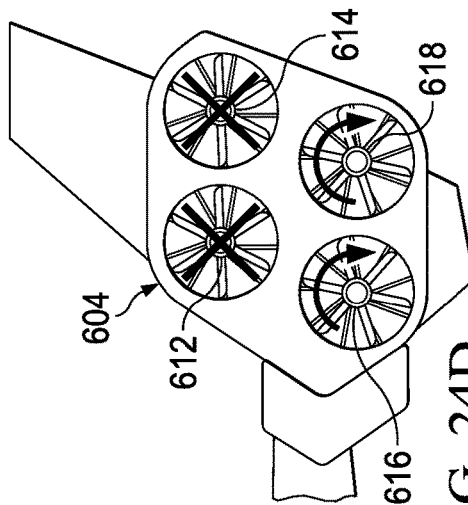
Figure 24A:
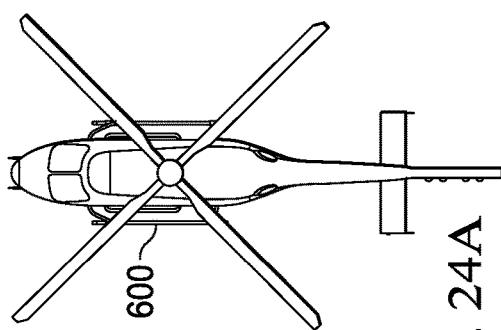
Figure 24B:
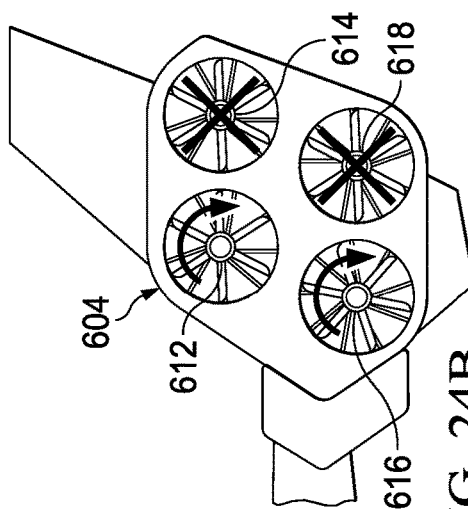

Referring to FIGS. 24A-24D in conjunction with FIG. 23, rotorcraft 600 is shown in hover mode in FIGS. 24A-24B and forward flight mode in FIGS. 24C-24D. In the non-limiting example of FIGS. 24A-24B, flight mode monitoring module 648 has detected that rotorcraft 600 is in hover mode and tail rotor balancing monitoring module 628 has identified upper and lower aft tail rotors 614, 618 based on the detected hover mode so that tail rotor balancing command module 630 may deactivate upper and lower aft tail rotors 614, 618. Tail rotor balancing command module 630 has also activated upper and lower forward tail rotors 612, 616. Upper and lower forward tail rotors 612, 616 may be slowed down or sped up to provide a desired yaw control thrust. One reason for using upper and lower forward tail rotors 612, 616 and deactivating upper and lower aft tail rotors 614, 618 is that upper and lower aft tail rotors 614, 618 may experience excessive excitation in lower speed conditions such as hover mode. The operational condition of yaw control matrix 604 shown in FIG. 24B may also be used when rotorcraft 600 is in forward flight mode at lower speeds. In another non-limiting example, lower forward tail rotor 616 and lower aft tail rotor 618 may be slowed down or deactivated and upper forward tail rotor 612 and upper aft tail rotor 614 may be activated or sped up in the hover mode of rotorcraft 600. It will be appreciated by one of ordinary skill in the art, however, that the determination of which tail rotors 612, 614, 616, 618 to slow down, deactivate, activate or speed up in each flight mode including hover mode or low speed forward flight mode may be determined by flight testing, real-time feedback from yaw control matrix 604 or other factors.

When flight mode monitoring module 648 detects that rotorcraft 600 has transitioned to a forward flight mode having a relatively higher forward airspeed 650 as shown in FIG. 24C, the operational parameters of tail rotors 612, 614, 616, 618 are changed by tail rotor balancing command module 630 as shown in FIG. 24D. In particular, in response to flight mode monitoring module 648 detecting that rotorcraft 600 is in forward flight mode, tail rotor balancing monitoring module 628 has identified upper forward tail rotor 612 and upper aft tail rotor 614 to be deactivated by tail rotor balancing command module 630. Lower forward tail rotor 616 and lower aft tail rotor 618 have remained activated in forward flight mode and tail rotor balancing command module 630 may slow down or speed up tail rotors 616, 618 to provide a desired yaw control thrust. In one non-limiting example, the identification of upper forward tail rotor 612 and upper aft tail rotor 614 as candidates for being deactivated in forward flight mode may be based on prior flight testing that shows upper tail rotors 612, 614 to be problematic in forward flight mode. Thus, lower tail rotors 616, 618 are relied upon to provide the required yaw control thrust in forward flight mode. It will be appreciated by one of ordinary skill in the art, however, that any combination of one, two, three or more tail rotors 612, 614, 616, 618 in any position on yaw control matrix 604 may be slowed down, deactivated, activated or sped up in any flight mode detected by flight mode monitoring module 648 including hover mode, low speed forward flight mode and high speed forward flight mode.

Flight mode monitoring module 648 includes an airspeed monitoring module 652, which monitors and detects airspeed 650 of rotorcraft 600. Tail rotor balancing monitoring module 628 identifies one or more tail rotors 612, 614, 616, 618 in response to airspeed 650 of rotorcraft 600 either exceeding or being less than an airspeed threshold. Tail rotor balancing command module 630 may then slow down, deactivate, activate or speed up the tail rotor(s) identified by tail rotor balancing monitoring module 628 based on airspeed 650 of rotorcraft 600. By way of non-limiting example, if airspeed 650 is less than the airspeed threshold, such as in hover mode or low speed forward flight mode, tail rotor balancing command module 630 may activate lower forward tail rotor 616 and upper aft tail rotor 614 and either slow down or deactivate upper forward tail rotor 612 and lower aft tail rotor 618. If airspeed 650 exceeds the airspeed threshold, tail rotor balancing command module 630 may balance the load on yaw control matrix 604 by activating or speeding up upper forward tail rotor 612 and lower aft tail rotor 618 and slowing down or deactivating lower forward tail rotor 616 and upper aft tail rotor 614. It will be appreciated by one of ordinary skill in the art, however, that any combination of one, two, three or more tail rotors 612, 614, 616, 618 may be slowed down, deactivated, activated or sped up based on airspeed 650 either exceeding or being less than the airspeed threshold.

Returning to FIG. 23, flight parameter monitoring module 646 includes a maneuver detection module 654, which detects the maneuver being performed by rotorcraft 600. Maneuver detection module 654 may detect the maneuver being performed by rotorcraft 600 using sensor data from on-board sensors. In other embodiments, the maneuver being performed by rotorcraft 600 may be determined based on the power consumption of each tail rotor 612, 614, 616, 618. The maneuver may also be manually inputted by a pilot or from elsewhere. Non-limiting examples of maneuvers that may be detected by maneuver detection module 654 include sideward flight maneuvers, quick or sharp turns, climbs or descents. Tail rotor balancing monitoring module 628 may identify one or more tail rotors 612, 614, 616, 618 based on the maneuver detected by maneuver detection module 654, and the identified tail rotor(s) may be slowed down, deactivated, activated or sped up by tail rotor balancing command module 630 accordingly. For example, tail rotor balancing command module 630 may shut down certain tail rotors during particular maneuvers while increasing the rotational speeds of other tail rotors of yaw control matrix 604. High load imbalances may be more likely to occur between tail rotors 612, 614, 616, 618 during certain maneuvers such as right sideward flight. Tail rotor balancing command module 630 may thus adjust the rotational speed and activation statuses of each tail rotor 612, 614, 616, 618 during sideward flight maneuvers to rectify such load imbalances. Should all tail rotors 612, 614, 616, 618 be needed for the sideward flight maneuver, tail rotor balancing command module 630 may factor in the load experienced by each tail rotor 612, 614, 616, 618, which may be detected by load monitoring module 644, to determine the respective speed of each tail rotor 612, 614, 616, 618. Since each maneuver of rotorcraft 600 requires different levels of yaw control thrust from yaw control matrix 604, the amount of yaw control thrust required by the particular maneuver is a factor in determining which tail rotors to slow down, deactivate, activate or speed up to ensure that rotorcraft 600 can continue to successfully perform the maneuver. If it is determined that the maneuver cannot continue to be performed based on the power consumption or load experienced by tail rotors 612, 614, 616, 618, an alert may be sent to the operator of rotorcraft 600 by pilot alert module 656 to notify the operator to discontinue performing the current maneuver. Pilot alert module 656 may be particularly useful for maneuvers that require high levels of anti-torque thrust such as sideward flight.

Another flight parameter that may be used to determine when to trigger different tail rotors 612, 614, 616, 618 to be slowed down, deactivated, activated or sped up is airframe vibration or instability. Thus, flight parameter monitoring module 646 includes an airframe stability monitoring module 658 that monitors the excitation frequency(ies) of tail rotors 612, 614, 616, 618. Tail rotor balancing monitoring module 628 identifies one or more tail rotors 612, 614, 616, 618 in response to the excitation frequency of any combination of tail rotors 612, 614, 616, 618 approximating a natural frequency of any airframe component of rotorcraft 600. Tail rotor balancing command module 630 may then slow down, deactivate, activate or speed up the tail rotor(s) identified by tail rotor balancing monitoring module 628 so that the excitation frequency(ies) of tail rotors 612, 614, 616, 618 no longer approximate(s) the natural frequency of the airframe component. For example, if tail rotors 612, 614, 616, 618 are rotating at a natural frequency of tailboom 606 or other airframe structure, tail rotor balancing command module 630 may slow down or deactivate one or more tail rotors 612, 614, 616, 618 and increase the rotational speeds of others so that they no longer excite the natural frequency of the airframe, thereby preserving airframe integrity and reducing vibration loads. Flight parameter monitoring module 646 may also monitor other flight parameters of rotorcraft 600 such as ambient air density, altitude, environmental flight conditions or others, and such flight parameters may be used as the basis for slowing down, deactivating, activating or speeding up any combination of tail rotors 612, 614, 616, 618 in yaw control matrix 604 to balance loads. Minimizing the loads on tail rotors 612, 614, 616, 618 allows for a lighter yaw control matrix 604 and increases the fatigue life of the components of yaw control matrix 604 to reduce aircraft operating cost.

Figure 25A:
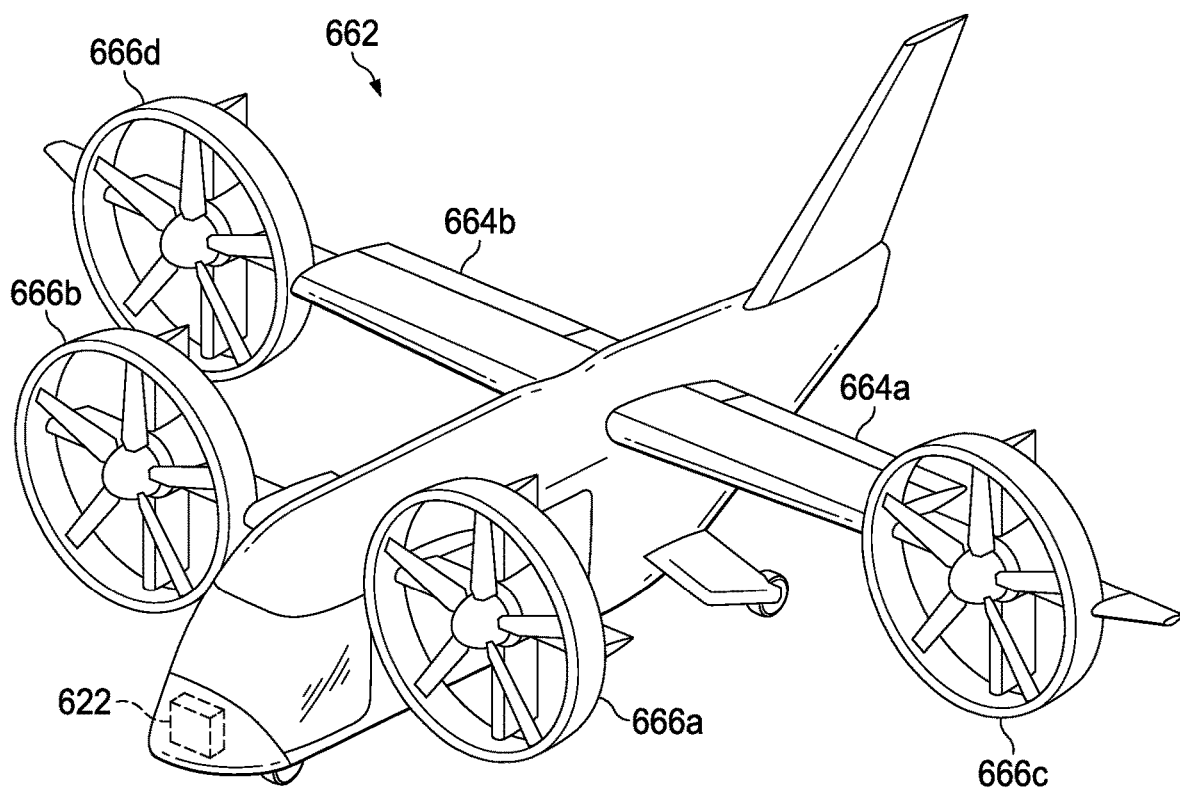
FIGS. 25A-25B are isometric views of an electric vertical takeoff and landing aircraft having a tail rotor balancing system in accordance with embodiments of the present disclosure.
Figure 25B:
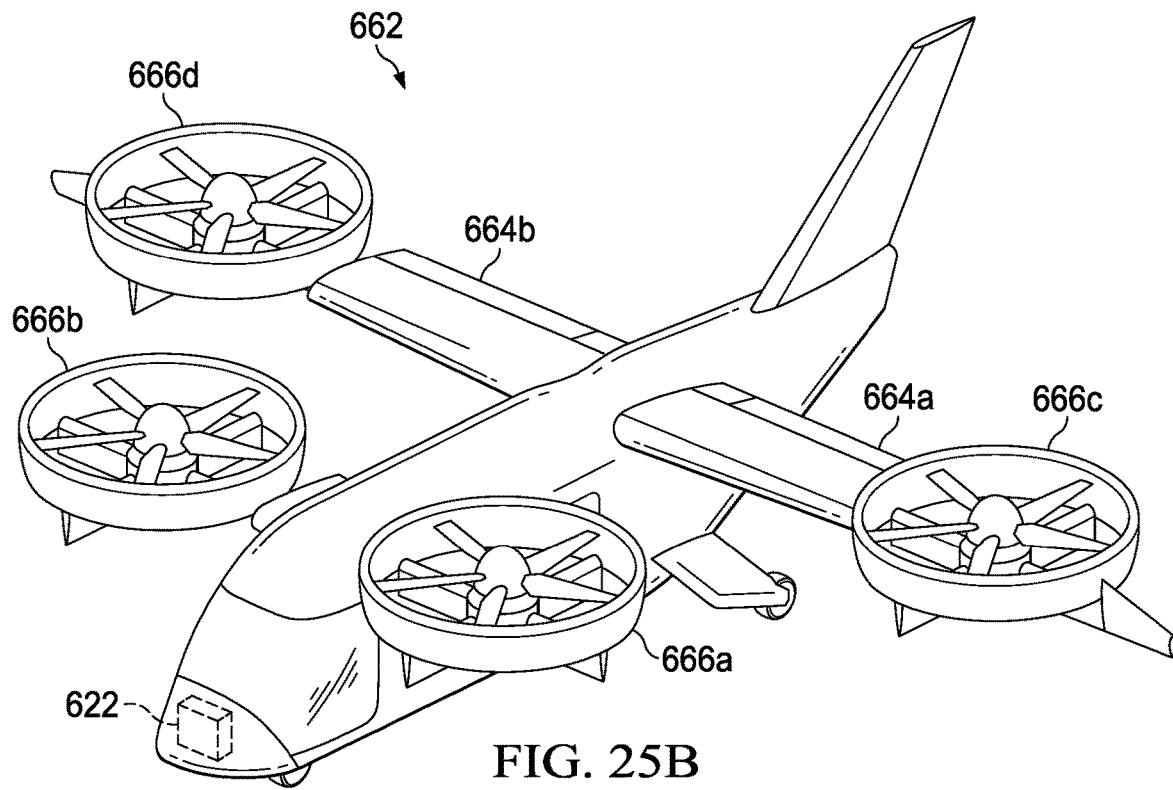

Referring to FIGS. 25A-25B in the drawings, isometric views of an electric vertical takeoff and landing (eVTOL) aircraft 662 for use with balancing system 622 are depicted. FIG. 25A depicts eVTOL aircraft 662 in a forward flight mode wherein the rotor systems provide forward thrust with the forward airspeed of eVTOL aircraft 662 providing wing-borne lift enabling eVTOL aircraft 662 to have a high speed and/or high endurance forward flight mode. FIG. 25B depicts eVTOL aircraft 662 in a VTOL flight mode wherein the rotor systems provide thrust-borne lift. VTOL flight mode includes takeoff, hover and landing phases of flight. In the illustrated embodiment, eVTOL aircraft 662 includes wings 664a, 664b. Wings 664a, 664b have an airfoil cross-section that generates lift responsive to the forward airspeed of eVTOL aircraft 662.

In the illustrated embodiment, eVTOL aircraft 662 includes four rotor systems forming a two-dimensional distributed thrust array. The thrust array of eVTOL aircraft 662 includes a forward-port rotor system 666a, a forward-starboard rotor system 666b, an aft-port rotor system 666c and an aft-starboard rotor system 666d, which may be referred to collectively as rotor systems 666. Forward-port rotor system 666a and forward-starboard rotor system 666b are each rotatably mounted to a shoulder portion of the fuselage at a forward station thereof. Aft-port rotor system 666c is rotatably mounted on the outboard end of wing 664a. Aft-starboard rotor system 666d is rotatably mounted on the outboard end of wing 664b. In the illustrated embodiment, rotor systems 666 are ducted rotor systems each having a five bladed rotor assembly with variable pitch rotor blades operable for collective pitch control. Rotor systems 666 may each include at least one variable speed electric motor and a speed controller configured to provide variable speed control to the rotor assembly over a wide range of rotor speeds, or alternatively may each include at least one constant speed electric motor to provide fixed RPM. In other embodiments, the rotor systems could be non-ducted or open rotor systems, the number of rotor blades could be either greater than or less than five and/or the rotor blades could have a fixed pitch. eVTOL aircraft 662 may include any number of rotor systems either greater than or less than four rotor systems such as a coaxial rotor system or six rotor systems.

When eVTOL aircraft 662 is operating in the forward flight orientation and supported by wing-borne lift, rotor systems 666 each have a generally vertical position with the forward rotor assemblies rotating generally in a forward vertical plane and the aft rotor assemblies rotating generally in an aft vertical plane, as best seen in FIG. 25A. When eVTOL aircraft 662 is operating in the VTOL orientation and supported by thrust-borne lift, rotor systems 666 each have a generally horizontal position such that the rotor assemblies are rotating in generally the same horizontal plane, as best seen in FIG. 25B. Transitions between the VTOL orientation and the forward flight orientation of eVTOL aircraft 662 are achieved by changing the angular positions of rotor systems 666 between their generally horizontal positions and their generally vertical positions.

Balancing module 624 of FIG. 23 may, in other embodiments, be implemented to balance the power consumption, rotational speeds and/or loads of rotor systems 666. For example, should one or more rotor systems 666 experience a power consumption, rotational speed, torque or load that exceeds a predetermined threshold, a different set of one or more rotor systems 666 may compensate for the overworked rotor system to provide an overall desired propulsion thrust in either flight mode. In addition, each rotor system 666 may be slowed down, deactivated, activated or sped up based on the flight mode, airspeed, maneuver, excitation frequency or natural frequency of eVTOL aircraft 662 to balance or improve the overall loads experienced by rotor systems 666. Indeed, balancing module 624 is not limited only to yaw control systems, as its applicability to eVTOL aircraft 662 demonstrates its wide range of applications on any rotorcraft having two or more rotors.

Referring to FIGS. 26A-26C in the drawings, various methods for operating a plurality of tail rotors of a rotorcraft such as a helicopter are depicted. In FIG. 26A, the method includes monitoring one or more parameters of a rotorcraft (step 670). The method includes identifying a first set of one or more tail rotors based on the one or more parameters of the rotorcraft (step 672). The method includes modifying one or more operating parameters of the first set of one or more tail rotors (step 674). In some embodiments, step 674 may include reducing a rotational speed of the first set of one or more tail rotors and increasing a rotational speed of a second set of different one or more tail rotors to maintain a moment on the fuselage of the rotorcraft. In other embodiments, the method may include modifying one or more operating parameters of a second set of one or more tail rotors that is different from the first set of one or more tail rotors. In FIG. 26B, the method includes monitoring an airspeed of a rotorcraft (step 676). The method includes identifying a first set of one or more tail rotors based on the airspeed of the rotorcraft (step 678). The method includes deactivating the first set of one or more tail rotors (step 680). In FIG. 26C, the method includes monitoring power consumption of each of the tail rotors (step 682). The method includes identifying a first set of one or more tail rotors having a power consumption exceeding a maximum motor power allowance (step 684). The method includes reducing the power consumption of the first set of one or more tail rotors (step 686). The method also includes increasing the power consumption of one or more remaining tail rotors not in the first set of one or more tail rotors (step 688).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The flight control computers of the illustrative embodiments include computing elements, or modules, such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A yaw control system for a helicopter having a tailboom comprising:
   a plurality of tail rotors rotatably coupled to the tailboom, the tail rotors having one or more operating parameters, the tail rotors reversibly rotatable in a first rotational direction to provide anti-torque thrust and in a second rotational direction to provide pro-torque thrust, the tail rotors reversing rotational direction at a motor reversal set point; and
   a quiet mode controller comprising:
   a noise monitoring module configured to monitor one or more flight parameters of the helicopter; and
   a quiet mode command module configured to selectively switch the tail rotors to a quiet mode based on the one or more flight parameters;
   wherein, the quiet mode command module is configured to modify the one or more operating parameters of the tail rotors in the quiet mode to reduce noise emitted by the helicopter; and
   wherein, the quiet mode command module further comprises a motor reversal set point regulator to modify the motor reversal set point of the tail rotors in the quiet mode.

2. The yaw control system as recited in claim 1 wherein the noise monitoring module further comprises an altitude monitoring module to monitor an altitude of the helicopter, the quiet mode command module switching the tail rotors to the quiet mode when the altitude of the helicopter is less than an altitude threshold.

3. The yaw control system as recited in claim 1 wherein the noise monitoring module further comprises a location monitoring module to monitor a location of the helicopter, the quiet mode command module switching the tail rotors to the quiet mode based on the location of the helicopter.

4. The yaw control system as recited in claim 3 wherein the quiet mode command module switches the tail rotors to the quiet mode when the helicopter enters an urban location.

5. The yaw control system as recited in claim 1 wherein the one or more flight parameters monitored by the noise monitoring module include an airspeed of the helicopter, an ambient temperature during flight and an ambient air density during flight, the quiet mode command module switching the tail rotors to the quiet mode based on at least one of the airspeed of the helicopter, the ambient temperature during flight or the ambient air density during flight.

6. The yaw control system as recited in claim 1 wherein the one or more flight parameters monitored by the noise monitoring module include manual input from an operator of the helicopter, the quiet mode command module switching the tail rotors to the quiet mode based on the manual input.

7. The yaw control system as recited in claim 1 wherein the quiet mode command module further comprises a rotational speed regulator to modify a maximum rotational speed of the tail rotors, the rotational speed regulator limiting a rotational speed of the tail rotors to the maximum rotational speed in the quiet mode.

8. The yaw control system as recited in claim 1 wherein the quiet mode command module further comprises a rotational speed regulator to modify a rotational speed of the tail rotors in the quiet mode.

9. The yaw control system as recited in claim 8 wherein the rotational speed regulator reduces the rotational speed of the tail rotors in the quiet mode.

10. The yaw control system as recited in claim 1 wherein the quiet mode command module further comprises an acceleration regulator to modify a maximum angular acceleration of the tail rotors, the acceleration regulator limiting angular acceleration of the tail rotors to the maximum angular acceleration in the quiet mode.

11. The yaw control system as recited in claim 1 wherein the quiet mode command module further comprises an acceleration regulator to modify a maximum angular deceleration of the tail rotors, the acceleration regulator limiting angular deceleration of the tail rotors to the maximum angular deceleration in the quiet mode.

12. The yaw control system as recited in claim 1 wherein the motor reversal set point comprises a relation between a pedal position and a tail rotor motor speed.

13. The yaw control system as recited in claim 1 wherein the motor reversal set point is based on a total anti-torque force.

14. The yaw control system as recited in claim 1 wherein the motor reversal set point is based on a yaw rate.

15. A rotorcraft comprising:
a fuselage;
a tailboom extending from the fuselage, the tailboom having an aft portion; and
a yaw control system comprising:
a shroud coupled to the aft portion of the tailboom and forming one or more ducts;
a plurality of tail rotors disposed in the one or more ducts, the tail rotors having one or more operating parameters, the tail rotors reversibly rotatable in a first rotational direction to provide anti-torque thrust and in a second rotational direction to provide pro-torque thrust, the tail rotors reversing rotational direction at a motor reversal set point; and
a flight control computer implementing a quiet mode controller, the quiet mode controller comprising:
a noise monitoring module configured to monitor one or more flight parameters of the rotorcraft; and
a quiet mode command module configured to selectively switch the tail rotors to a quiet mode based on the one or more flight parameters;
wherein, the quiet mode command module is configured to modify the one or more operating parameters of the tail rotors in the quiet mode to reduce noise emitted by the rotorcraft, and
wherein, the quiet mode command module further comprises a motor reversal set point regulator to modify the motor reversal set point of the tail rotors in the quiet mode.

16. The rotorcraft as recited in claim 15 wherein the quiet mode command module is configured to nonuniformly modify the operating parameters of the tail rotors based on at least one of a size or a position of each tail rotor.

17. The rotorcraft as recited in claim 15 wherein the quiet mode command module switches the tail rotors to the quiet mode when the one or more flight parameters traverse a regulatory threshold.

18. The rotorcraft as recited in claim 15 further comprising a power system including a generator and a battery;
wherein, the quiet mode command module further comprises a power regulation module to reduce power supplied by the generator to the tail rotors and increase power supplied by the battery to the tail rotors in the quiet mode.

\* \* \* \* \*